(12) United States Patent
Shirayanagi et al.

(10) Patent No.: US 7,445,333 B2
(45) Date of Patent: Nov. 4, 2008

(54) SPECTACLE LENS AND SPECTACLES

(75) Inventors: Moriyasu Shirayanagi, Saitama-ken (JP); Hiroaki Fujii, Tokyo (JP)

(73) Assignee: Seiko Optical Products Co., Ltd., Tokyo (JP)

( * ) Notice: Subject to any disclaimer, the term of this patent is extended or adjusted under 35 U.S.C. 154(b) by 296 days.

(21) Appl. No.: 11/420,974

(22) Filed: May 30, 2006

(65) Prior Publication Data

US 2006/0274258 A1 Dec. 7, 2006

(30) Foreign Application Priority Data

May 31, 2005 (JP) ............................ P2005-159538

(51) Int. Cl.
*G02C 7/02* (2006.01)
(52) U.S. Cl. ...................................... 351/159
(58) Field of Classification Search ................. 351/159, 351/163–176
See application file for complete search history.

(56) References Cited

U.S. PATENT DOCUMENTS

| 5,353,072 | A | 10/1994 | Tejima et al. |
| 5,774,201 | A | 6/1998 | Tackles |
| 6,056,399 | A | 5/2000 | Jannard et al. |
| 6,056,401 | A | 5/2000 | Shirayanagi |
| 6,334,681 | B1 | 1/2002 | Perrott et al. |
| 6,361,166 | B1 | 3/2002 | Perrott et al. |
| 6,454,408 | B1 | 9/2002 | Morris et al. |
| 6,789,895 | B2 | 9/2004 | Shirayanagi |
| 6,796,653 | B2 | 9/2004 | Shirayanagi |
| 6,994,435 | B2 | 2/2006 | Shirayanagi |
| 2003/0169398 | A1 | 9/2003 | Porrott et al. |
| 2005/0007547 | A1* | 1/2005 | Jones ..................... 351/159 |
| 2005/0179859 | A1 | 8/2005 | Perrott et al. |
| 2006/0007394 | A1 | 1/2006 | Shirayanagi |

FOREIGN PATENT DOCUMENTS

| JP | 5-323185 | 12/1993 |
| JP | 2000-506628 | 5/2000 |

OTHER PUBLICATIONS

English language abstract of JP 5-323185.

* cited by examiner

*Primary Examiner*—Darryl J Collins
(74) *Attorney, Agent, or Firm*—Greenblum & Bernstein, P.L.C.

(57) ABSTRACT

A spectacle lens having an aspherical surface on its one of front and back surfaces is provided. An outward normal line normal to the front surface at a centration point inclines with respect to an axis passing through the centration point and a center of rotation of an eye. A cross section of the aspherical surface defined by a plane including the outward normal line and the axis is asymmetrical.

19 Claims, 43 Drawing Sheets

| | VERTEX POWER | | | FRONT SURFACE | | | BACK SURFACE | | | CENTER THICKNESS | REFRACTIVE INDEX | OUTER DIAMETER | FRONT WARPAGE ANGLE |
|---|---|---|---|---|---|---|---|---|---|---|---|---|---|
| | SPH | CYL | AX | D1h | D1v | SHAPE | D2s | D2c | SHAPE | CT | n | DIA | TILT |
| EXAMPLE 1 | 3.00 | — | — | 8.000 | ↓ | SPHERICAL | -5.289 | -5.173 | ※1 | 4.260 | 1.600 | 70.0 | 10.000 |
| COMPARATIVE EXAMPLE 1 | 3.00 | — | — | 8.000 | ↓ | SPHERICAL | -5.174 | ↓ | SPHERICAL | 4.260 | 1.600 | 70.0 | 10.000 |
| EXAMPLE 2 | -4.00 | — | — | 8.000 | ↓ | SPHERICAL | -11.886 | -12.055 | ※1 | 1.500 | 1.600 | 70.0 | 10.000 |
| COMPARATIVE EXAMPLE 2 | -4.00 | — | — | 8.000 | ↓ | SPHERICAL | -12.061 | ↓ | SPHERICAL | 1.500 | 1.600 | 70.0 | 10.000 |
| EXAMPLE 3 | 3.00 | — | — | 8.000 | ↓ | SPHERICAL | -5.614 | -5.173 | ※1 | 4.260 | 1.600 | 70.0 | 20.000 |
| COMPARATIVE EXAMPLE 3 | 3.00 | — | — | 8.000 | ↓ | SPHERICAL | -5.174 | ↓ | SPHERICAL | 4.260 | 1.600 | 70.0 | 20.000 |
| EXAMPLE 4 | -4.00 | — | — | 8.000 | ↓ | SPHERICAL | -11.410 | -12.055 | ※1 | 1.500 | 1.600 | 70.0 | 20.000 |
| COMPARATIVE EXAMPLE 4 | -4.00 | — | — | 8.000 | ↓ | SPHERICAL | -12.061 | ↓ | SPHERICAL | 1.500 | 1.600 | 70.0 | 20.000 |
| EXAMPLE 5 | 3.00 | — | — | 4.000 | ↓ | SPHERICAL | -1.456 | -1.039 | ※1 | 4.077 | 1.600 | 70.0 | 20.000 |
| COMPARATIVE EXAMPLE 5 | 3.00 | — | — | 4.000 | ↓ | SPHERICAL | -1.042 | ↓ | SPHERICAL | 4.077 | 1.600 | 70.0 | 20.000 |
| EXAMPLE 6 | -4.00 | — | — | 2.000 | ↓ | SPHERICAL | -5.394 | -6.005 | ※1 | 1.500 | 1.600 | 70.0 | 20.000 |
| COMPARATIVE EXAMPLE 6 | -4.00 | — | — | 2.000 | ↓ | SPHERICAL | -6.004 | ↓ | SPHERICAL | 1.500 | 1.600 | 70.0 | 20.000 |
| EXAMPLE 7 | 2.00 | 1.00 | 45.0 | 6.000 | ↓ | SPHERICAL | -4.176 | -3.222 | ※1 | 4.140 | 1.600 | 70.0 | 15.000 |
| COMPARATIVE EXAMPLE 7 | 2.00 | 1.00 | 45.0 | 6.000 | ↓ | SPHERICAL | -4.095 | -3.095 | TORIC | 4.140 | 1.600 | 70.0 | 15.000 |
| EXAMPLE 8 | -3.00 | -1.00 | 180.0 | 6.000 | 4.000 | TORIC | -8.757 | -8.015 | ※1 | 1.500 | 1.600 | 70.0 | 15.000 |
| COMPARATIVE EXAMPLE 8 | -3.00 | -1.00 | 180.0 | 6.000 | 4.000 | TORIC | -9.034 | -8.015 | TORIC | 1.500 | 1.600 | 70.0 | 15.000 |

※1 ROTATIONALLY ASYMMETRICAL ASPHERICAL SURFACE

FIG.68

SPECTACLE LENS AND SPECTACLES

BACKGROUND OF THE INVENTION

The present invention relates to a corrective lens, in particular to a spectacle lens having a large front warpage angle.

So-called wrap-around spectacles configured to have a relatively large front warpage angle to protect eyes of a wearer from light, wind, particles, etc., which would enter the eyes from temporal region sides of a head, have become widespread. However, most of the conventional wrap-around spectacles are configured as a non-corrective lens (i.e., glasses having no dioptric power). There are demands to use wrap-around spectacles which can provide proper visual acuity to a person who needs correction of visual acuity.

A spherical lens having a deep base curve (approximately 8 dioptre) formed to fit into a spectacle frame having a large front warpage angle such as wrap-around spectacles has been proposed. However, when such a spherical lens is worn by a wearer, even a visual axis defined when the wearer faces the front can not avoid intersecting with a lens surface obliquely. Therefore, large aberrations are caused when the spherical lens is used to correct visual acuity. Providing a negative power to a spherical lens having a deep base curve can lead to large aberrations even if the spectacle frame to which the spherical lens is to be fitted has no front warpage angle. That is, to design a spherical lens for wrap-around spectacles to attain refractive correction yields problems to be addressed.

In Japanese Patent Provisional Publication No. HEI 5-323185A (hereafter, referred to as JP HEI 5-323185A), a spectacle lens configured to have an extended toric surface on its back surface to attain refractive correction is disclosed. The extended toric surface is configured to have a symmetric property with respect to each of two axes (X-axis and Y-axis) perpendicularly intersecting with respect to each other. For this reason, the degree of freedom of lens design is limited, and thereby optical performance such as an aberration correction function is deteriorated. Since the spectacle lens disclosed in JP HEI 5-323185A is designed such that an inclination angle at a centration point is relatively small and a base curve is relatively shallow, the degree of wraparound becomes small and thereby the degree of covering the temporal region side of a head (i.e., a wrapping property) becomes insufficient. The term "inclination angle at a centration point" means an angle formed between an outward normal line normal to a front surface and an axis passing through a center of rotation of an eye and the centration point.

In Japanese Patent Provisional Publication No. P2000-506628A (hereafter, referred to as JP 2000-506628A), a spectacle lens configured such that off-axis aberrations are corrected by providing an aspherical surface on its front surface, and that off-axis aberrations are corrected by changing the degree of curve of a toric surface or a spherical surface provided on its back surface. However, since both of back and front surfaces of the spectacle lens disclosed in JP 2000-506628A are designed to be symmetric, it is impossible in principle to correct asymmetrical aberrations which increase as the inclination angle at the centration point becomes larger. The spectacle lens is configured to only achieve a balance between aberrations.

SUMMARY OF THE INVENTION

The present invention is advantageous in that it provides a spectacle lens which is capable of attaining excellent optical performance even if it is designed to be fitted into a spectacle frame having a large front warpage angle such as wrap-around spectacles.

According to an aspect of the invention, there is provided a spectacle lens having an aspherical surface on its one of front and back surfaces. An outward normal line normal to the front surface at a centration point inclines with respect to an axis passing through the centration point and a center of rotation of an eye. A cross section of the aspherical surface defined by a plane including the outward normal line and the axis is asymmetrical.

With this configuration, it is possible to provided the spectacle lens, having a suitable wrapping property of sufficiently covering a temporal region side of a head, being capable of correcting asymmetrical aberrations which the conventional spectacle lens (e.g., the lenses disclosed in JP HEI 5-323185A or JP 2000-506628A) can not correct, and being capable of having suitable optical performance even in a condition where the spectacle lens is fitted in a frame having a large front warpage angle.

The axis passing through the centration point and a center of rotation of an eye substantially coincides with an visual axis defined when a wearer looks at an infinite distance.

In at least one aspect, when a direction passing through the centration point and the center of rotation of an eye from the centration point to the center of rotation of an eye is defined as a Z-axis, two axes perpendicularly intersecting with the Z-axis are respectively defined as a X-axis and a Y-axis so that a left hand coordinate system is defined at the centration point in such a manner that an orthographic projection of the outward normal line to an X-Y plane facing a minus direction of the X-axis, curvatures of cross-sections of the front and back surfaces defined by a plane which includes the Z-axis and forms an angle θ with respect to the X-axis are respectively defined as $C_1(h,\theta)$ (dpt) and $C_2(h,\theta)$ (dpt), where h represents a distance mm from the Z-axis, a thickness of the spectacle lens at the centration point is represented as t (mm), a refractive index of medium of the spectacle lens is represented as n, a prescribed spherical power is represented as SPH (dpt), a prescribed cylindrical power is represented as CYL (dpt), and a cylinder axis measured in a counterclockwise direction with respect to the X-axis is represented as AX (°), cross-section surface power $D_1(h,\theta)$ of the front surface is defined as:

$$D_1(h,\theta)=(n-1)\cdot C_1(h,\theta) \qquad (1),$$

cross-section surface power $D_2(h,\theta)$ of the back surface is defined as:

$$D_2(h,\theta)=(1-n)\cdot C_2(h,\theta) \qquad (2),$$

an amount $P^-(h,\theta)$ regarding a vertex power is defined as:

$$P^-(h,\theta)=D_1(h,\theta)/\{1-D_1(h,\theta)\cdot t/1000n\}+D_2(h,\theta) \qquad (3),$$

a prescribed dioptric power $P_0(\theta)$ for a lens center and paraxial rays is defined:

$$P_0(\theta)=SPH+CYL\cdot\sin^2(\theta-AX) \qquad (4), \text{ and}$$

an amount $\Delta P^-(h, \theta)$ regarding an aspheric amount is defined as:

$$\Delta P^-(h,\theta)=P^-(h,\theta)-P_0(\theta) \qquad (5).$$

In this configuration, the spectacle lens satisfies a following condition (6) at least in a range of 5<h<20:

$$\Delta P^-(h,0)\neq\Delta P^-(h,180) \qquad (6).$$

Satisfying the condition (6) means that the aspheric amount for the case of the angle θ=0° is different from that for the case of the angle θ=180°. That is, the condition (6) represents a state where the cross-section of the aspherical surface is asymmetrical in a mathematical expression.

In at least one aspect, an angle formed between the outward normal line and the axis passing through the centration point and the center of rotation of an eye may be larger than or equal to 10°.

With this configuration, a spectacle lens capable of being used for a frame having a large front warpage angle can be provided.

The following aspects of the invention relate to a configuration in regard to the determination of the aspheric amount for achieving correction of asymmetrical aberrations caused when the outward normal line inclines with respect to the axis (passing through the centration point and the center of rotation of an eye) at the centration point.

In at least one aspect, the spectacle lens satisfies following conditions (7) and (8):

$$P_0(0)>0 \tag{7}$$

$$\Delta P^-(5,180)>\Delta P^-(5,0) \tag{8}$$

The condition (7) means that the spectacle lens is a plus lens. With regard to the spectacle lens having a positive power, it is possible to reduce the asymmetric aberrations by configuring the lens such that, at the height of 5 mm, the aspheric amount at θ=180° is larger than the aspheric amount at θ=0°.

In at least one aspect, the spectacle lens satisfies following conditions (9) and (10):

$$P_0(0)<0 \tag{9}$$

$$\Delta P^-(5,180)<\Delta P^-(5,0) \tag{10}$$

The condition (9) means that the spectacle lens as a minus lens. With regard to the spectacle lens having a minus power, it is possible to reduce the asymmetric aberrations by configuring the lens such that, at the height of 5 mm, the aspheric amount at θ=0° is larger than the aspheric amount at θ=180°.

In at least one aspect, the spectacle lens satisfies following conditions (7), (11) and (12):

$$P_0(0)>0 \tag{7}$$

$$\Delta P^-(0,0)<0 \tag{11}$$

$$\Delta P^-(0,90) \cong 0 \tag{12}$$

It is preferable for a plus lens to satisfy the conditions (11) and (12). With this configuration, it is possible to enhance optical performance while reducing the astigmatism for the lens center and paraxial rays.

In at least one aspect, the spectacle lens satisfies following conditions (9), (13) and (12):

$$P_0(0)<0 \tag{9}$$

$$\Delta P^-(0,0)>0 \tag{13}$$

$$\Delta P^-(0,90) \cong 0 \tag{12}$$

It is preferable for a minus lens to satisfy the conditions (13) and (12). With this configuration, it is possible to enhance optical performance while reducing the astigmatism for the lens center and paraxial rays.

In at least one aspect, the spectacle lens satisfies following conditions (14) and (15):

$$P_0(\theta)>0 \tag{14}$$

$$D_1(0,\theta)<A_p \cdot P_0(\theta)+B_p \tag{15}$$

where $A_p=1.02n-0.51$, $B_p=13.24n-14.79$.

In this case, a following condition (16) may be satisfied when the angle θ is in a range of −90≦θ≦90:

$$\Delta P^-(5,\theta)>\Delta P^-(10,\theta)>\Delta P^-(15,\theta) \tag{16}$$

The spectacle lens satisfying the condition (14) has a positive power. The spectacle lens satisfying the condition (15) uses a surface having a base curve which is shallower than a base curve of a spherical surface configured to suitably attain a prescribed spherical power SPH in regard to aberrations in the case where there is no inclination angle. That is, with regard to the spectacle lens having a positive power and a relatively shallow surface, it is possible to enhance the off-axis optical performance by designing the lens such that the aspheric amount (i.e., the amount of departure from a spherical surface shape) becomes smaller as the distance h from the Z-axis increases in a plane including the Z-axis and forming the angle θ with respect to the X-axis.

In at least one aspect, the spectacle lens satisfies following conditions (17) and (18):

$$P_0(\theta)<0 \tag{17}$$

$$D_1(0,\theta)<A_m \cdot P_0(\theta)+B_m \tag{18}$$

where $A_m=0.62n-0.40$, $B_m=20.09n-23.46$.

In this case, a following condition (19) may be satisfied when the angle θ is in a range of −90≦θ≦90:

$$\Delta P^-(5,\theta)<\Delta P^-(10,\theta)<\Delta P^-(15,\theta) \tag{19}$$

Each coefficient Am, Bm, Ap, Bp is obtained by defining four spherical lenses having refractive indexes of 1.5, 1.6, 1.7 and 1.8, obtaining coefficients of a regression line which is obtained when the linear regression is applied to a constant-aberration line of an aberration of 0 of each spherical lens while dividing the dioptric power into a plus dioptre region and a minus dioptre region, and further applying the liner regression to the obtained coefficients using a refractive index n.

The spectacle lens satisfying the condition (17) has a negative power, The spectacle lens satisfying the condition (18) uses a surface having a base curve which is shallower than a base curve of a spherical surface configured to suitably attain a prescribed spherical power SPH in regard to aberrations in the case where there is no inclination angle. That is, with regard to the spectacle lens having a negative power and a relatively shallow surface, it is possible to enhance the off-axis optical performance by designing the lens such that the aspheric amount becomes larger as the distance h from the Z-axis increases in a plane including the Z-axis and forming the angle θ with respect to the X-axis.

In at least one aspects the spectacle lens satisfies following conditions (17) and (20):

$$P_0(\theta)< \tag{17}$$

$$D_1(0,\theta)>A_m \cdot P_0(\theta)+B_m \tag{20}$$

where $A_m=0.62n-0.40$, $B_m=20.09n-23.46$.

In this case, a following condition (16) may be satisfied when the angle θ is in a range of 90≦θ≦270:

$$\Delta P^-(5,\theta)>\Delta P^-(10,\theta)>\Delta P^-(15,\theta) \tag{16}$$

The spectacle lens satisfying the condition (20) uses a surface having a base curve which is deeper than a base curve of a spherical surface configured to suitably attain a prescribed spherical power SPH in regard to aberrations in the case where there is no inclination angle. That is, with regard to the spectacle lens having a negative power and a relatively deep surface, it is possible to enhance the off-axis optical performance by designing the lens such that the aspheric amount becomes smaller as the distance h from the Z-axis increases in a plane including the Z-axis and forming the angle θ with respect to the X-axis.

In at least one aspect, the front surface is formed to be a spherical surface. By forming the front surface to be a spherical surface, it is possible to simplify the manufacturing process of the spectacle lens.

If the front surface of the spectacle lens is formed to be the spherical surface, the above mentioned conditions may be changed to the following conditions.

In at least one aspect, the spectacle lens satisfies following conditions (7) and (21):

$$P_0(0) > 0 \quad (7),$$

$$D_2(5,180) > D_2(5,0) \quad (21).$$

In this case, the condition (8) is changed to the condition (21).

In at least one aspect, the spectacle lens satisfies following conditions (9) and (22):

$$P_0(0) < 0 \quad (9),$$

$$D_2(5,180) < D_2(5,0) \quad (22).$$

In this case, the condition (10) is changed to the condition (22).

The conditions (11), (12) and (13) may be combined into one the following conditions (23) and (24).

In at least one aspect, the spectacle lens satisfies following conditions (7) and (23):

$$P_0(0) > 0 \quad (7),$$

$$D_2(0,0) - CYL \cdot \sin^2(AX) < D_2(0,90) - CYL \cdot \cos^2(AX) \quad (23).$$

In at least one aspect, the spectacle lens satisfies following conditions (9) and (24):

$$P_0(0) < 0 \quad (9),$$

$$D_2(0,0) - CYL \cdot \sin^2(AX) > D_2(0,90) - CYL \cdot \cos^2(AX) \quad (24).$$

A relationship the left side part of the condition (11)< the left side part of the condition (12) holds. Further, since the front surface is a spherical surface, $D_1(0,0) = D_1(0,90)$ holds. Therefore, by deleting terms including $D_1$ and SPH in the relationship, the condition (23) can be obtained. Similarly, since a relationship the left side part of the condition (13)> the left side part of the condition (12) and $D_1(0,0) = D_1(0,90)$ hold, the condition (24) can be obtained.

The conditions (16) and (19) can be changed to conditions (25), and (26), respectively.

In at least one aspect, the spectacle lens satisfies conditions (14) and (15):

$$P_0(\theta) > 0 \quad (14),$$

$$D_1(0,\theta) < A_p \cdot P_0(\theta) + B_p \quad (15)$$

where $A_p = 1.02n - 0.51$, $B_p = 13.24n - 14.79$.

In this case, condition (25) may be satisfied when the angle θ is in a range of $-90 \leq \theta \leq 90$:

$$D_2(5,\theta) > D_2(10,\theta) > D_2(15,\theta) \quad (25).$$

In at least one aspect, the spectacle lens satisfies following conditions (17) and (18) are satisfied:

$$P_0(\theta) < 0 \quad (17),$$

$$D_1(0,\theta) < A_m \cdot P_0(\theta) + B_m \quad (18)$$

where $A_m = 0.62n - 0.40$, $B_m = 20.09n - 23.46$.

In this case, a following condition (26) may be satisfied when the angle θ is in a range of $-90 \leq \theta \leq 90$:

$$D_2(5,\theta) < D_2(10,\theta) < D_2(15,\theta) \quad (26).$$

In at least one aspect, the spectacle lens satisfies following conditions (17) and (20):

$$P_0(\theta) < 0 \quad (17),$$

$$D_1(0,\theta) > A_m \cdot P_0(\theta) + B_m \quad (20)$$

where $A_m = 0.62n - 0.40$, $B_m = 20.09n - 23.46$.

In this case, a following condition (25) may be satisfied when the angle θ is in a range of $90 \leq \theta \leq 270$:

$$D_2(5,\theta) > D_2(10,\theta) > D_2(15,\theta) \quad (25).$$

According another aspect of the invention, there is provided Spectacles, which is provided with a frame having a front warpage angle more than or equal to 10°; and the above mentioned spectacle lens.

BRIEF DESCRIPTION OF THE ACCOMPANYING DRAWINGS

FIG. 68 shows specifications of the spectacle lenses according to the first through eighth examples and the first through eighth comparative examples.

DETAILED DESCRIPTION OF THE EMBODIMENTS

Hereinafter, an embodiment according to the invention is described with reference to the accompanying drawings.

Figure 1:
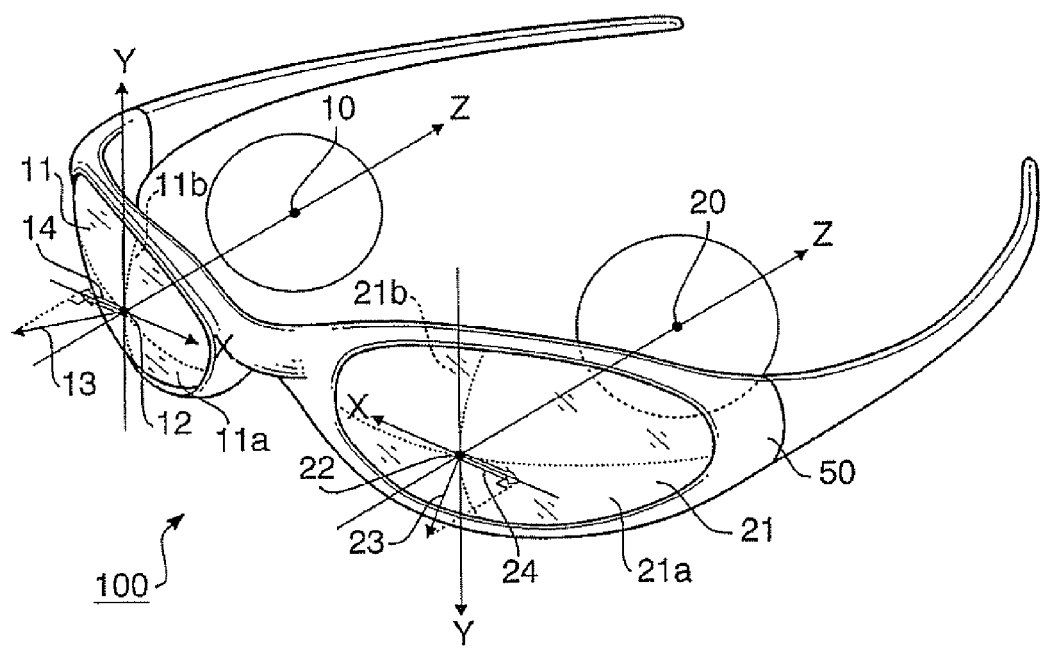
FIG. 1 is a perspective view of wrap-around spectacles in which spectacle lenses according to an embodiment of the invention are fitted.
Figure 2:
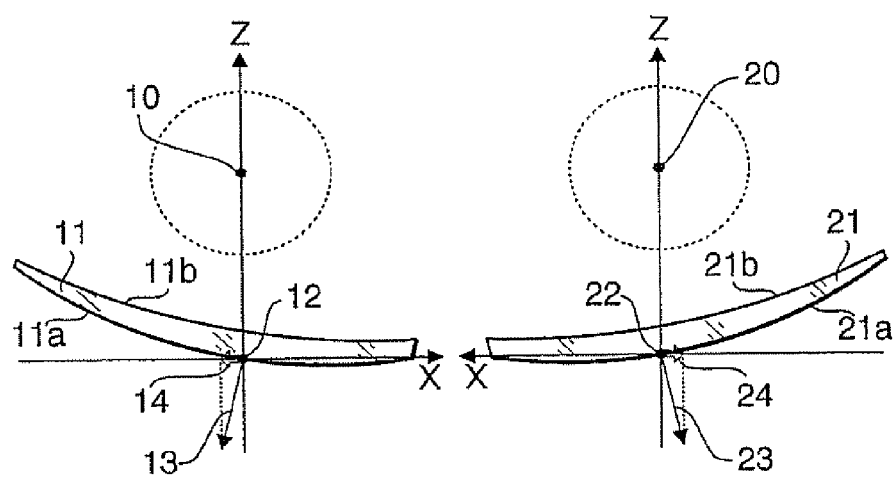
FIG. 2 is a cross-sectional view of the spectacle lenses viewed from the top side.

FIG. 1 is a perspective view of wrap-around spectacles 100 in which spectacle lenses 11 and 21 according to an embodiment of the invention are fitted. FIG. 2 is a cross-sectional view of the spectacle lenses 11 and 21 viewed from the top side. In each of FIGS. 1 and 2, eyes of a wearer are also illustrated so that a positional relationship between the eyes and the wrap-around spectacles 100 can be seen. The spectacles 100 have the spectacle lens 11 for the right eye, the spectacle lens 21 for the left eye, and a frame 50. The spectacle lens 11 has a front surface 11a and a back surface 11b. The spectacle lens 21 has a front surface 21a and a back surface 21b. Points 12 and 22 are respectively centration points of the spectacle lenses 11 and 21. An arrow 13 represents an outward normal line normal to the front surface 11a at the centration point 12. An arrow 23 represents an outward normal line normal to the front surface 21a at the centration point 22.

In the following, left hand coordinate systems are defined at the centration points 12 and 22 for the spectacle lenses 11 and 12, respectively. For the spectacle lens 11, the direction passing through the centration point 12 and a center of rotation 10 from the centration point 12 to the center of rotation 10 is defined as a Z-axis (a plus direction of the Z-axis), an axis which is orthogonal to the Z-axis and is substantially equal to a horizontal direction in a state where the spectacles 100 are worn by a wearer is defined as an X-axis, an axis which is orthogonal to the Z-axis and is substantially equal to a vertical direction in the state where the spectacles 100 are worn by the wearer is defined as a Y-axis. For the spectacle lens 21, the direction passing through the centration point 22 and a center of ration 20 from the centration point 22 to the center of ration 20 is defined as a Z-axis (a plus direction of the Z-axis), an axis which is orthogonal to the Z-axis and is substantially equal to a horizontal direction in a state where the spectacles 100 are worn by a wearer is defined as an X-axis, an axis which is orthogonal to the Z-axis and is substantially equal to a vertical direction in the state where the spectacles 100 are worn by the wearer is defined as a Y-axis. Each left-hand coordinate system is defined so that each of directions of orthographic projections 14 and 24 (which are represented by outline arrows in the coordinate systems, respectively) of the outward normal lines 13 and 23 to the respective X-Y plane is equal to a minus direction of the corresponding X-axis. In other words, FIG. 2 is a cross-section of the spectacles 100 defined in the X-Z planes.

The spectacle lens 11 is configured such that an angle formed between the outward normal line 13 and the Z-axis is larger than or equal to approximately 10°. The spectacle lens 21 is also configured such that an angle formed between the outward normal line 23 and the Z-axis is larger than or equal to approximately 10°. That is, the spectacle lenses 11 and 21 are suitably designed for the frame 50 having a large front warpage angle. In other words, each of the spectacle lenses 11 and 21 has an excellent wrapping property and is suitable for wrap-around spectacles.

Each of the back surfaces 11b and 21b of the spectacle lenses 11 and 21 is formed to be an aspherical surface. Further, the back surface 11b is configured such that a cross-section thereof defined in a plane (i.e., the X-Y plane) including the Z-axis and the outward normal line 13 is asymmetrical. Similarly, the back surface 21b is configured such that a cross-section thereof defined in a plane (i.e., the X-Y plane) including the Z-axis and the outward normal line 23 is asymmetrical. By configuring a cross-section of an aspherical surface to be asymmetrical, it is possible to sufficiently suppress asymmetric aberrations caused depending on an inclination angle at the centration point 12 (22).

For each of the left-hand coordinate systems, the curvatures of the cross-sections of the front and back surfaces defined by a plane which includes the Z-axis and forms an angle θ with respect to the X-axis are defined as $C_1(h,\theta)$ [dpt: dioptre] and $C_2(h,\theta)$ [dpt], respectively, where h represents a distance [mm] from the Z-axis. A thickness of a lens at the centration point is represented as t [mm], a refractive index of medium of the spectacle lens is represented as n, a prescribed spherical power is represented as SPH [dpt], a prescribed cylindrical power is represented as CYL [dpt], and a cylinder axis measured in a counterclockwise direction with respect to the X-axis is represented as AX [°].

By the above mentioned definitions, the cross-section surface power $D_1(h,\theta)$ of the front surface is defined as:

$$D_1(h,\theta)=(n-1)\cdot C_1(h,\theta) \qquad (1),$$

the cross-section surface power $D_2(h,\theta)$ of the back surface is defined as:

$$D_2(h,\theta)=(1-n)\cdot C_2(h,\theta) \qquad (2),$$

the amount $P^\sim(h,\theta)$ regarding vertex power is defined as:

$$P^\sim(h,\theta)=D_1(h,\theta)/\{1-D_1(h,\theta)\cdot t/1000/n\}+D_2(h,\theta) \qquad (3),$$

a prescribed dioptric power for a lens center and paraxial rays is defined:

$$P_0(\theta)=SPH+CYL\cdot\sin^2(\theta-AX) \qquad (4),$$

the amount $\Delta P^\sim(h,\theta)$ regarding an aspheric amount is defined as:

$$\Delta P^\sim(h,\theta)=P^\sim(h,\theta)-P_0(\theta) \qquad (5).$$

Since the amount $\Delta P^\sim(h,\theta)$ can be regarded as a sum of aspheric amounts of the front and back surfaces, the amount $\Delta P^\sim(h,\theta)$ is simply referred to as an aspheric amount hereafter.

Figure 3:
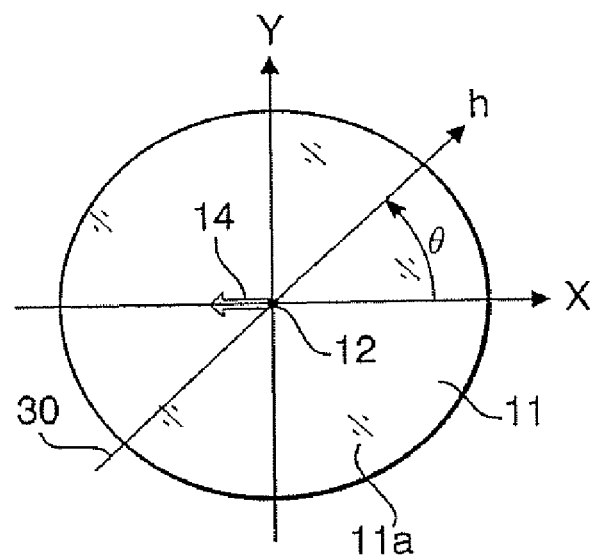
FIG. 3 is a front view of the spectacle lens viewed from the front side.

Hereafter, eight concrete examples of the spectacle lens according to the embodiment will be described. The following explanations are given principally for the spectacle lens 11 for the right eye. FIG. 3 is a front view of the spectacle lens 11 viewed from the front side. In FIG. 3, the angle θ is an angle which the plane 30 including the Z-axis forms with respect to the plus side of the X-axis in a counterclockwise direction, and "h" represents a distance from the Z-axis. "h" becomes larger at a point closer to the rim of the spectacle lens 11. In each of the following examples, the spectacle lens 11 is made of medium having a refractive index of 1.600, and the outer diameter (lens size) of the spectacle lens 11 is 70.0 [mm].

FIRST EXAMPLE

Figure 4:
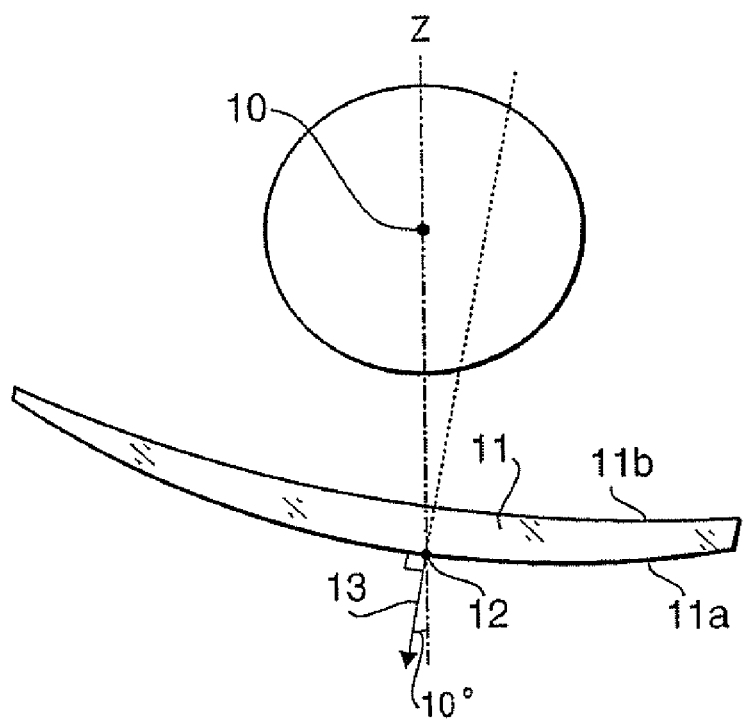
FIG. 4 is a cross-section of the spectacle tens according to a first example defined in a X-Z plane.
Figure 5:
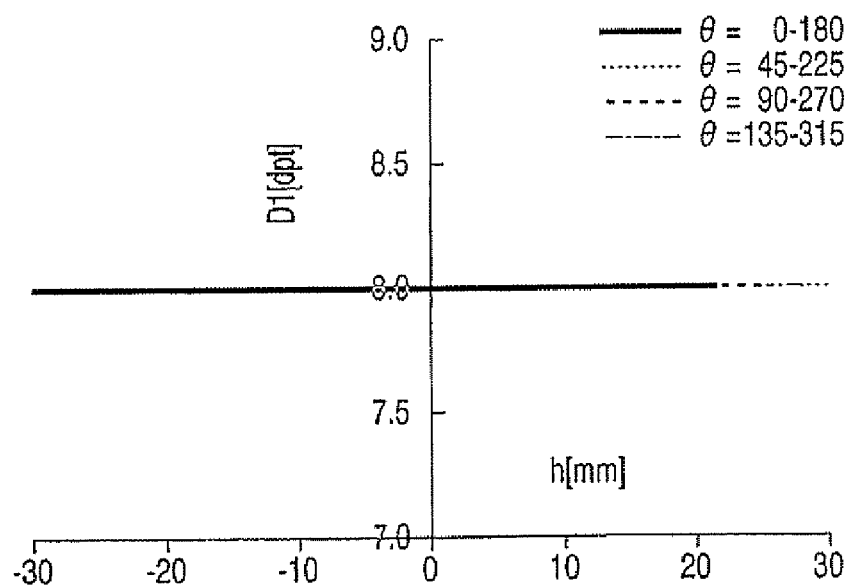
FIG. 5 is a graph of the cross-section surface power of a front surface of the spectacle lens according to the first example.
Figure 6:
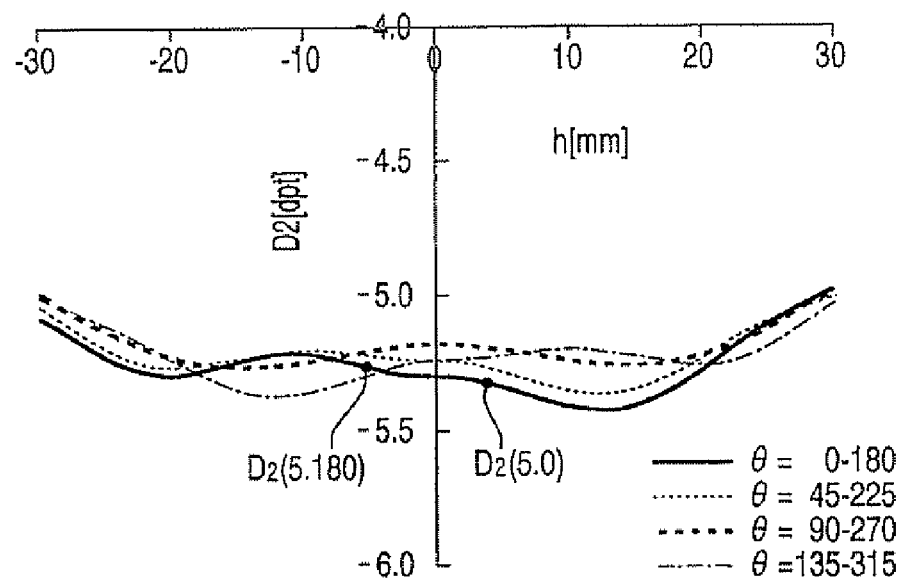
FIG. 6 is a graph of the cross-section surface power of a back surface of the spectacle lens according to the first example.

FIG. 4 is a cross-section of the spectacle lens 11 according to a first example defined in the X-Z plane. The spectacle lens 11 according to the first example is configured such that the angle formed between the outward normal line 13 and the Z-axis (i.e., a front warpage angle) is 10°. FIG. 5 is a graph of the cross-section surface power $D_1$ of the front surface 11a with respect to the distance h and the angle θ. As shown in FIG. 5, the front surface 11a of the spectacle lens 11 is formed as a spherical surface. FIG. 6 is a graph of the cross-section surface power $D_2$ of the back surface 11b with respect to the distance h and the angle θ. As shown in FIG. 6, the back surface 11b is formed as an aspherical surface having the cross-section surface power which varies depending on the values of the distance h and the angle θ.

Figure 7:
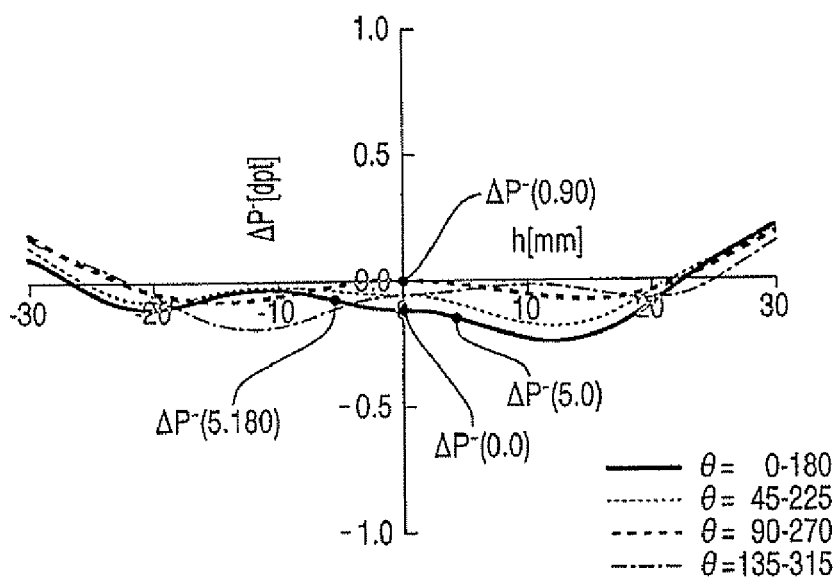
FIG. 7 is a graph illustrating the aspheric amount ΔP~ of the spectacle lens according to the first example.

FIG. 7 is a graph illustrating the aspheric amount $\Delta P^\sim$ with respect to the distance h and the angle θ. The aspheric amount is obtained by using the cross-section surface power $D_1$ and $D_2$ of the front and back surfaces 11a and 11b.

Table 1 shows the numerical configuration of the spectacle lens 11 according to the first example. In Table 1 (and in the following similar tables), $P^\sim$ represents an amount regarding a vertex power, and $P_0$ represents prescribed dioptric power for a lens center and paraxial rays.

TABLE 1

| | h | θ=0 | 45 | 90 | 135 | 180 | 225 | 270 | 315 |
|---|---|---|---|---|---|---|---|---|---|
| $D_1$ | 0 | 8.00 | 8.00 | 8.00 | 8.00 | 8.00 | 8.00 | 8.00 | 8.00 |
| | 5 | 8.00 | 8.00 | 8.00 | 8.00 | 8.00 | 8.00 | 8.00 | 8.00 |
| | 10 | 8.00 | 8.00 | 8.00 | 8.00 | 8.00 | 8.00 | 8.00 | 8.00 |
| | 15 | 8.00 | 8.00 | 8.00 | 8.00 | 8.00 | 8.00 | 8.00 | 8.00 |
| | 20 | 8.00 | 8.00 | 8.00 | 8.00 | 8.00 | 8.00 | 8.00 | 8.00 |
| $D_2$ | 0 | −5.29 | −5.23 | −5.17 | −5.23 | −5.29 | −5.23 | −5.17 | −5.23 |
| | 5 | −5.34 | −5.28 | −5.19 | −5.22 | −5.26 | −5.22 | −5.19 | −5.28 |
| | 10 | −5.41 | −5.35 | −5.23 | −5.20 | −5.21 | −5.20 | −5.23 | −5.35 |
| | 15 | −5.40 | −5.34 | −5.25 | −5.22 | −5.23 | −5.22 | −5.25 | −5.34 |
| | 20 | −5.27 | −5.22 | −5.22 | −5.25 | −5.28 | −5.25 | −5.22 | −5.22 |
| P~ | 0 | 2.89 | 2.94 | 3.00 | 2.94 | 2.89 | 2.94 | 3.00 | 2.94 |
| | 5 | 2.84 | 2.90 | 2.98 | 2.96 | 2.92 | 2.96 | 2.98 | 2.90 |
| | 10 | 2.76 | 2.82 | 2.94 | 2.98 | 2.97 | 2.98 | 2.94 | 2.82 |
| | 15 | 2.78 | 2.83 | 2.92 | 2.95 | 2.94 | 2.95 | 2.92 | 2.83 |
| | 20 | 2.91 | 2.95 | 2.96 | 2.92 | 2.90 | 2.92 | 2.96 | 2.95 |
| $P_0$ | | 3.00 | 3.00 | 3.00 | 3.00 | 3.00 | 3.00 | 3.00 | 3.00 |
| ΔP~ | 0 | −0.11 | −0.06 | 0.00 | −0.06 | −0.11 | −0.06 | 0.00 | −0.06 |
| | 5 | −0.16 | −0.10 | −0.02 | −0.04 | −0.08 | −0.04 | −0.02 | −0.10 |
| | 10 | −0.24 | −0.18 | −0.06 | −0.02 | −0.03 | −0.02 | −0.06 | −0.18 |
| | 15 | −0.22 | −0.17 | −0.08 | −0.05 | −0.06 | −0.05 | −0.08 | −0.17 |
| | 20 | −0.09 | −0.05 | −0.04 | −0.08 | −0.10 | −0.08 | −0.04 | −0.05 |

As shown in FIG. 7 and Table 1, the spectacle lens 11 according to the first example satisfies a condition (6) in a range of 5<h<20.

$$\Delta P^\sim(h,0) \neq \Delta P^\sim(h,180) \quad (6)$$

That is, the cross-section of the back surface 11b is rotationally asymmetrical. As shown in Table 1, $P_0(0)$ is 3.00. Therefore, the spectacle lens 11 satisfies a condition (7).

$$P_0(0) > 0 \quad (7)$$

As shown in FIG. 7 and Table 1, the spectacle lens according to the first example satisfies a condition (8).

$$\Delta P^\sim(5,180) > \Delta P^\sim(5,0) \quad (8)$$

The spectacle lens 11 according to the first example satisfies conditions (11) and (12).

$$\Delta P^\sim(0,0) < 0 \quad (11)$$

$$\Delta P^\sim(0,90) \cong 0 \quad (12)$$

As described above, the front surface 11a is formed as a spherical surface. Therefore, as shown in FIG. 6 and Table 1, the spectacle lens 11 according to the first example satisfies a condition (21).

$$D_2(5,180) > D_2(5,0) \quad (21)$$

Since the spectacle lens 11 satisfies the conditions (11) and (12), the spectacle lens 11 according to the first example satisfies a condition (23).

$$D_2(0,0) - CYL \cdot \sin^2(AX) < D_2(0,90) - CYL \cdot \cos^2(AX) \quad (23)$$

Figure 8:
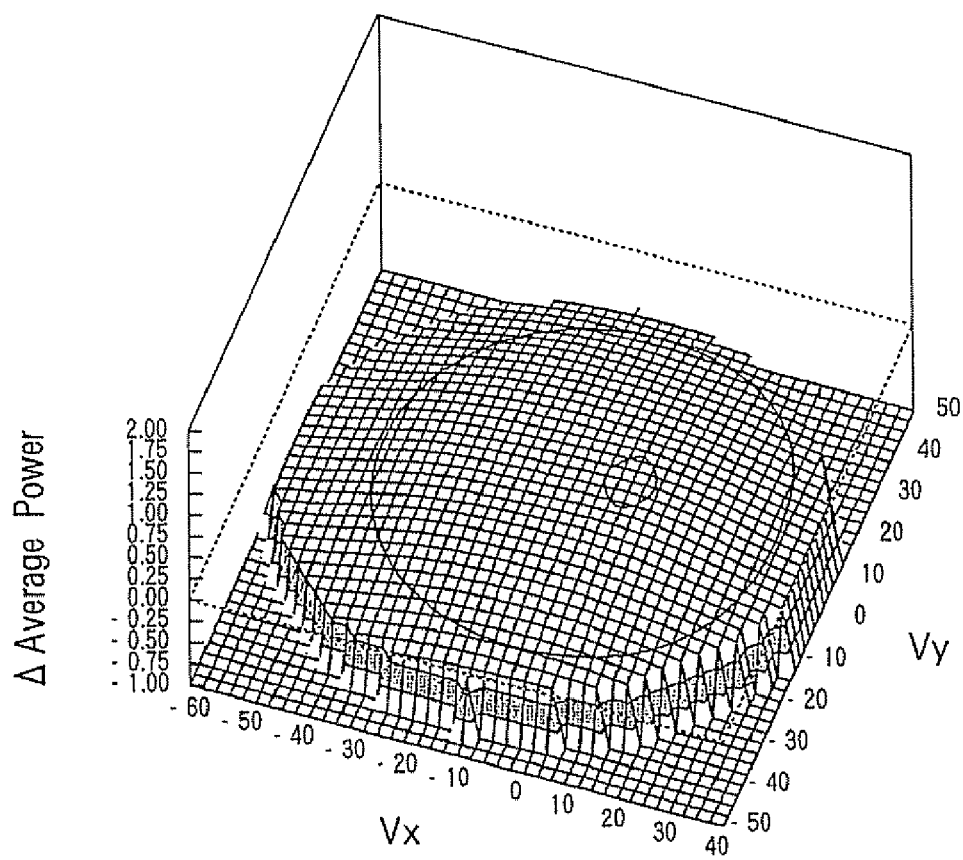
FIG. 8 shows a contour map of an average power error of the spectacle lens according to the first example.
Figure 9:
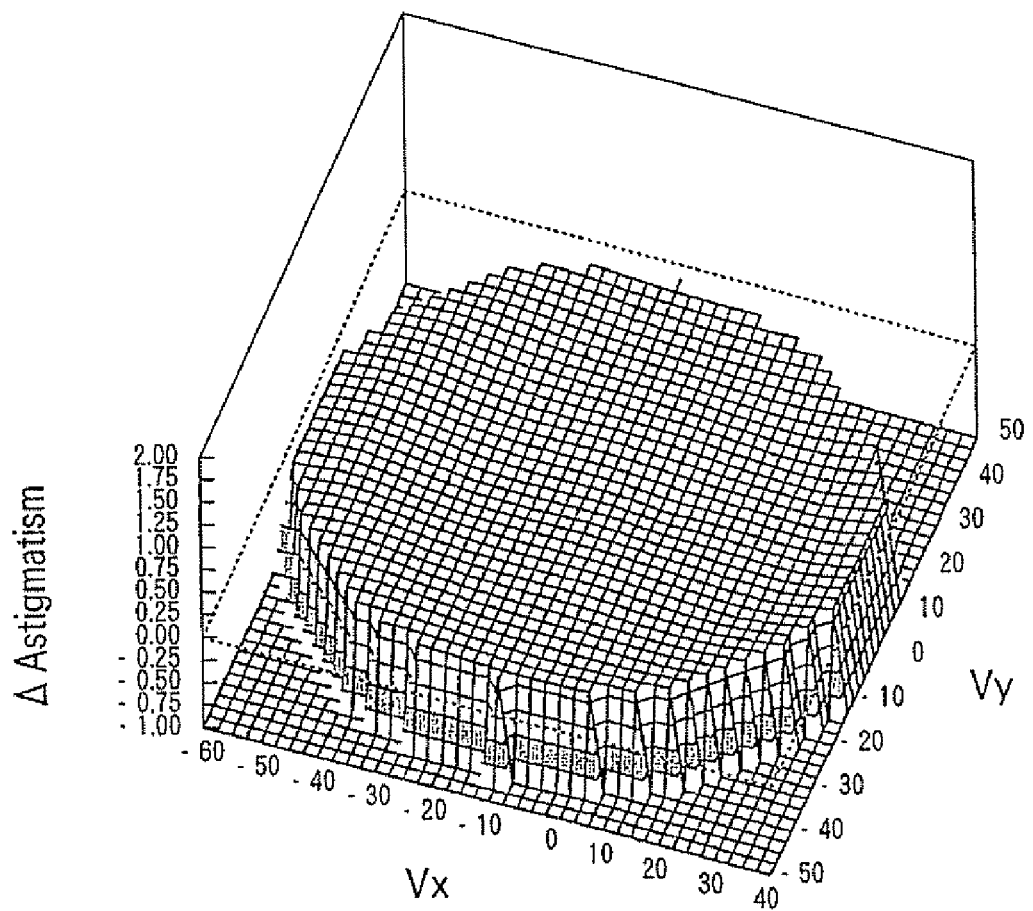
FIG. 9 shows a contour map of astigmatism of the spectacle lens according to the first example.
Figure 10:
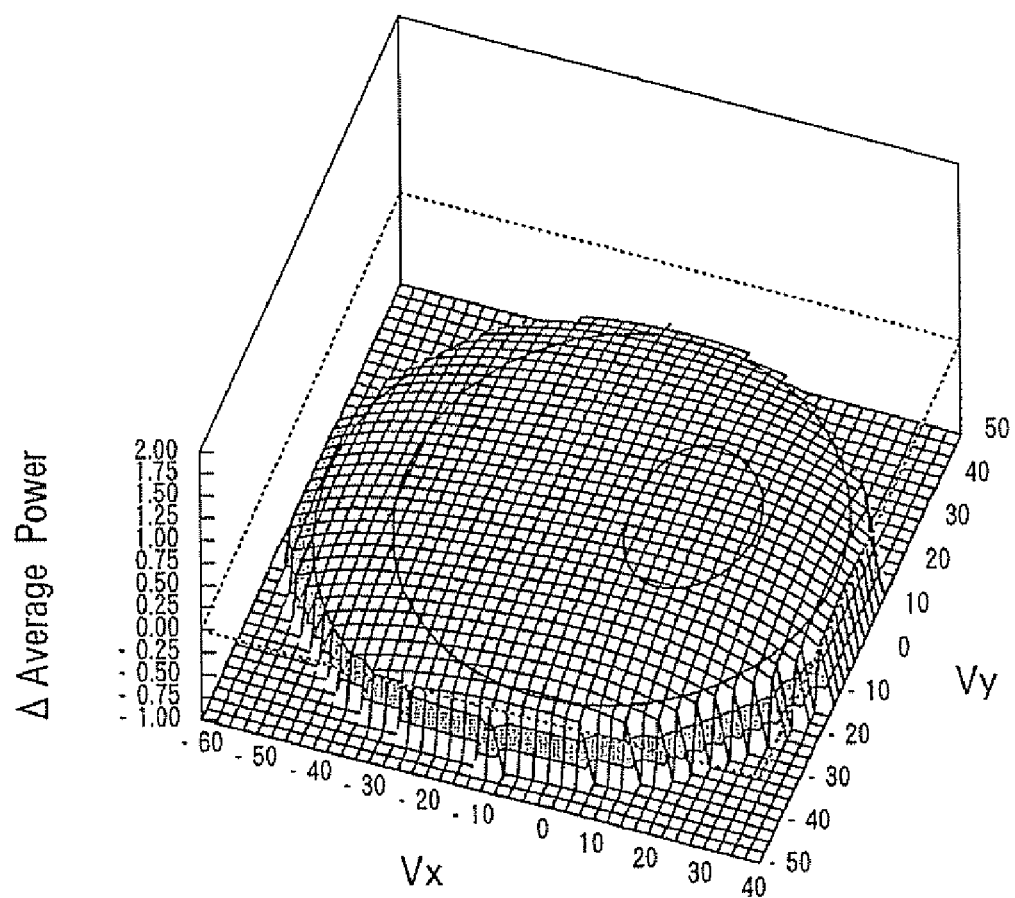
FIG. 10 shows a contour map of an average power error of a first comparative example.
Figure 11:
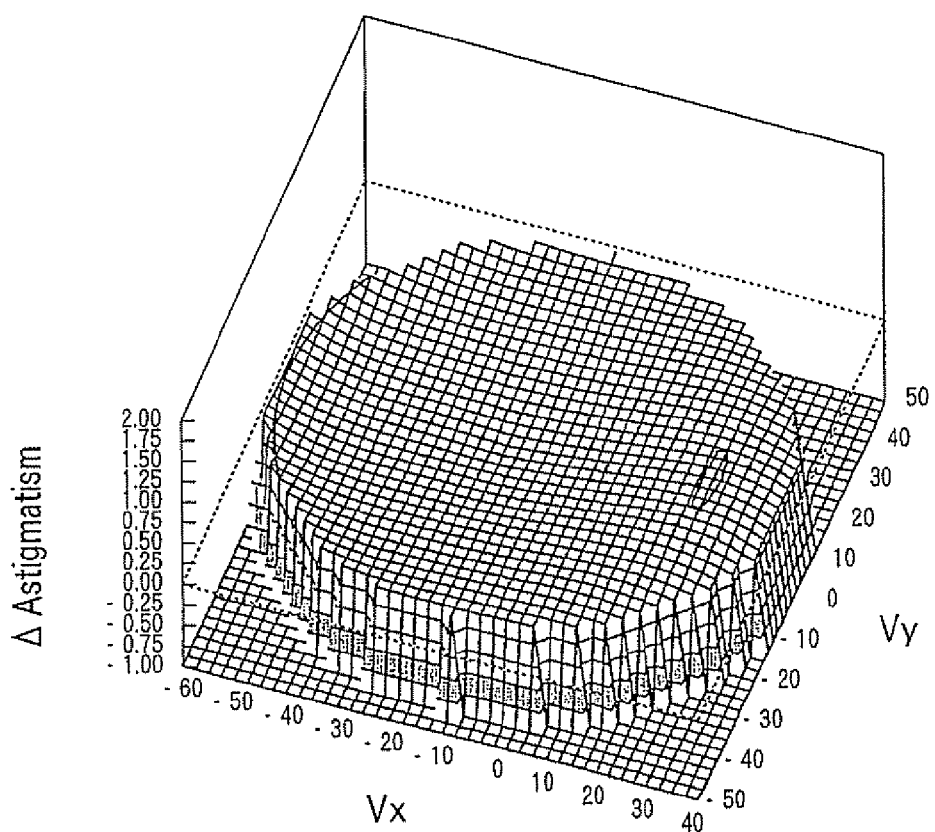
FIG. 11 shows a contour map of astigmatism of the spectacle lens according to the first comparative example.
Figure 12:
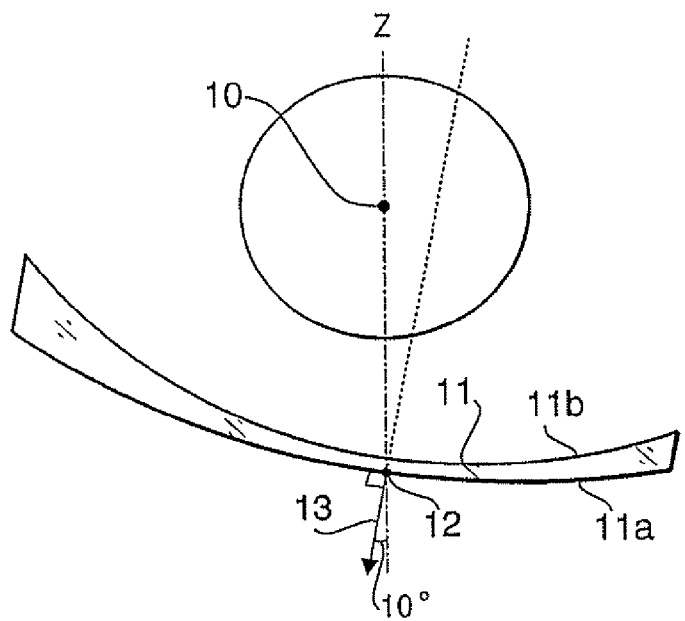
FIG. 12 is a cross-section of the spectacle lens according to a second example defined in the X-Z plane.

FIG. 8 shows a contour map of an average power error of the spectacle lens 11 according to the first example. FIG. 9 shows a contour map of astigmatism of the spectacle lens 11 according to the first example. FIG. 10 shows a contour map of an average power error of a spectacle lens having a back surface configured to be a spherical surface (a first comparative example). FIG. 11 shows a contour map of astigmatism of the spectacle lens (the first comparative example) having a back surface configured to be a spherical surface. As can be seen from the comparison between FIG. 8 and FIG. 10 and the comparison between FIG. 9 and FIG. 11, the spectacle lens 11 according to the first example achieves a balance between the average power error and the astigmatism while reducing the average power error and the astigmatism to minimums, respectively. It is understood that the spectacle lens according to the first example has more suitable optical performance than a conventional spectacle lens.

SECOND EXAMPLE

Figure 13:
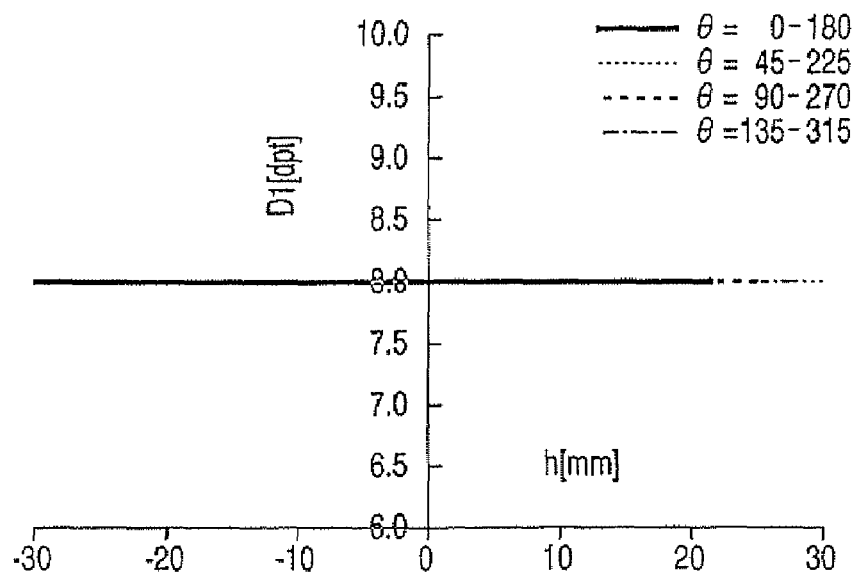
FIG. 13 is a graph of the cross-section surface power of a front surface of the spectacle lens according to the second example.
Figure 14:
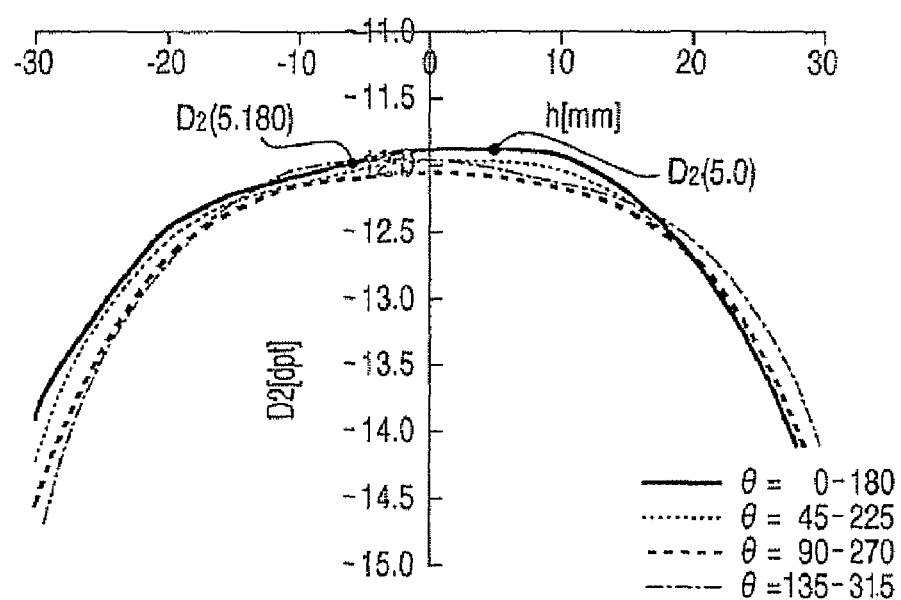
FIG. 14 is a graph of the cross-section surface power of a back surface of the spectacle lens according to the second example.

FIG. 2 is a cross-section of the spectacle lens 11 according to a second example define in the X-Z plane. The spectacle lens 11 according to the second example is configured such that the angle formed between the outward normal line 13 and the Z-axis (i.e., a front warpage angle) is 10°. FIG. 13 is a graph of the cross-section surface power $D_1$ of the front surface 11a with respect to the distance h and the angle θ. As shown in FIG. 13, the front surface 11a of the spectacle lens 11 is formed as a spherical surface. FIG. 14 is a graph of the cross-section surface power $D_2$ of the back surface 11b with respect to the distance h and the angle θ. As shown in FIG. 14, the back surface 11b is formed as an aspherical surface having the cross-section surface power which varies depending on the values of the distance h and the angle θ.

Figure 15:
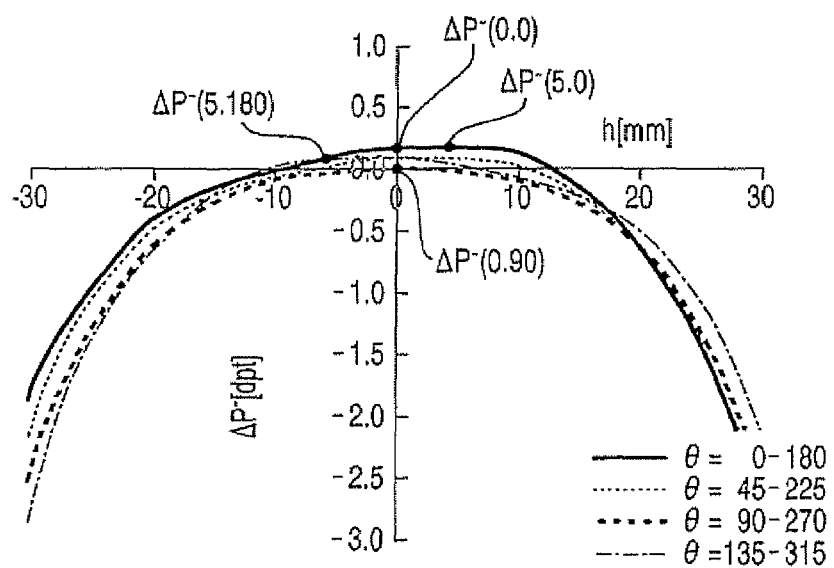
FIG. 15 is a graph illustrating the aspheric amount ΔP~ of the spectacle lens according to the second example.

FIG. 15 is a graph illustrating the aspheric amount $\Delta P^\sim$ with respect to the distance h and the angle θ. The aspheric amount is obtained by using the cross-section surface power $D_1$ and $D_2$ of the front and back surfaces 11a and 11b.

Table 2 shows the numerical configuration of the spectacle lens 11 according to the second example.

TABLE 2

| | h | θ=0 | 45 | 90 | 135 | 180 | 225 | 270 | 315 |
|---|---|---|---|---|---|---|---|---|---|
| $D_1$ | 0 | 8.00 | 8.00 | 8.00 | 8.00 | 8.00 | 8.00 | 8.00 | 8.00 |
| | 5 | 8.00 | 8.00 | 8.00 | 8.00 | 8.00 | 8.00 | 8.00 | 8.00 |
| | 10 | 8.00 | 8.00 | 8.00 | 8.00 | 8.00 | 8.00 | 8.00 | 8.00 |
| | 15 | 8.00 | 8.00 | 8.00 | 8.00 | 8.00 | 8.00 | 8.00 | 8.00 |
| | 20 | 8.00 | 8.00 | 8.00 | 8.00 | 8.00 | 8.00 | 8.00 | 8.00 |
| $D_2$ | 0 | −11.89 | −11.97 | −12.06 | −11.97 | −11.89 | −11.97 | −12.06 | −11.97 |
| | 5 | −11.89 | −11.97 | −12.08 | −12.03 | −11.96 | −12.03 | −12.08 | −11.97 |
| | 10 | −11.93 | −12.04 | −12.15 | −12.13 | −12.07 | −12.13 | −12.15 | −12.04 |
| | 15 | −12.21 | −12.28 | −12.34 | −12.27 | −12.21 | −12.27 | −12.34 | −12.28 |

TABLE 2-continued

| | | θ | | | | | | | |
|---|---|---|---|---|---|---|---|---|---|
| | h | 0 | 45 | 90 | 135 | 180 | 225 | 270 | 315 |
| | 20 | −12.69 | −12.73 | −12.69 | −12.57 | −12.47 | −12.57 | −12.69 | −12.73 |
| P~ | 0 | −3.83 | −3.91 | −3.99 | −3.91 | −3.83 | −3.91 | −3.99 | −3.91 |
| | 5 | −3.83 | −3.91 | −4.02 | −3.96 | −3.90 | −3.96 | −4.02 | −3.9e1 |
| | 10 | −3.87 | −3.98 | −4.09 | −4.07 | −4.01 | −4.07 | −4.09 | −3.98 |
| | 15 | −4.15 | −4.21 | −4.28 | −4.21 | −4.15 | −4.21 | −4.28 | −4.21 |
| | 20 | −4.63 | −4.67 | −4.63 | −4.50 | −4.41 | −4.50 | −4.63 | −4.67 |
| $P_0$ | | −4.00 | −4.00 | −4.00 | −4.00 | −4.00 | −4.00 | −4.00 | −4.00 |
| ΔP~ | 0 | 0.17 | 0.09 | 0.01 | 0.09 | 0.17 | 0.09 | 0.01 | 0.09 |
| | 5 | 0.17 | 0.09 | −0.02 | 0.04 | 0.10 | 0.04 | −0.02 | 0.09 |
| | 10 | 0.13 | 0.02 | −0.09 | −0.07 | −0.01 | −0.07 | −0.09 | 0.02 |
| | 15 | −0.15 | −0.21 | −0.28 | −0.21 | −0.15 | −0.21 | −0.28 | −0.21 |
| | 20 | −0.63 | −0.67 | −0.63 | −0.50 | −0.41 | −0.50 | −0.63 | −0.67 |

As shown in FIG. 15 and Table 2, the spectacle lens 11 according to the second example satisfies the condition (6) in a range of 5<h<20. That is, the cross-section of the back surface 11b is rotationally asymmetrical. As shown in Table 2, $P_0(0)$ is −4.00. Therefore, the spectacle lens 11 is a minus lens which satisfies a condition (9).

$$P_0(0)<0 \quad (9)$$

As shown in FIG. 15 and Table 2, the spectacle lens according to the second example satisfies a condition (10).

$$\Delta P\tilde{}(5,180)<\Delta P\tilde{}(5,0) \quad (10)$$

The spectacle lens 11 according to the second example satisfies conditions (12) and (13).

$$\Delta P\tilde{}(0,90)\approx 0 \quad (12)$$

$$\Delta P\tilde{}(0,0)>0 \quad (13)$$

As shown in Table 2, the spectacle lens 11 according to the second example satisfies a condition (20).

$$D_1(0,\theta)>A_m \cdot P_0(\theta)+B_m \quad (20)$$

As shown in FIG. 15 and Table 2, the spectacle lens 11 satisfies a condition (16) when the angle θ is between 90° and 270°.

$$\Delta P\tilde{}(5,\theta)>\Delta P\tilde{}(10,\theta)>\Delta P\tilde{}(15,\theta) \quad (16)$$

As described above, the front surface 11a is formed as a spherical surface. Therefore, as shown in FIG. 14 and Table 2, the spectacle lens 11 according to the second example satisfies a condition (22).

$$D_2(5,180)<D_2(5,0) \quad (22)$$

Since the spectacle lens 11 satisfies the conditions (12) and (13), the spectacle lens 11 according to the second example satisfies a condition (24).

$$D_2(0,0)-CYL \cdot \sin^2(AX)>D_2(0,90)-CYL \cdot \cos^2(AX) \quad (24)$$

As can be seen from FIG. 14 and Table 2, a condition (25) corresponding to the condition (16) is also satisfied.

$$D_2(5,\theta)>D_2(10,\theta)>D_2(15,\theta) \quad (25)$$

Figure 16:
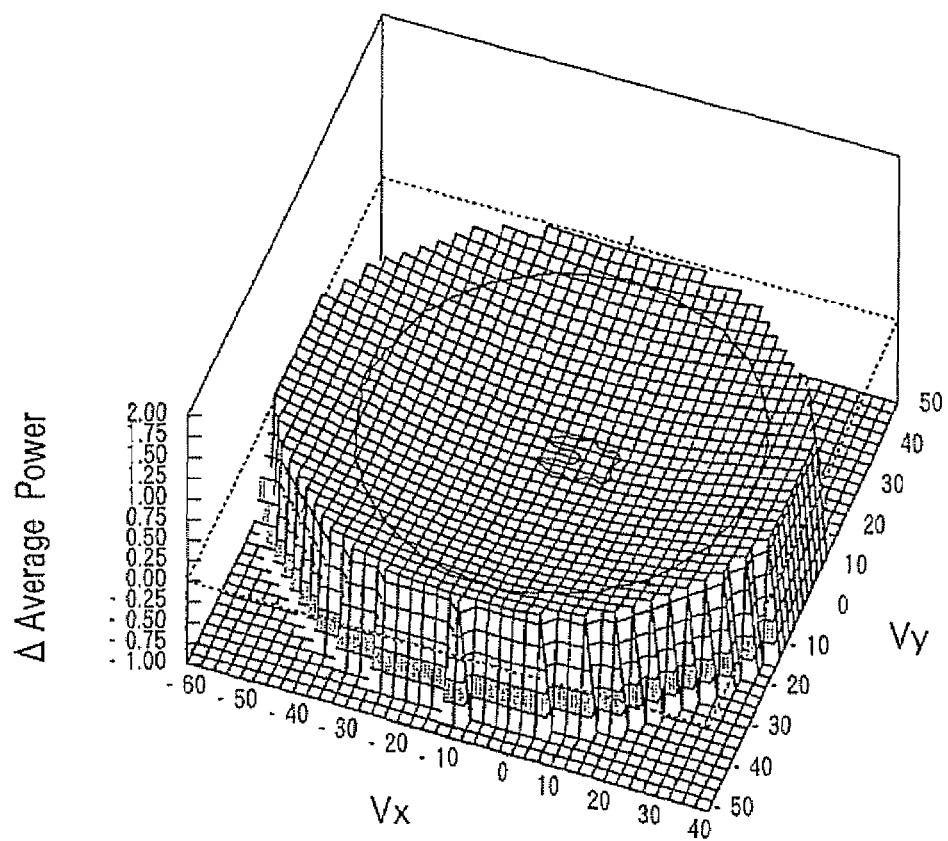
FIG. 16 shows a contour map of an average power error of the spectacle lens according to the second example.
Figure 17:
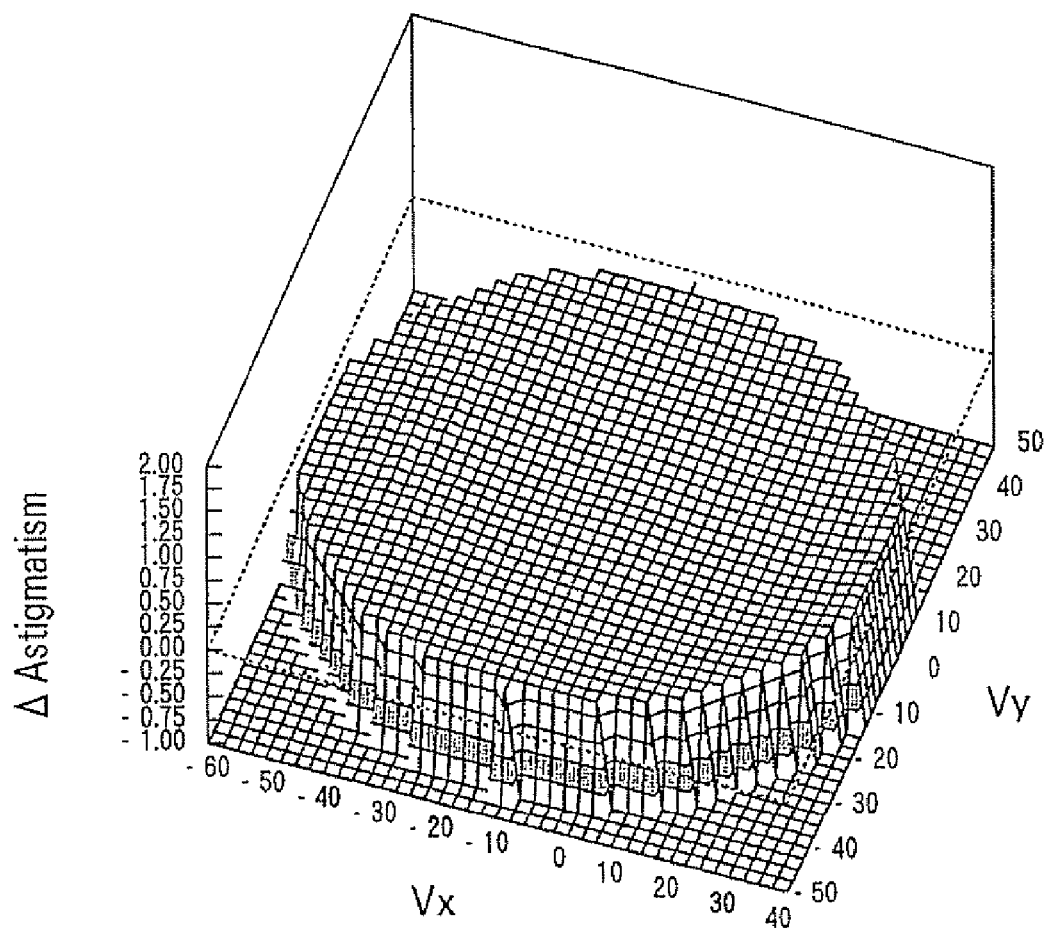
FIG. 17 shows a contour map of astigmatism of the spectacle lens according to the second example.
Figure 18:
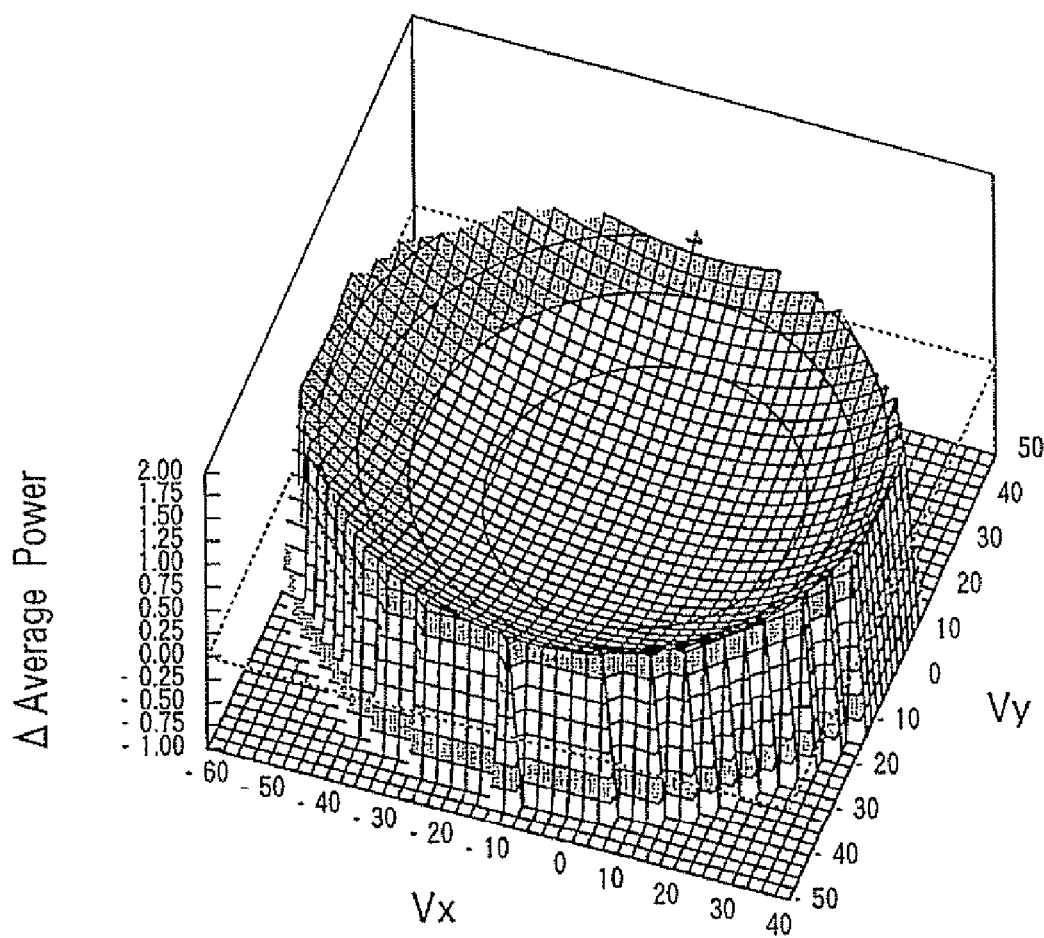
FIG. 18 shows a contour map of an average power error of a second comparative example.
Figure 19:
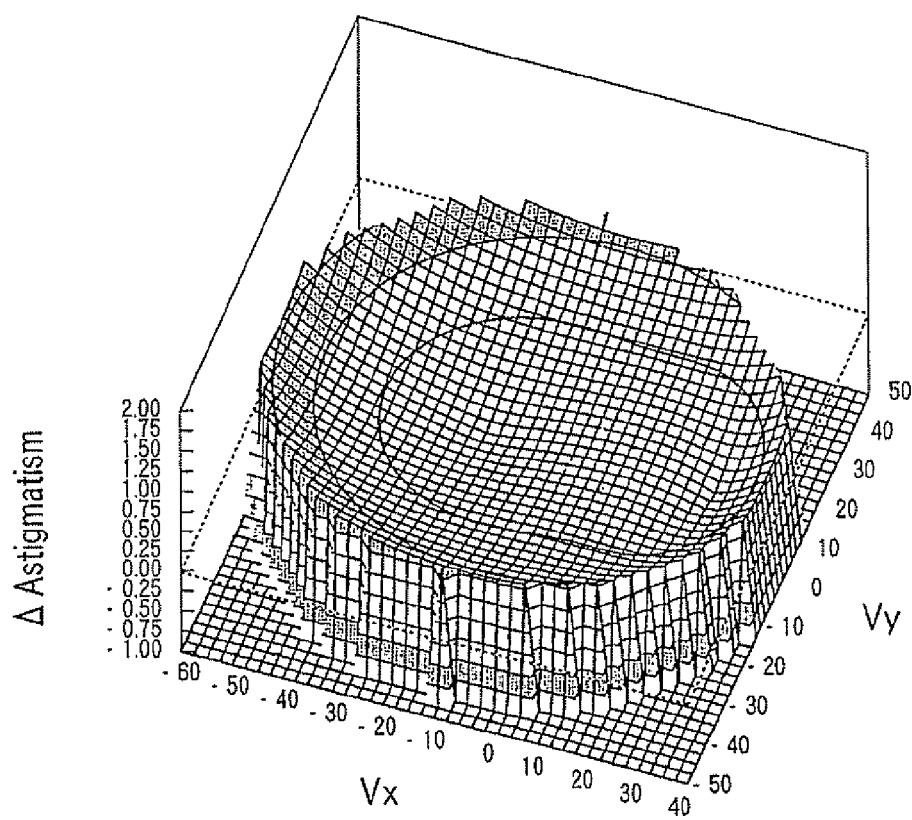
FIG. 19 shows a contour map of astigmatism of the spectacle lens according to the second comparative example.

FIG. 16 shows a contour map of an average power error of the spectacle lens 11 according to the second example. FIG. 17 shows a contour map of astigmatism of the spectacle lens 11 according to the second example. FIG. 18 shows a contour map of an average power error of a spectacle lens having a back surface configured to be a spherical surface (i.e., a second comparative example). FIG. 19 shows a contour map of astigmatism of the spectacle lens (the second comparative example) having a back surface configured to be a spherical surface. As can be seen from the comparison between FIG. 16 and FIG. 18 and the comparison between FIG. 17 and FIG. 19, the spectacle lens 11 according to the second example achieves a balance between the average power error and the astigmatism while reducing the average power error and the astigmatism to minimums, respectively, It is understood that the spectacle lens according to the second example has more suitable optical performance than a conventional spectacle lens.

Since the spectacle lens 11 according to the second example further satisfies the condition (20), a base curve, which is deeper than a base curve of a spherical surface configured to suitably attain a prescribed spherical power in regard to aberrations in the case where there is no inclination angle, is employed in the second example. However, by satisfying the condition (16) when the angle θ is in a predetermined range, it is possible to attain suitable off-axis optical performance.

THIRD EXAMPLE

Figure 20:
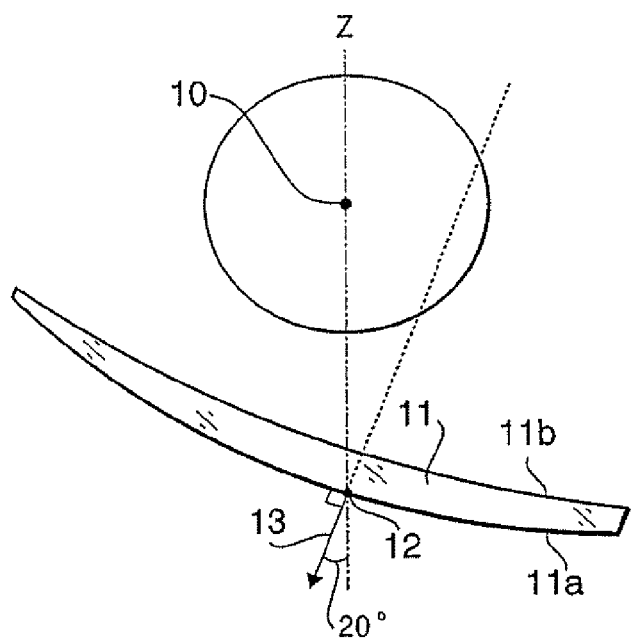
FIG. 20 is a cross-section of the spectacle lens according to a third example defined in the X-Z plane.
Figure 21:
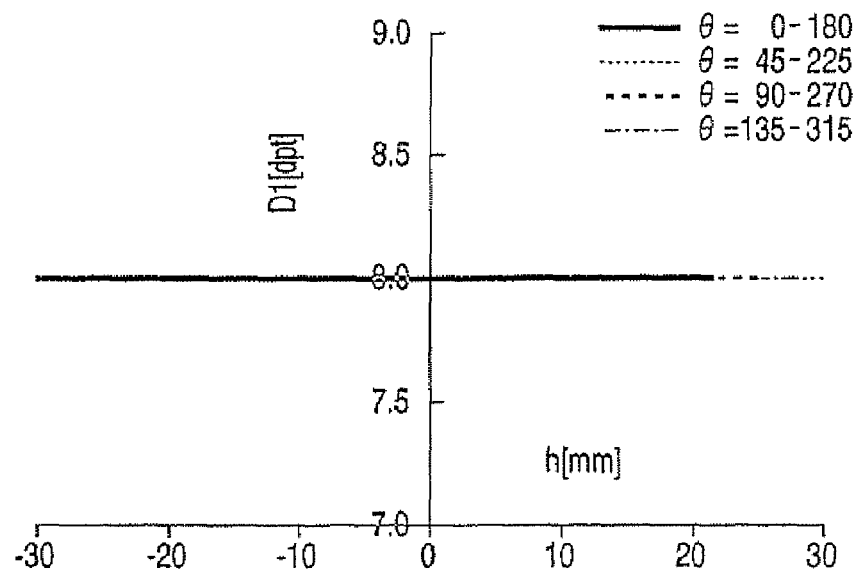
FIG. 21 is a graph of the cross-section surface power of a front surface of the spectacle lens according to the third example.
Figure 22:
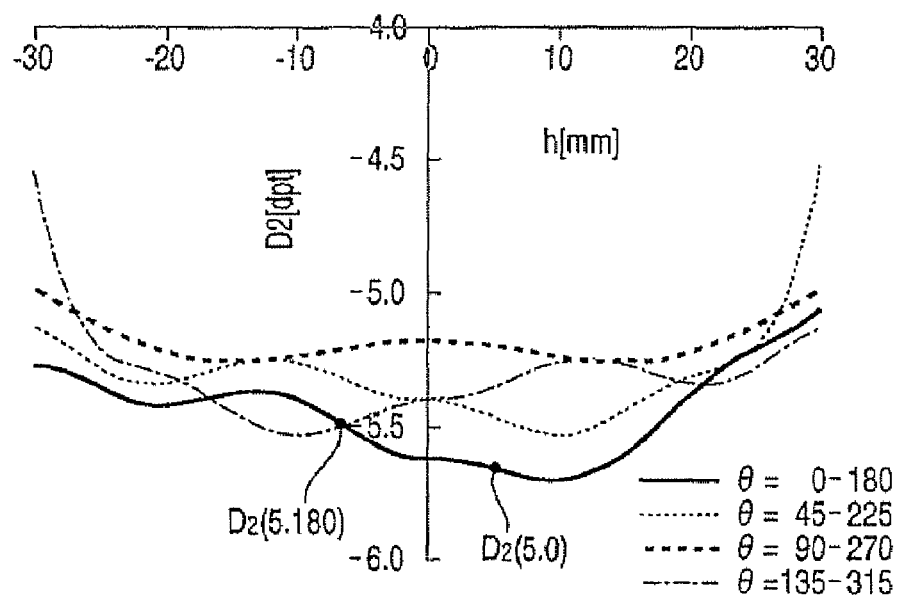
FIG. 22 is a graph of the cross-section surface power of a back surface of the spectacle lens according to the third example.

FIG. 20 is a cross-section of the spectacle lens 11 according to a third example defined in the X-Z plane. The spectacle lens 11 according to the third example is configured such that the angle formed between the outward normal line 13 and the Z-axis (i.e.; a front warpage angle) at the centration point 12 is 20°. FIG. 21 is a graph of the cross-section surface power $D_1$ of the front surface 11a with respect to the distance h and the angle θ. As shown in FIG. 21, the front surface 11a of the spectacle lens 11 is formed as a spherical surface. FIG. 22 is a graph of the cross-section surface power $D_2$ of the back surface 11b with respect to the distance h and the angle θ. As shown in FIG. 22, the back surface 11b is formed as an aspherical surface having the cross-section surface power which varies depending on the values of the distance h and the angle θ.

Figure 23:
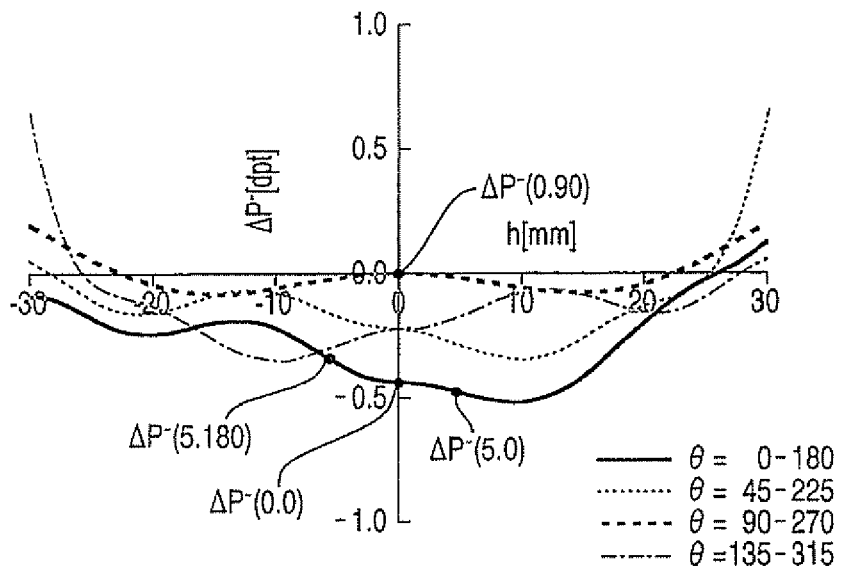
FIG. 23 is a graph illustrating the aspheric amount $\Delta P^\sim$ of the spectacle lens according to the third example.

FIG. 23 is a graph illustrating the aspheric amount ΔP~ with respect to the distance h and the angle θ. The aspheric amount is obtained by using the cross-section surface power $D_1$ and $D_2$ of the front and back surfaces 11a and 11b.

Table 3 shows the numerical configuration of the spectacle lens 11 according to the third example.

TABLE 3

|   |   | θ | | | | | | | |
|---|---|---|---|---|---|---|---|---|---|
| | h | 0 | 45 | 90 | 135 | 180 | 225 | 270 | 315 |
| $D_1$ | 0 | 8.00 | 8.00 | 8.00 | 8.00 | 8.00 | 8.00 | 8.00 | 8.00 |
| | 5 | 8.00 | 8.00 | 8.00 | 8.00 | 8.00 | 8.00 | 8.00 | 8.00 |
| | 10 | 8.00 | 8.00 | 8.00 | 8.00 | 8.00 | 8.00 | 8.00 | 8.00 |
| | 15 | 8.00 | 8.00 | 8.00 | 8.00 | 8.00 | 8.00 | 8.00 | 8.00 |
| | 20 | 8.00 | 8.00 | 8.00 | 8.00 | 8.00 | 8.00 | 8.00 | 8.00 |
| $D_2$ | 0 | −5.61 | −5.39 | −5.17 | −5.39 | −5.61 | −5.39 | −5.17 | −5.39 |
| | 5 | −5.65 | −5.46 | −5.19 | −5.34 | −5.53 | −5.34 | −5.19 | −5.46 |
| | 10 | −5.69 | −5.52 | −5.23 | −5.25 | −5.39 | −5.25 | −5.23 | −5.52 |
| | 15 | −5.59 | −5.44 | −5.25 | −5.26 | −5.37 | −5.26 | −5.25 | −5.44 |
| | 20 | −5.37 | −5.31 | −5.22 | −5.33 | −5.42 | −5.33 | −5.22 | −5.31 |
| P~ | 0 | 2.56 | 2.78 | 3.00 | 2.78 | 2.56 | 2.78 | 3.00 | 2.78 |
| | 5 | 2.52 | 2.71 | 2.98 | 2.83 | 2.64 | 2.83 | 2.98 | 2.71 |
| | 10 | 2.48 | 2.65 | 2.94 | 2.92 | 2.78 | 2.92 | 2.94 | 2.65 |
| | 15 | 2.59 | 2.74 | 2.92 | 2.91 | 2.81 | 2.91 | 2.92 | 2.74 |
| | 20 | 2.80 | 2.87 | 2.96 | 2.84 | 2.76 | 2.84 | 2.96 | 2.87 |
| $P_0$ | | 3.00 | 3.00 | 3.00 | 3.00 | 3.00 | 3.00 | 3.00 | 3.00 |
| ΔP~ | 0 | −0.44 | −0.22 | 0.00 | −0.22 | −0.44 | −0.22 | 0.00 | −0.22 |
| | 5 | −0.48 | −0.29 | −0.02 | −0.17 | −0.36 | −0.17 | −0.02 | −0.29 |
| | 10 | −0.52 | −0.35 | −0.06 | −0.08 | −0.22 | −0.08 | −0.06 | −0.35 |
| | 15 | −0.41 | −0.26 | −0.08 | −0.09 | −0.19 | −0.09 | −0.08 | −0.26 |
| | 20 | −0.20 | −0.13 | −0.04 | −0.16 | −0.24 | −0.16 | −0.04 | −0.13 |

As shown in FIG. 23 and Table 3, the spectacle lens 11 according to the third example satisfies the condition (6) in a range of 5<h<20. That is, the cross-section of the back surface 11b is rotationally asymmetrical. As shown in Table 3, $P_0(0)$ is 3.00. Therefore, the spectacle lens 11 satisfies the condition (7). As shown in FIG. 23 and Table 3, the spectacle lens according to the third example satisfies the conditions (8). Further, the spectacle lens 11 satisfies the conditions (11) and (12).

As described above, the front surface 11a is formed as a spherical surface. Therefore, as shown in FIG. 22 and Table 3, the spectacle lens 11 according to the third example satisfies the condition (21). Since the spectacle lens 11 satisfies the conditions (11) and (12), the spectacle lens 11 according to the third example satisfies the condition (23).

Figure 24:
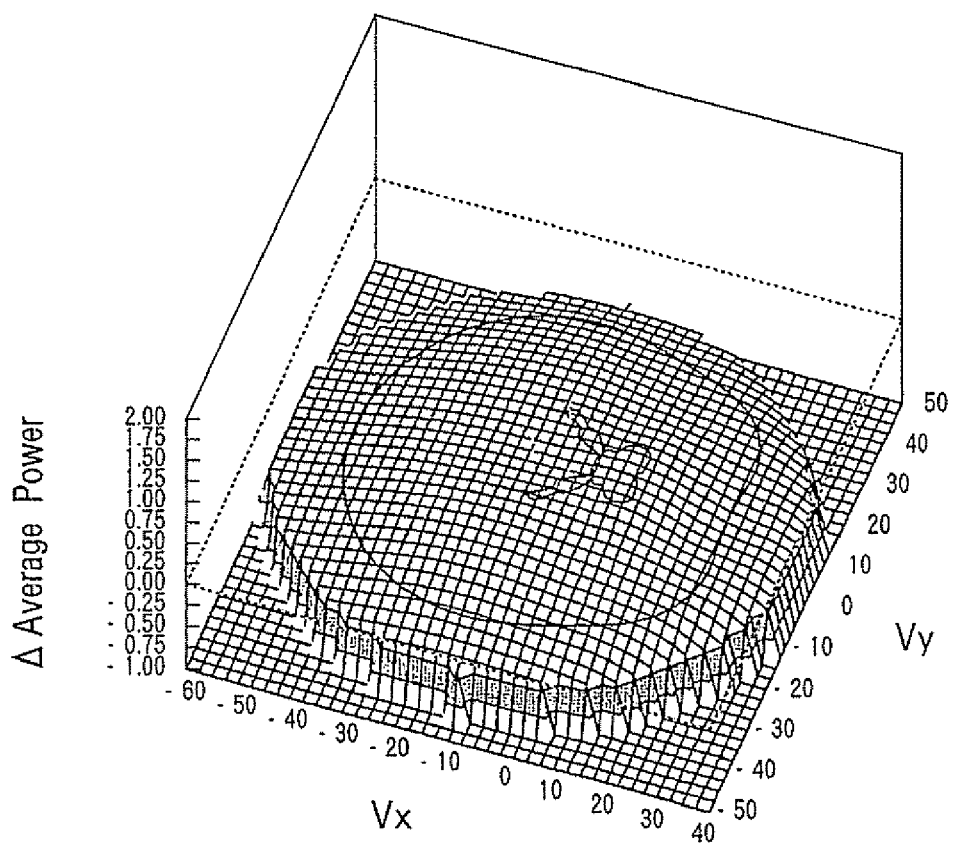
FIG. 24 shows a contour map of an average power error of the spectacle lens according to the third example.
Figure 25:
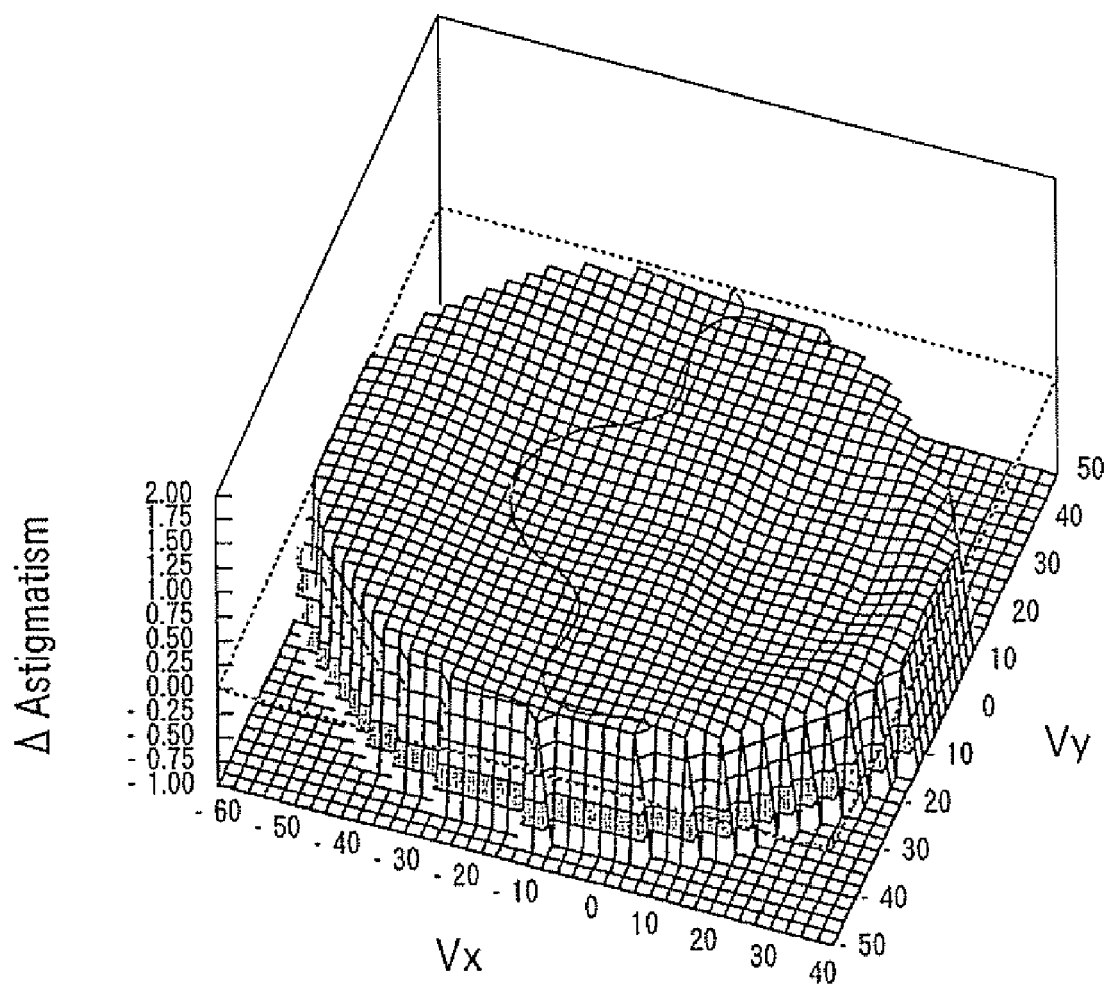
FIG. 25 shows a contour map of astigmatism of the spectacle lens according to the third example.
Figure 26:
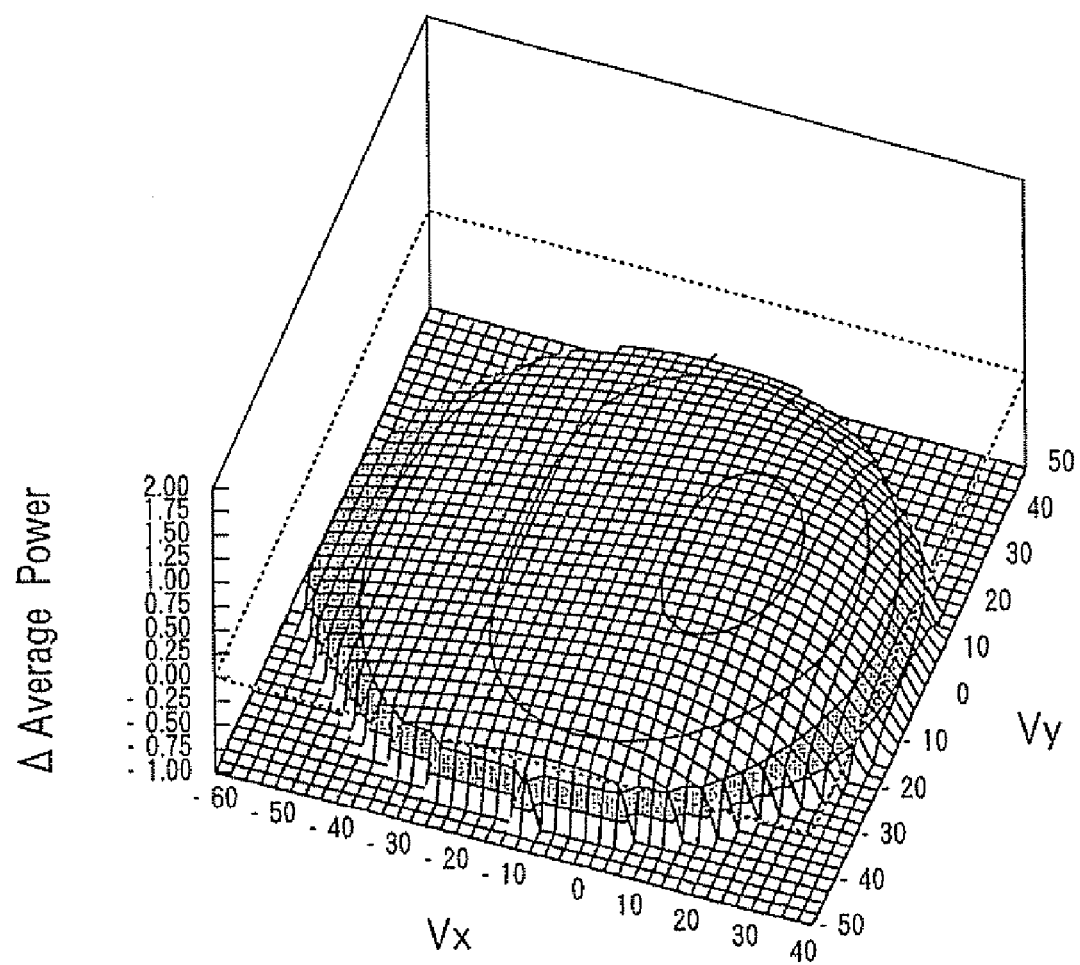
FIG. 26 shows a contour map of an average power error of a third comparative example.
Figure 27:
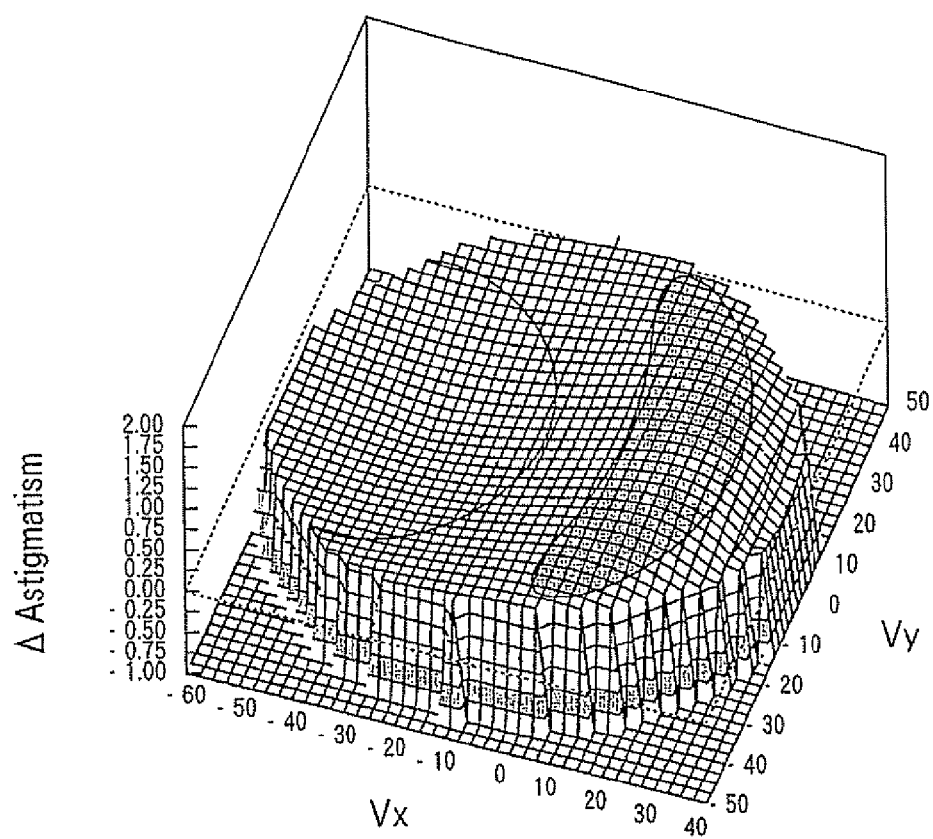
FIG. 27 shows a contour map of astigmatism of the spectacle lens according to the third comparative example.

FIG. 24 shows a contour map of an average power error of the spectacle lens 11 according to the third example. FIG. 25 shows a contour map of astigmatism of the spectacle lens 11 according to the third example. FIG. 26 shows a contour map of an average power error of a spectacle lens (i.e., a third comparative example) having a back surface configured to be a spherical surface. FIG. 27 shows a contour map of astigmatism of the spectacle lens (the third comparative example) having a back surface configured to be a spherical surface. As can be seen from the comparison between FIG. 24 and FIG. 26 and the comparison between FIG. 25 and FIG. 27, the spectacle lens 11 according to the third example achieves a balance between the average power error and the astigmatism while reducing the average power error and the astigmatism to minimums, respectively. It is understood that the spectacle lens according to the third example has more suitable optical performance than a conventional spectacle lens.

In addition to the above mentioned advantages, the spectacle lens 11 according to the third example is configured to have larger front warpage angle of 20°. Therefore, the spectacle lens according to the third example has a high wrapping property.

FOURTH EXAMPLE

Figure 28:
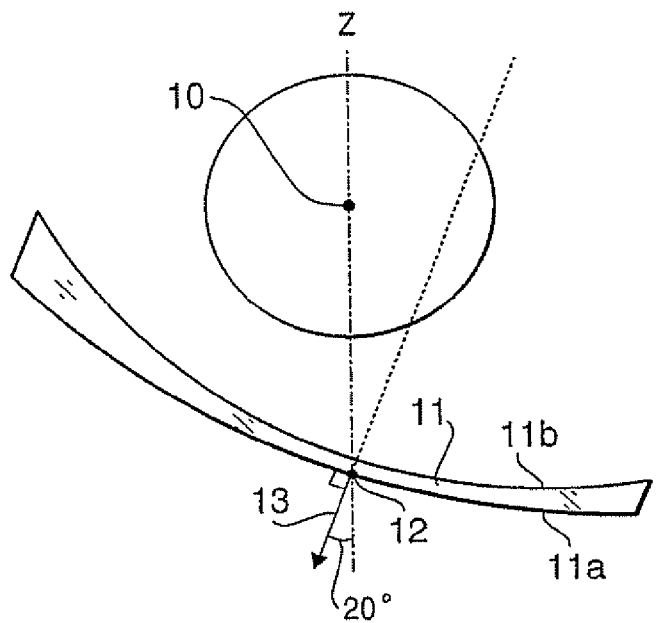
FIG. 28 is a cross-section of the spectacle lens according to a fourth example defined in the X-Z plane.
Figure 29:
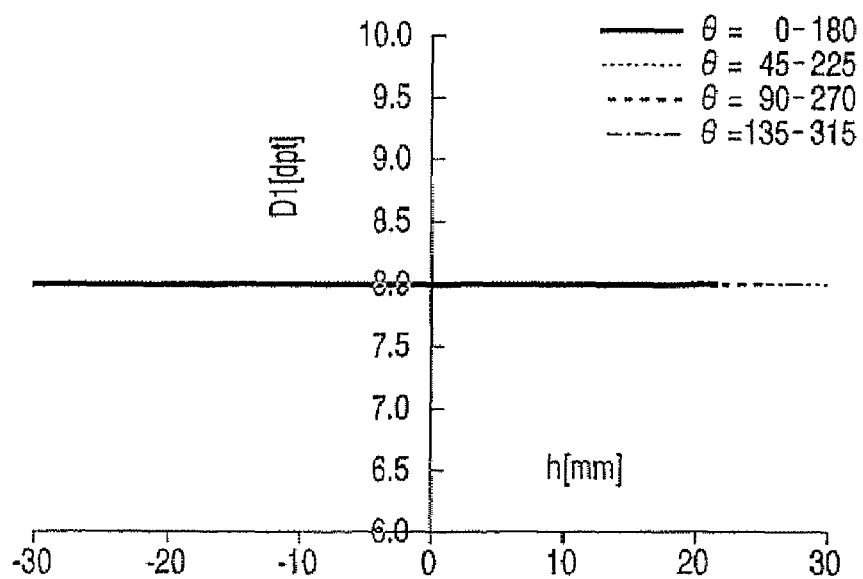
FIG. 29 is a graph of the cross-section surface power of a front surface of the spectacle lens according to the fourth example.
Figure 30:
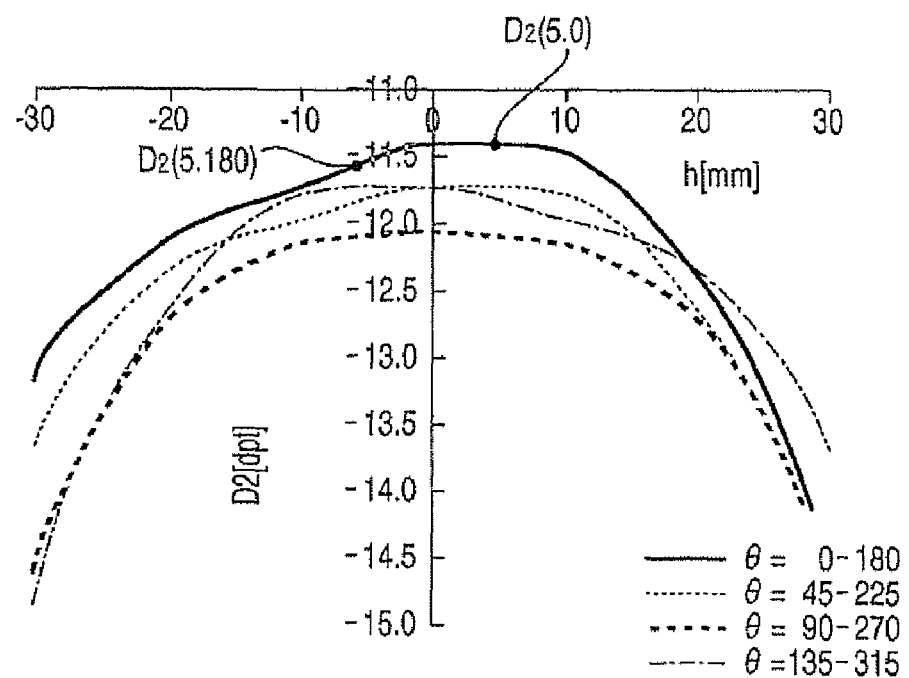
FIG. 30 is a graph of the cross-section surface power of a back surface of the spectacle lens according to the fourth example.

FIG. 28 is a cross-section of the spectacle lens 11 according to a fourth example defined in the X-Z plane. The spectacle lens 11 according to the fourth example is configured such that the angle formed between the outward normal line 13 and the Z-axis (i.e., a front warpage angle) is 20°. FIG. 29 is a graph of the cross-section surface power $D_1$ of the front surface 11a with respect to the distance h and the angle θ. As shown in FIG. 29, the front surface 11a of the spectacle lens 11 is formed as a spherical surface. FIG. 30 is a graph of the cross-section surface power $D_2$ of the back surface 11b with respect to the distance h and the angle θ. As shown in FIG. 30, the back surface 11b is formed as an aspherical surface having the cross-section surface power which varies depending on the values of the distance h and the angle θ.

Figure 31:
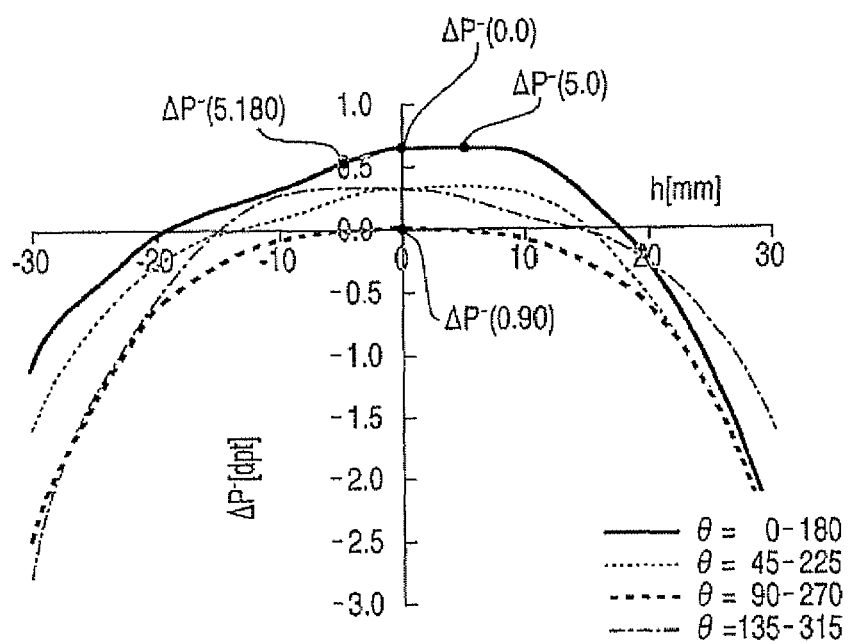
FIG. 31 is a graph illustrating the aspheric amount $\Delta P^\sim$ of the spectacle lens according to the fourth example.

FIG. 31 is a graph illustrating the aspheric amount ΔP~ with respect to the distance h and the angle θ. The aspheric amount is obtained by using the cross-section surface power $D_1$ and $D_2$ of the front and back surfaces 11a and 11b.

Table 4 shows the numerical configuration of the spectacle lens 11 according to the forth example.

TABLE 4

|   |   | θ | | | | | | | |
|---|---|---|---|---|---|---|---|---|---|
| | h | 0 | 45 | 90 | 135 | 180 | 225 | 270 | 315 |
| $D_1$ | 0 | 8.00 | 8.00 | 8.00 | 8.00 | 8.00 | 8.00 | 8.00 | 8.00 |
| | 5 | 8.00 | 8.00 | 8.00 | 8.00 | 8.00 | 8.00 | 8.00 | 8.00 |
| | 10 | 8.00 | 8.00 | 8.00 | 8.00 | 8.00 | 8.00 | 8.00 | 8.00 |
| | 15 | 8.00 | 8.00 | 8.00 | 8.00 | 8.00 | 8.00 | 8.00 | 8.00 |
| | 20 | 8.00 | 8.00 | 8.00 | 8.00 | 8.00 | 8.00 | 8.00 | 8.00 |
| $D_2$ | 0 | −11.41 | −11.73 | −12.06 | −11.73 | −11.41 | −11.73 | −12.06 | −11.73 |
| | 5 | −11.41 | −11.72 | −12.08 | −11.81 | −11.53 | −11.81 | −12.08 | −11.72 |
| | 10 | −11.47 | −11.78 | −12.15 | −11.97 | −11.72 | −11.97 | −12.15 | −11.78 |
| | 15 | −11.81 | −12.06 | −12.34 | −12.10 | −11.88 | −12.10 | −12.34 | −12.06 |
| | 20 | −12.35 | −12.62 | −12.69 | −12.34 | −12.10 | −12.34 | −12.69 | −12.62 |
| P~ | 0 | −3.35 | −3.67 | −3.99 | −3.67 | −3.35 | −3.67 | −3.99 | −3.67 |
| | 5 | −3.35 | −3.66 | −4.02 | −3.75 | −3.47 | −3.75 | −4.02 | −3.66 |
| | 10 | −3.41 | −3.72 | −4.09 | −3.91 | −3.66 | −3.91 | −4.09 | −3.72 |
| | 15 | −3.75 | −4.00 | −4.28 | −4.03 | −3.82 | −4.03 | −4.28 | −4.00 |
| | 20 | −4.29 | −4.56 | −4.63 | −4.27 | −4.04 | −4.27 | −4.63 | −4.56 |
| $P_0$ | | −4.00 | −4.00 | −4.00 | −4.00 | −4.00 | −4.00 | −4.00 | −4.00 |
| ΔP~ | 0 | 0.65 | 0.33 | 0.01 | 0.33 | 0.65 | 0.33 | 0.01 | 0.33 |
| | 5 | 0.65 | 0.34 | −0.02 | 0.25 | 0.53 | 0.25 | −0.02 | 0.34 |
| | 10 | 0.59 | 0.28 | −0.09 | 0.09 | 0.34 | 0.09 | −0.09 | 0.28 |
| | 15 | 0.25 | 0.00 | −0.28 | −0.03 | 0.18 | −0.03 | −0.28 | 0.00 |
| | 20 | −0.29 | −0.56 | −0.63 | −0.27 | −0.04 | −0.27 | −0.63 | −0.56 |

As shown in FIG. 31 and Table 4 the spectacle lens 11 according to the fourth example satisfies the condition (6) in a range of 5<h<20. That is, the cross-section of the back surface 11b is rotationally asymmetrical. As shown in Table 4, $P_0(0)$ is −4.00. Therefore, the spectacle lens 11 is a minus lens which satisfies the condition (9). As shown in FIG. 31 and Table 4, the spectacle lens according to the fourth example satisfies the conditions (10), (12) and (13).

As can be seen from Table 4, the spectacle lens 11 according to the fourth example satisfies the condition (20). As shown in FIG. 31 and Table 4, the spectacle lens 11 satisfies the condition (16) when the angle θ is between 90° and 270°.

As described above, the front surface 11a is formed as a spherical surface. Therefore, as shown in FIG. 30 and Table 4, the spectacle lens 11 according to the fourth example satisfies the condition (22). Since the spectacle lens 11 satisfies the conditions (12) and (13), the spectacle lens 11 according to the fourth example satisfies the condition (24). As can be seen from FIG. 30 and Table 4, the condition (25) corresponding to the condition (16) is also satisfied.

Figure 32:
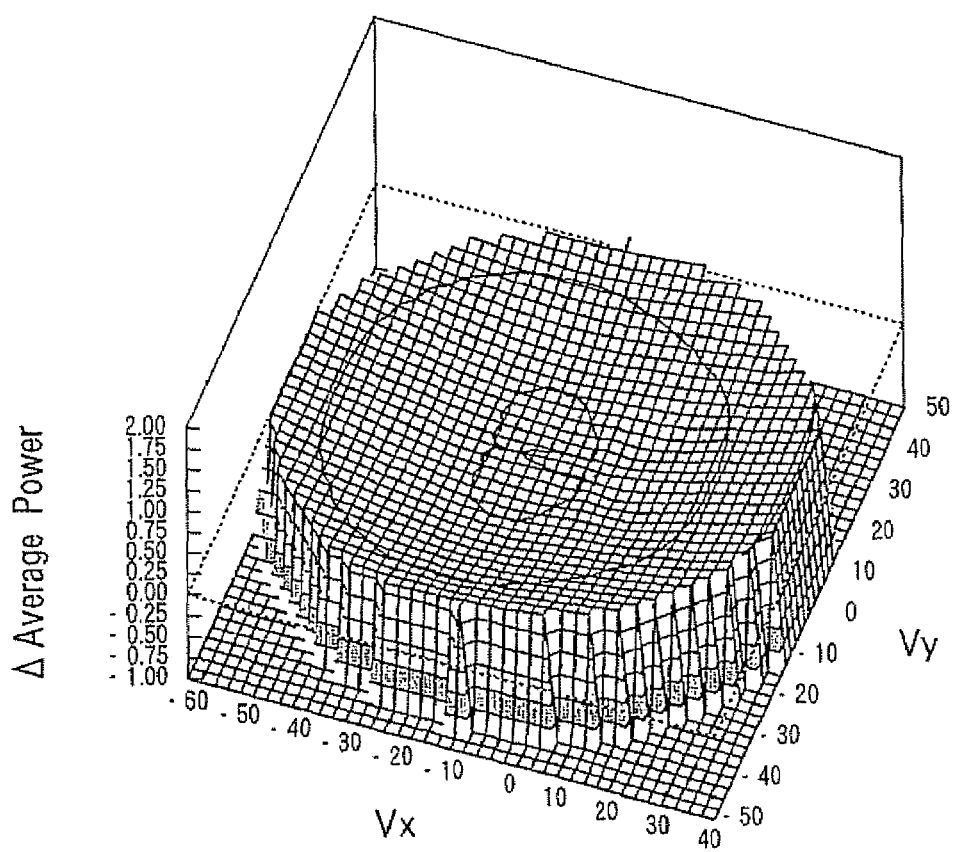
FIGS. 32 shows a contour map of an average power error of the spectacle lens according to the fourth example.
Figure 33:
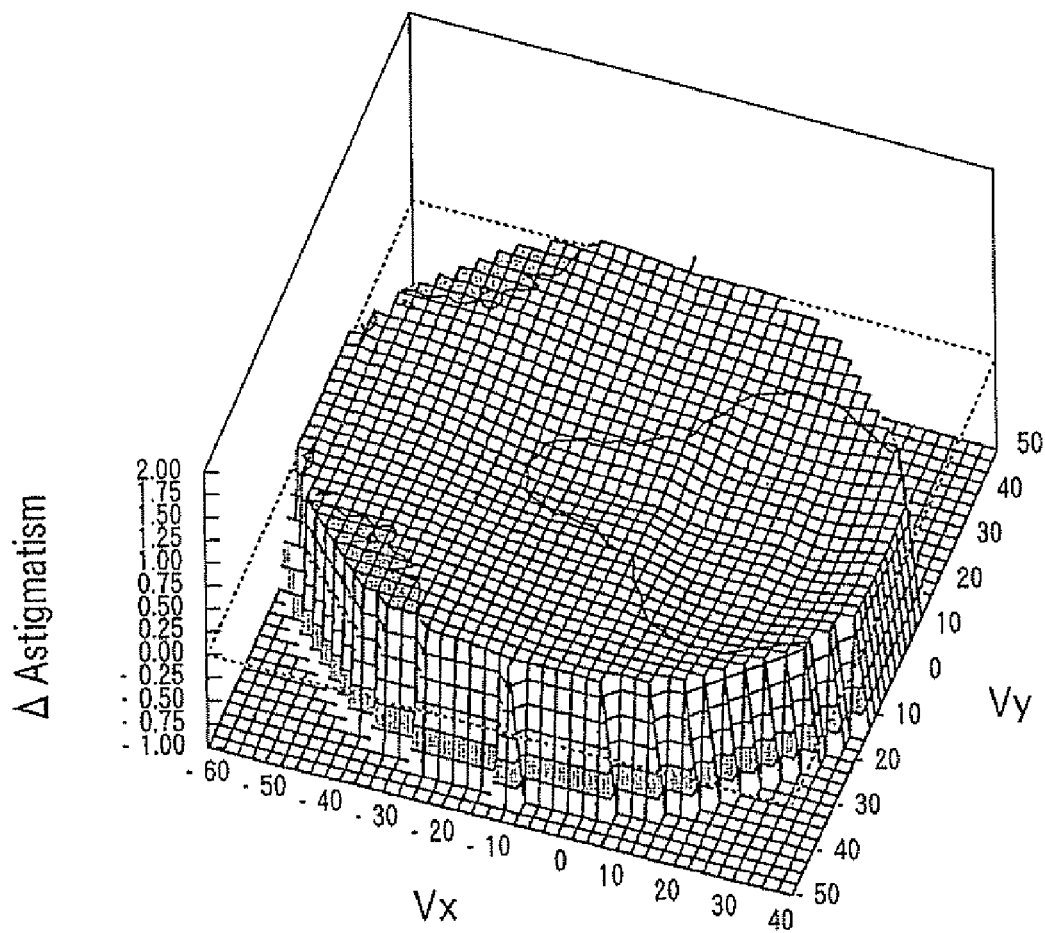
FIG. 33 shows a contour map of astigmatism of the spectacle lens according to the fourth example.
Figure 34:
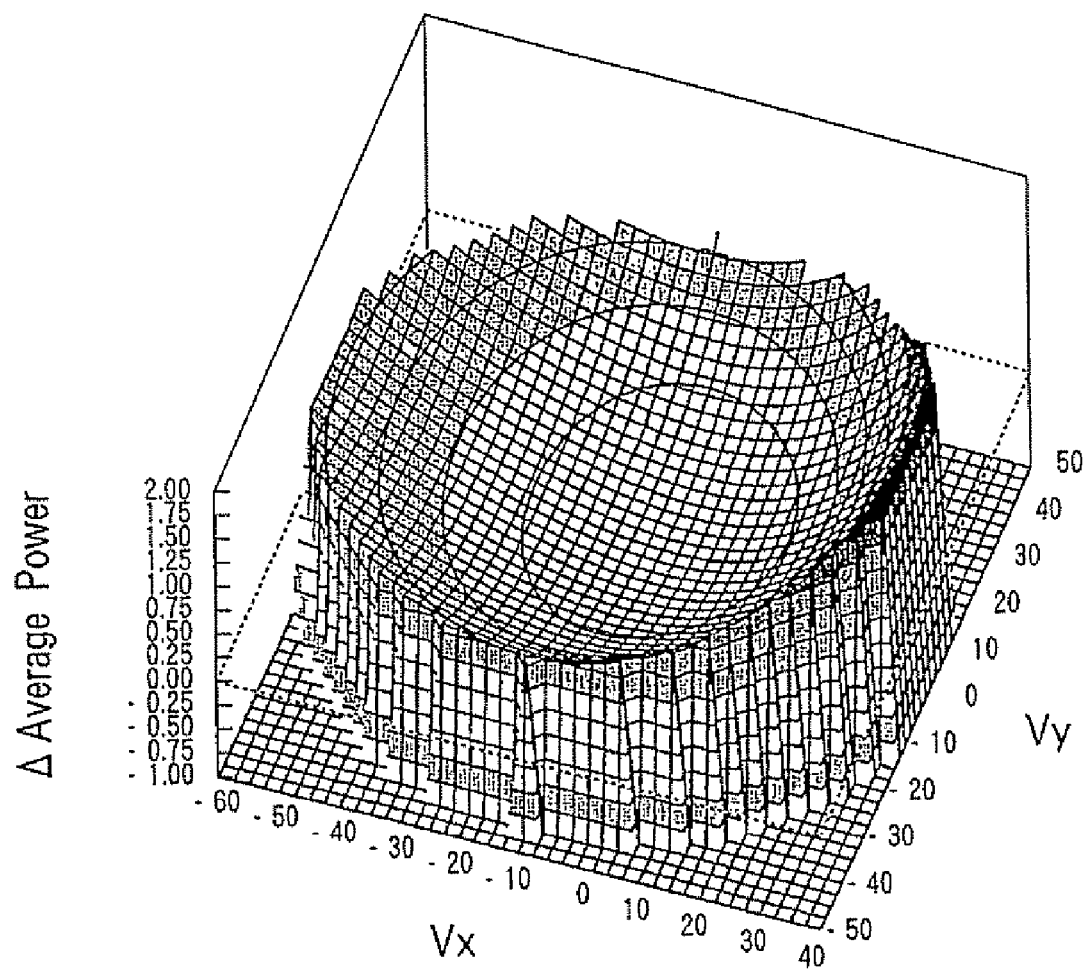
FIG. 34 shows a contour map of an average power error of a fourth comparative example.
Figure 35:
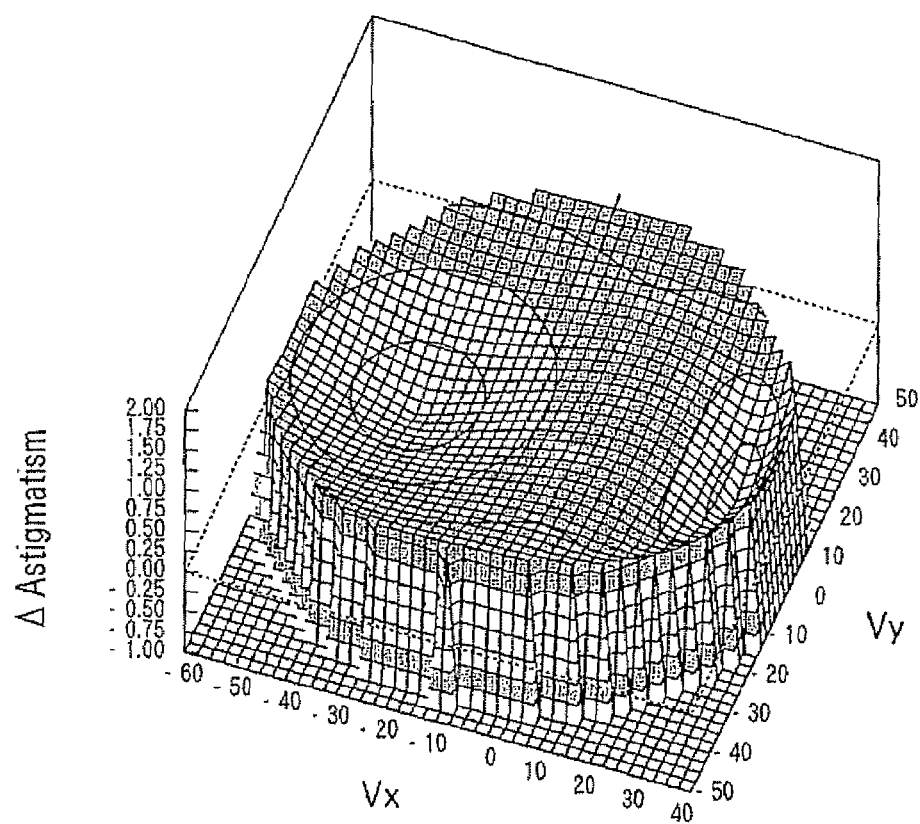
FIG. 35 shows a contour map of astigmatism of the spectacle lens according to the fourth comparative example.

FIG. 32 shows a contour map of an average power error of the spectacle lens 11 according to the fourth example. FIG. 33 shows a contour map of astigmatism of the spectacle lens 11 according to the fourth example. FIG. 34 shows a contour map of an average power error of a spectacle lens having a back surface configured to be a spherical surface (i.e., a fourth comparative example). FIG. 35 shows a contour map of astigmatism of the spectacle lens (the fourth comparative example) having a back surface configured to be a spherical surface. As can be seen from the comparison between FIG. 32 and FIG. 34 and the comparison between FIG. 33 and FIG. 35, the spectacle lens 11 according to the fourth example achieves a balance between the average power error and the astigmatism while reducing the average power error and the astigmatism to minimums, respectively. It is understood that the spectacle lens according to the fourth example has more suitable optical performance than a conventional spectacle lens.

In addition to the above mentioned advantages, the spectacle lens 11 according to the fourth example is configured to have larger front warpage angle of 20°. Therefore, the spectacle lens according to the fourth example has a high wrapping property.

Since the spectacle lens 11 according to the fourth example satisfies the condition (20), a base curve, which is deeper than a base curve of a spherical surface configured to suitably attain a prescribed spherical power in regard to aberrations in the case where there is no inclination angle, is employed in this example. However, by satisfying the condition (16) when the angle θ is in a predetermined range, it is possible to attain suitable off-axis optical performance.

FIFTH EXAMPLE

Figure 36:
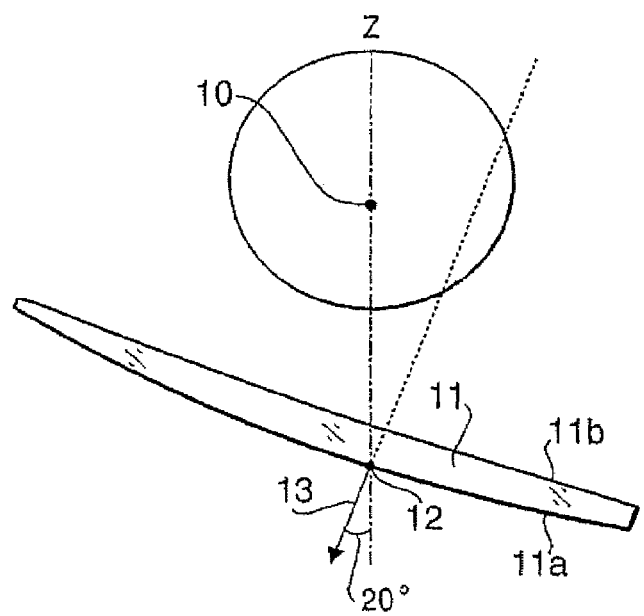
FIG. 36 is a cross-section of the spectacle lens according to a fifth example defined in the X-Z plane.

FIG. 36 is a cross-section of the spectacle lens 11 according to a fifth example defined in the X-Z plane. The spectacle lens 11 according to the fifth example is configured such that the angle formed between the outward normal line 13 and the Z-axis (i.e., a front warpage angle) at the centration point 12 is 20°.

Figure 37:
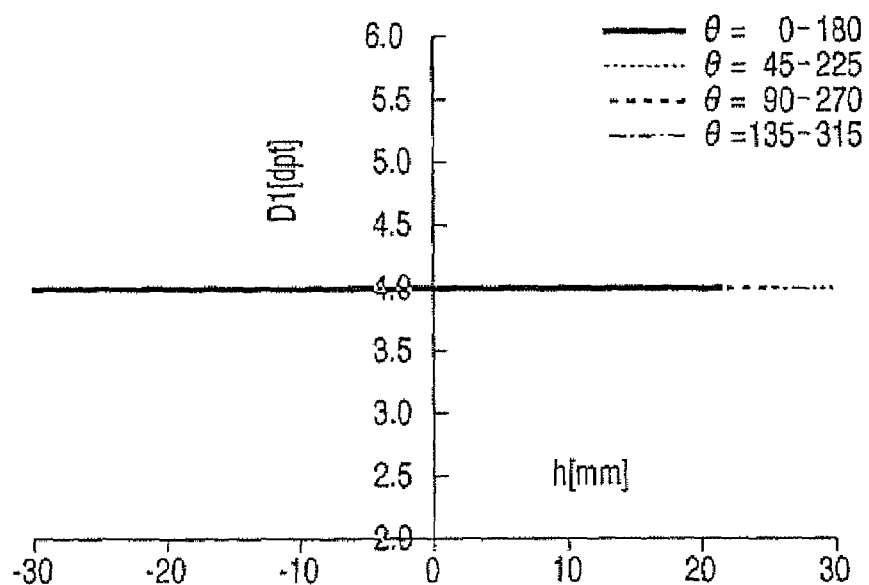
FIG. 37 is a graph of the cross-section surface power of a front surface of the spectacle lens according to the fifth example.
Figure 38:
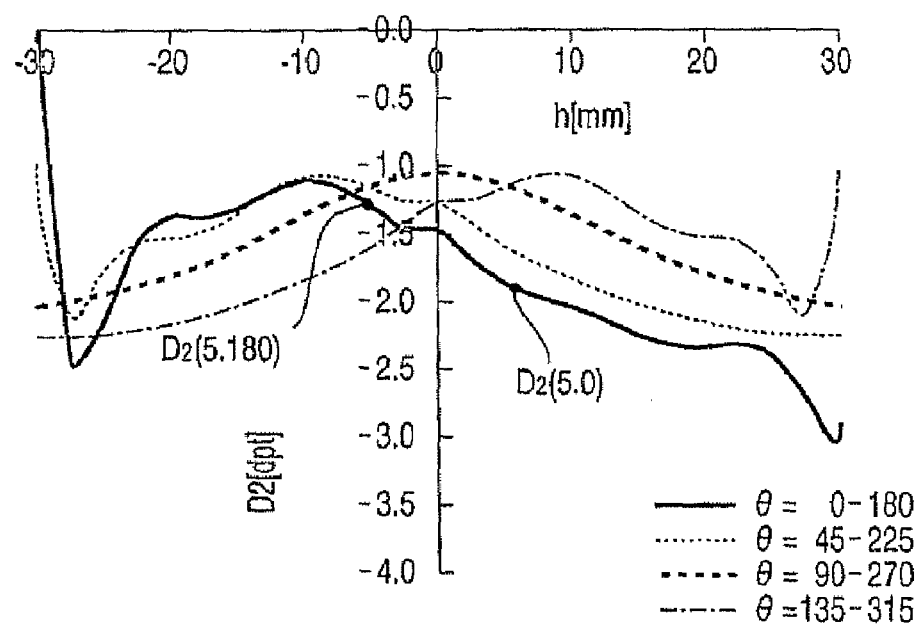
FIG. 38 is a graph of the cross-section surface power of a back surface of the spectacle lens according to the fifth example.

FIG. 37 is a graph of the cross-section surface power $D_1$ of the front surface 11a with respect to the distance h and the angle θ. As shown in FIG. 37, the front surface 11a of the spectacle lens 11 is formed as a spherical surface. FIG. 38 is a graph of the cross-section surface power $D_2$ of the back surface 11b with respect to the distance h and the angle θ. As shown in FIG. 38, the back surface 11b is formed as an aspherical surface having the cross-section surface power which varies depending on the values of the distance h and the angle θ.

Figure 39:
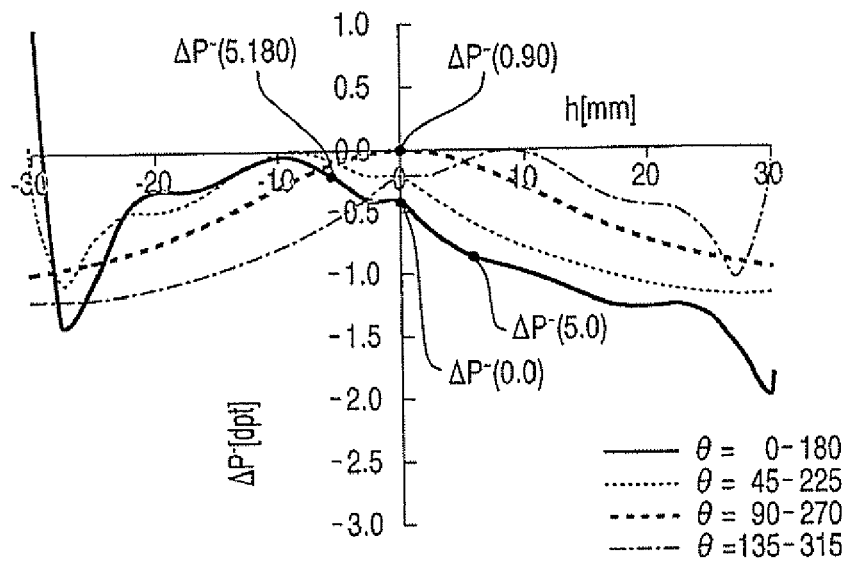
FIG. 39 is a graph illustrating the aspheric amount $\Delta P^\sim$ of the spectacle lens according to the fifth example.

FIG. 39 is a graph illustrating the aspheric amount $\Delta P^\sim$ with respect to the distance h and the angle θ. The aspheric amount is obtained by using the cross-section surface power $D_1$ and $D_2$ of the front and back surfaces 11a and 11b.

Table 5 shows the numerical configuration of the spectacle lens 11 according to the fifth example.

TABLE 5

| | | θ | | | | | | | |
|---|---|---|---|---|---|---|---|---|---|
| | h | 0 | 45 | 90 | 135 | 180 | 225 | 270 | 315 |
| $D_1$ | 0 | 4.00 | 4.00 | 4.00 | 4.00 | 4.00 | 4.00 | 4.00 | 4.00 |
| | 5 | 4.00 | 4.00 | 4.00 | 4.00 | 4.00 | 4.00 | 4.00 | 4.00 |
| | 10 | 4.00 | 4.00 | 4.00 | 4.00 | 4.00 | 4.00 | 4.00 | 4.00 |
| | 15 | 4.00 | 4.00 | 4.00 | 4.00 | 4.00 | 4.00 | 4.00 | 4.00 |
| | 20 | 4.00 | 4.00 | 4.00 | 4.00 | 4.00 | 4.00 | 4.00 | 4.00 |
| $D_2$ | 0 | −1.46 | −1.25 | −1.04 | −1.25 | −1.46 | −1.25 | −1.04 | −1.25 |
| | 5 | −1.86 | −1.58 | −1.13 | −1.14 | −1.27 | −1.14 | −1.13 | −1.58 |
| | 10 | −2.03 | −1.82 | −1.34 | −1.06 | −1.08 | −1.06 | −1.34 | −1.82 |
| | 15 | −2.24 | −2.01 | −1.59 | −1.33 | −1.29 | −1.33 | −1.59 | −2.01 |
| | 20 | −2.33 | −2.14 | −1.79 | −1.51 | −1.36 | −1.51 | −1.79 | −2.14 |
| $P^\sim$ | 0 | 2.59 | 2.79 | 3.00 | 2.79 | 2.59 | 2.79 | 3.00 | 2.79 |
| | 5 | 2.18 | 2.46 | 2.91 | 2.90 | 2.77 | 2.90 | 2.91 | 2.46 |
| | 10 | 2.01 | 2.22 | 2.70 | 2.98 | 2.96 | 2.98 | 2.70 | 2.22 |
| | 15 | 1.80 | 2.03 | 2.45 | 2.71 | 2.75 | 2.71 | 2.45 | 2.03 |
| | 20 | 1.72 | 1.90 | 2.26 | 2.53 | 2.68 | 2.53 | 2.26 | 1.90 |
| $P_0$ | | 3.00 | 3.00 | 3.00 | 3.00 | 3.00 | 3.00 | 3.00 | 3.00 |
| $\Delta P^\sim$ | 0 | −0.41 | −0.21 | 0.00 | −0.21 | −0.41 | −0.21 | 0.00 | −0.21 |
| | 5 | −0.82 | −0.54 | −0.09 | −0.10 | −0.23 | −0.10 | −0.09 | −0.54 |
| | 10 | −0.99 | −0.78 | −0.30 | −0.02 | −0.04 | −0.02 | −0.30 | −0.78 |
| | 15 | −1.20 | −0.97 | −0.55 | −0.29 | −0.25 | −0.29 | −0.55 | −0.97 |
| | 20 | −1.28 | −1.10 | −0.74 | −0.47 | −0.32 | −0.47 | −0.74 | −1.10 |

As shown in FIG. 39 and Table 5, the spectacle lens 11 according to the fifth example satisfies the condition (6) in a range of 5<h<20. That is, the cross-section of the back surface 11b is rotationally asymmetrical. As shown in Table 5, $P_0(0)$ is 3.00 (i.e., the spectacle lens 11 is a plus lens). Therefore, the spectacle lens 11 according to the fifth example satisfies the condition (7). As shown in FIG. 39 and Table 5, the spectacle lens according to the fifth example satisfies the conditions (8), (11) and (12). As can be seen from Table 5, the spectacle lens according to the fifth example satisfies a condition (15):

$$D_1(0,\theta) < A_p \cdot P_0(\theta) + B_p \quad (15)$$

where $A_p = 1.02n − 0.51$, $B_p = 13.24n − 14.79$.

As shown in FIG. 39 and Table 5, the condition (16) is satisfied when the angle θ is between −90° and 90° (270° to 360° and 0° to 90°).

As described above, the front surface 11a is formed as a spherical surface. Therefore, as shown in FIG. 38 and Table 5, the spectacle lens 11 according to the fifth example satisfies the condition (21). Since the spectacle lens 11 satisfies the conditions (11) and (12), the spectacle lens 11 according to the fifth example satisfies the condition (23). Since the spectacle lens 11 satisfies the condition (16), the condition (25) is satisfied (see FIG. 38 and Table 5).

Figure 40:
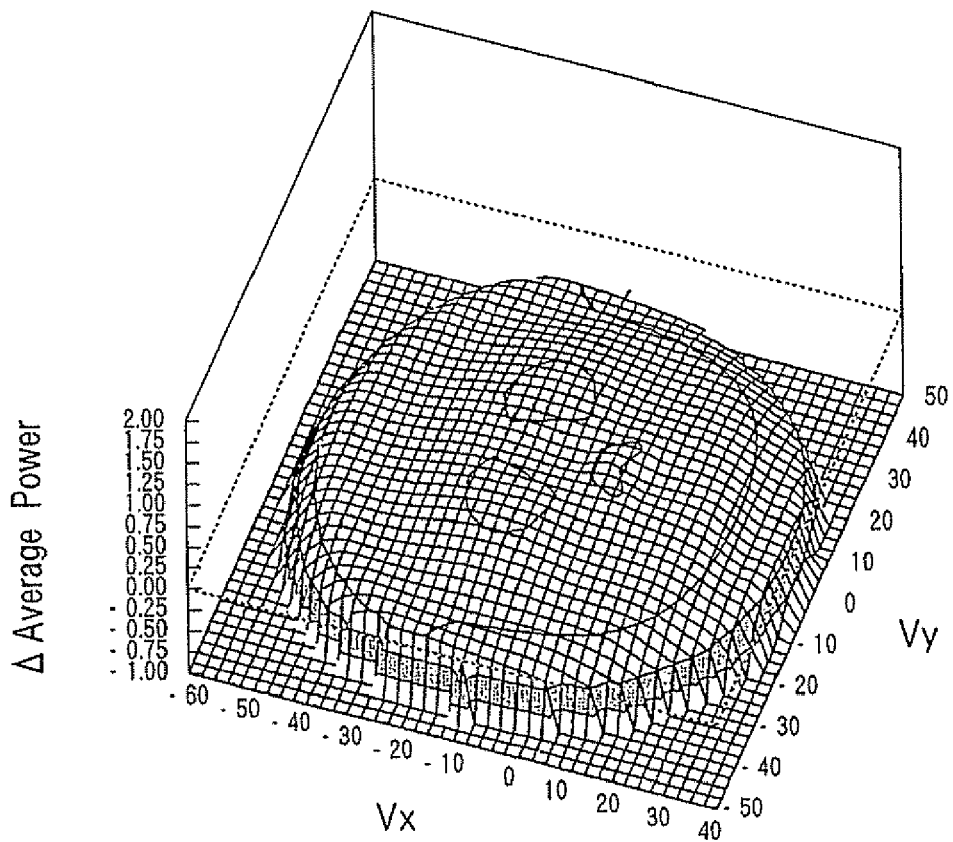
FIG. 40 shows a contour map of an average power error of the spectacle lens according to the fifth example.
Figure 41:
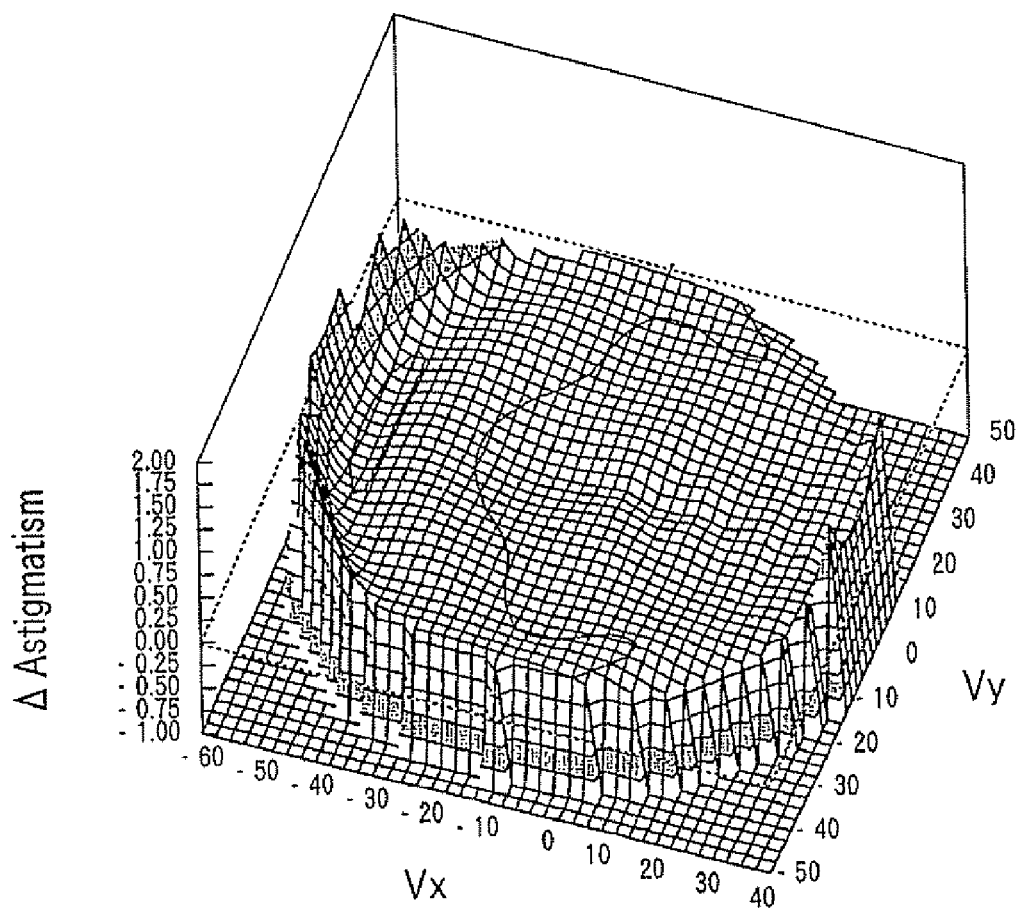
FIG. 41 shows a contour map of astigmatism of the spectacle lens according to the fifth example.
Figure 42:
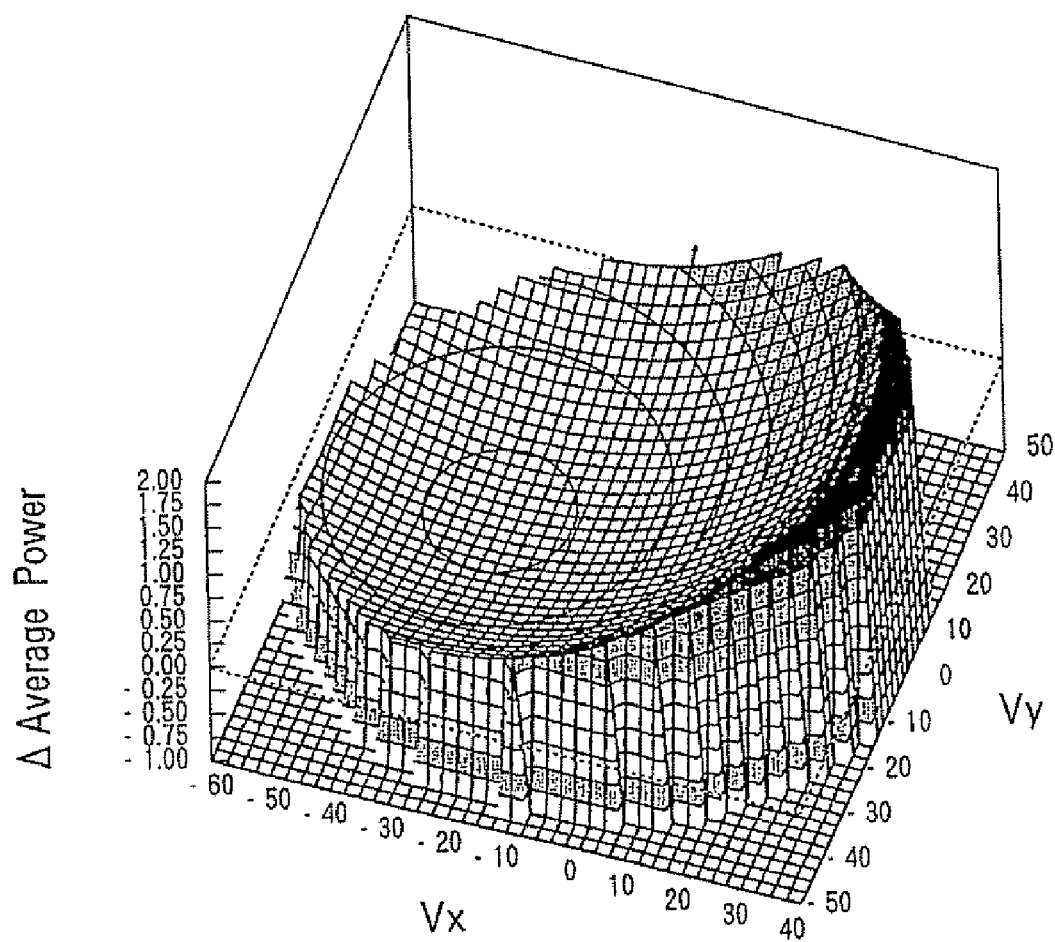
FIG. 42 shows a contour map of an average power error of a fifth comparative example.
Figure 43:
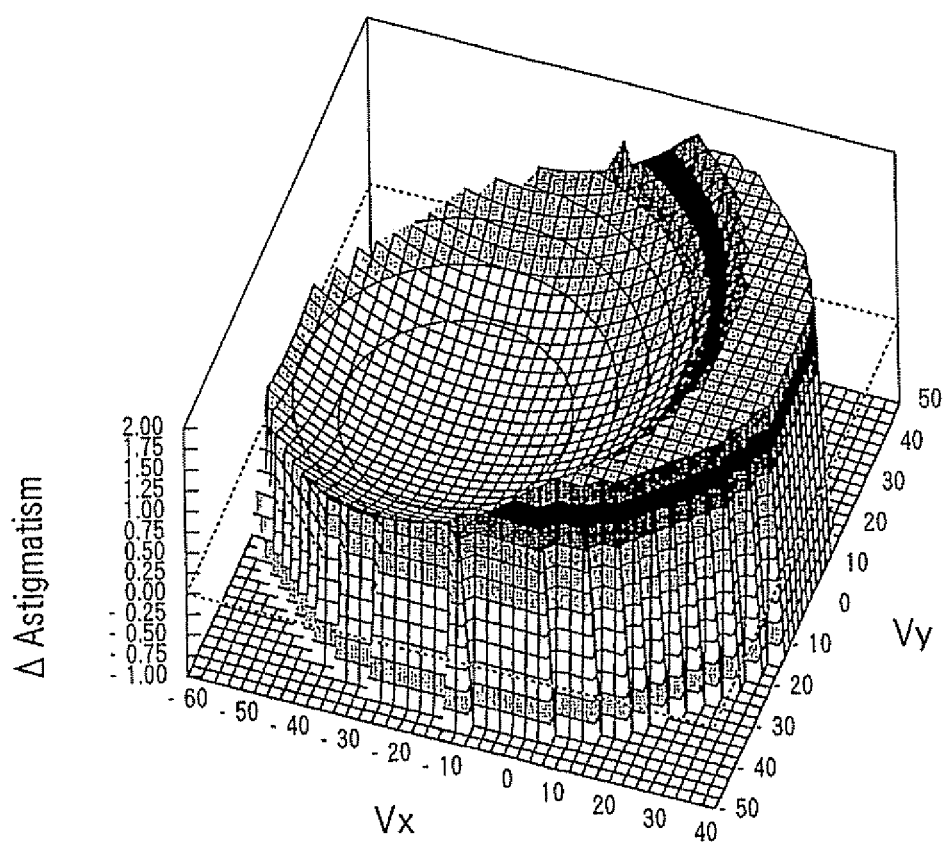
FIG. 43 shows a contour map of astigmatism of the spectacle lens according to the fifth comparative example.

FIG. 40 shows a contour map of an average power error of the spectacle, lens 11 according to the fifth example. FIG. 41 shows a contour map of astigmatism of the spectacle lens 11 according to the fifth example. FIG. 42 shows a contour map of an average power error of a spectacle lens having a back surface configured to be a spherical surface (i.e., a fifth comparative example). FIG. 43 shows a contour map of astigmatism of the spectacle lens (the fifth comparative example) having a back surface configured to be a spherical surface. As can be seen from the comparison between FIG. 40 and FIG. 42 and the comparison between FIG. 41 and FIG. 43, the spectacle lens 11 according to the fifth example achieves a balance between the average power error and the astigmatism while reducing the average power error and the astigmatism to minimums, respectively. It is understood that the spectacle lens according to the fifth example has more suitable optical performance than a conventional spectacle lens.

In addition to the above mentioned advantages, the spectacle lens 11 according to the fifth example is configured to have larger front warpage angle of 20°. Therefore, the spectacle lens according to the fifth example has a high wrapping property.

Since the spectacle lens 11 according to the fifth example satisfies the condition (15), a base curve, which is shallower than a base curve of a spherical surface configured to suitably attain a prescribed spherical power in regard to aberrations in the case where there is no inclination angle, is employed in the fifth example. However, by satisfying the condition (16) when the angle θ is in a predetermined range, it is possible to attain suitable off-axis optical performance.

SIXTH EXAMPLE

Figure 44:
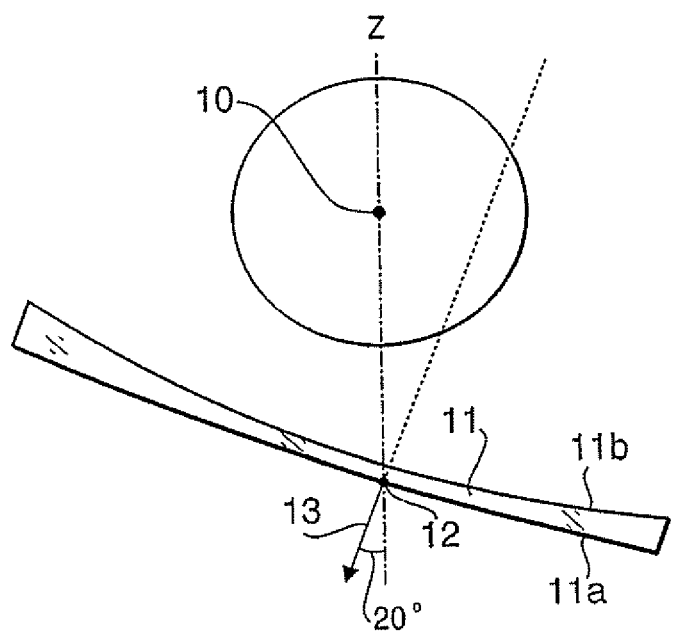
FIG. 44 is a cross-section of the spectacle lens according to a sixth example defined in the X-Z plane.

FIG. 44 is a cross-section of the spectacle lens 11 according to a sixth example defined in the X-Z plane. The spectacle lens 11 according to the sixth example is configured such that the angle formed between the outward normal line 13 and the Z-axis (i.e., a front warpage angle) at the centration point 12 is 20°.

Figure 45:
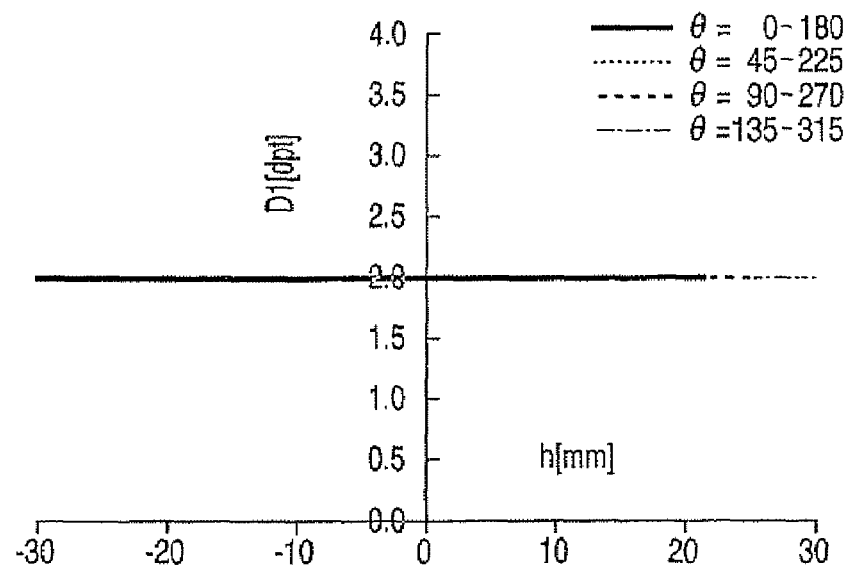
FIG. 45 is a graph of the cross-section surface power of a front surface of the spectacle lens according to the sixth example.
Figure 46:
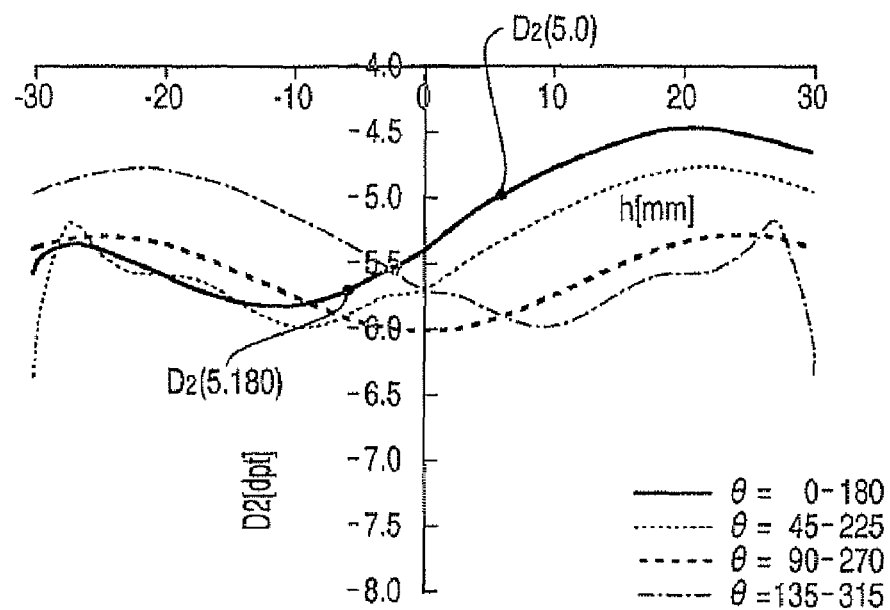
FIG. 46 is a graph of the cross-section surface power of a back surface of the spectacle lens according to the sixth example.

FIG. 45 is a graph of the cross-section surface power $D_1$ of the front surface 11a with respect to the distance h and the angle θ. As shown in FIG. 45, the front surface 11a of the spectacle lens 11 is formed as a spherical surface. FIG. 46 is a graph of the cross-section surface power $D_2$ of the back surface 11b with respect to the distance h and the angle θ. As shown in FIG. 46, the back surface 11b is formed as an aspherical surface having the cross-section surface power which varies depending on the values of the distance h and the angle θ.

Figure 47:
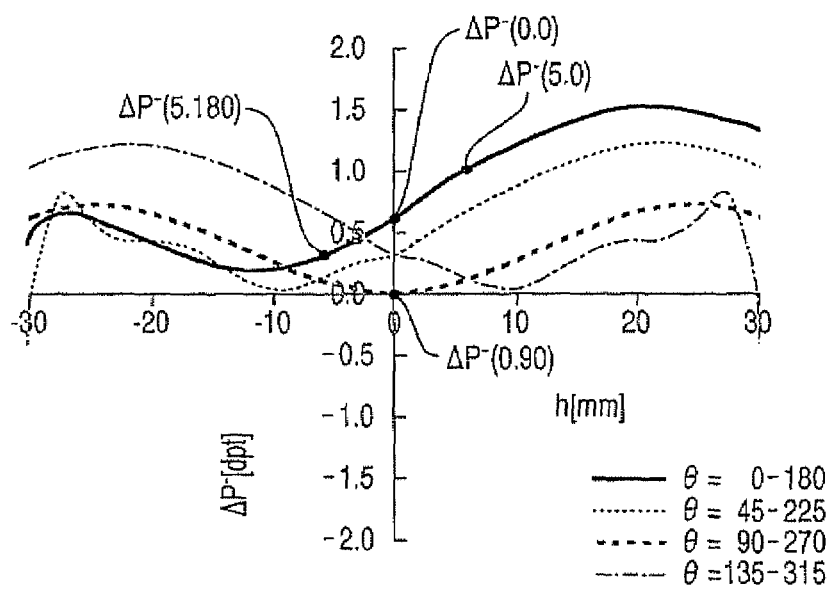
FIG. 47 is a graph illustrating the aspheric amount $\Delta P^\sim$ of the spectacle lens according to the sixth example.

FIG. 47 is a graph illustrating the aspheric amount $\Delta P^\sim$ with respect to the distance h and the angle θ. The aspheric amount is obtained by using the cross-section surface power $D_1$ and $D_2$ of the front and back surfaces 11a and 11b.

Table 6 shows the numerical configuration of the spectacle lens 11 according to the sixth example.

TABLE 6

| | | θ | | | | | | |
|---|---|---|---|---|---|---|---|---|
| | h | 0 | 45 | 90 | 135 | 180 | 225 | 270 | 315 |
| $D_1$ | 0 | 2.00 | 2.00 | 2.00 | 2.00 | 2.00 | 2.00 | 2.00 | 2.00 |
| | 5 | 2.00 | 2.00 | 2.00 | 2.00 | 2.00 | 2.00 | 2.00 | 2.00 |
| | 10 | 2.00 | 2.00 | 2.00 | 2.00 | 2.00 | 2.00 | 2.00 | 2.00 |
| | 15 | 2.00 | 2.00 | 2.00 | 2.00 | 2.00 | 2.00 | 2.00 | 2.00 |
| | 20 | 2.00 | 2.00 | 2.00 | 2.00 | 2.00 | 2.00 | 2.00 | 2.00 |
| $D_2$ | 0 | −5.39 | −5.70 | −6.01 | −5.70 | −5.39 | −5.70 | −6.01 | −5.70 |
| | 5 | −5.04 | −5.39 | −5.93 | −5.85 | −5.66 | −5.85 | −5.93 | −5.39 |
| | 10 | −4.79 | −5.13 | −5.74 | −5.97 | −5.81 | −5.97 | −5.74 | −5.13 |
| | 15 | −4.59 | −4.92 | −5.52 | −5.73 | −5.76 | −5.73 | −5.52 | −4.92 |
| | 20 | −4.48 | −4.79 | −5.35 | −5.58 | −5.58 | −5.58 | −5.35 | −4.79 |
| $P\sim$ | 0 | −3.39 | −3.70 | −4.00 | −3.70 | −3.39 | −3.70 | −4.00 | −3.70 |
| | 5 | −3.03 | −3.39 | −3.93 | −3.84 | −3.66 | −3.84 | −3.93 | −3.39 |
| | 10 | −2.78 | −3.13 | −3.74 | −3.97 | −3.81 | −3.97 | −3.74 | −3.13 |
| | 15 | −2.59 | −2.91 | −3.52 | −3.73 | −3.76 | −3.73 | −3.52 | −2.91 |
| | 20 | −2.48 | −2.79 | −3.34 | −3.57 | −3.58 | −3.57 | −3.34 | −2.79 |
| $P_0$ | | −4.00 | −4.00 | 4.00 | −4.00 | −4.00 | −4.00 | −4.00 | −4.00 |
| $\Delta P\sim$ | 0 | 0.61 | 0.30 | 0.00 | 0.30 | 0.61 | 0.30 | 0.00 | 0.30 |
| | 5 | 0.97 | 0.61 | 0.07 | 0.16 | 0.34 | 0.16 | 0.07 | 0.61 |
| | 10 | 1.22 | 0.87 | 0.26 | 0.03 | 0.19 | 0.03 | 0.26 | 0.87 |
| | 15 | 1.41 | 1.09 | 0.48 | 0.27 | 0.24 | 0.27 | 0.48 | 1.09 |
| | 20 | 1.52 | 1.21 | 0.66 | 0.43 | 0.42 | 0.43 | 0.66 | 1.21 |

TABLE 6-continued

As shown in FIG. 47 and Table 6, the spectacle lens 11 according to the sixth example satisfies the condition (6) in a range of 5<h<20. That is, the cross-section of the back surface 11b is rotationally asymmetrical. As shown in Table 6, $P_0(0)$ is −4.00. Therefore, the spectacle lens 11 according to the sixth example is a minus lens which satisfies the condition (9). As shown in FIG. 47 and Table 6, the spectacle lens 11 according to the sixth example satisfies the conditions (10), (12) and (13). As can be seen from Table 6, the spectacle lens according to the sixth example satisfies a condition (18):

$$D_1(0,\theta) < A_m \cdot P_0(\theta) + B_m \qquad (18)$$

where $A_m = 0.62n − 0.40$, $B_m = 20.09n − 23.46$.

As shown in FIG. 47 and Table 6, a following condition (19) is satisfied when the angle θ is between −90° and 90° (270° to 360° and 0° to 90°).

$$\Delta P^-(5,\theta) < \Delta P^-(10,\theta) < \Delta P^-(15,\theta) \qquad (19)$$

As described above, the front surface 11a is formed as a spherical surface. Therefore, as shown in FIG. 46 and Table 6, the spectacle lens 11 according to the sixth example satisfies the condition (22). Since the spectacle lens 11 satisfies the conditions (12) and (13), the spectacle lens 11 according to the sixth example satisfies the condition (24). As can be seen from FIG. 46 and Table 6, a following condition (26) which corresponds to the condition (19) is satisfied.

$$D_2(5,\theta) < D_2(10,\theta) < D_2(15,\theta) \qquad (26)$$

Figure 48:
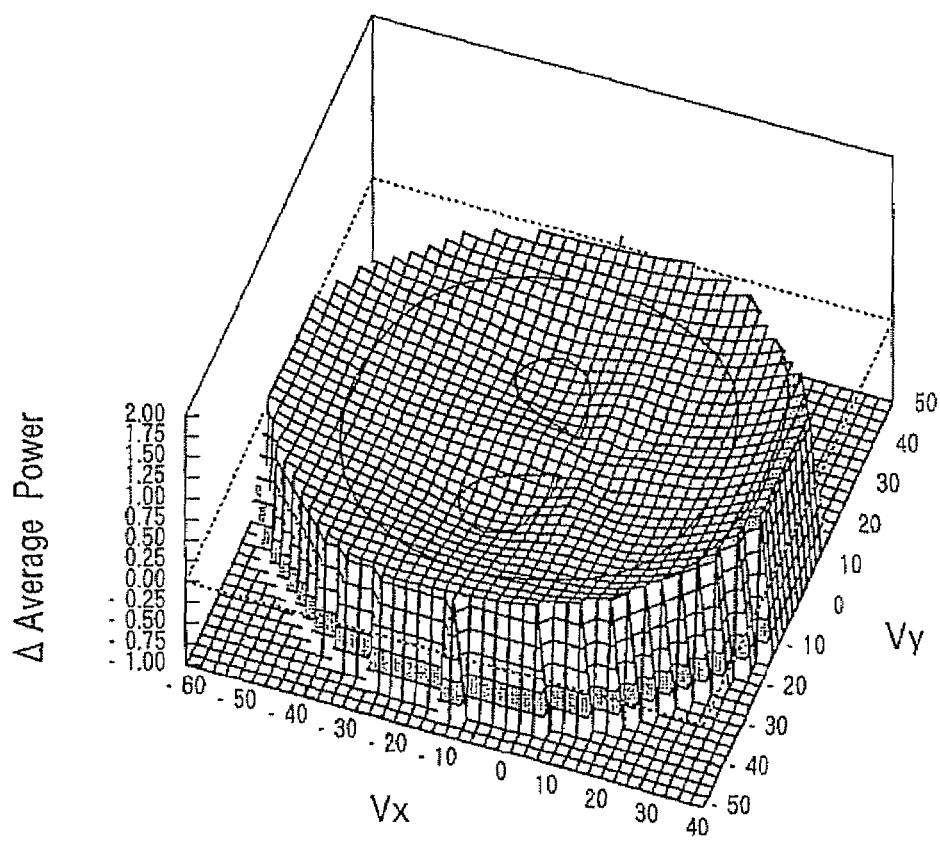
FIG. 48 shows a contour map of an average power error of the spectacle lens according to the sixth example.
Figure 49:
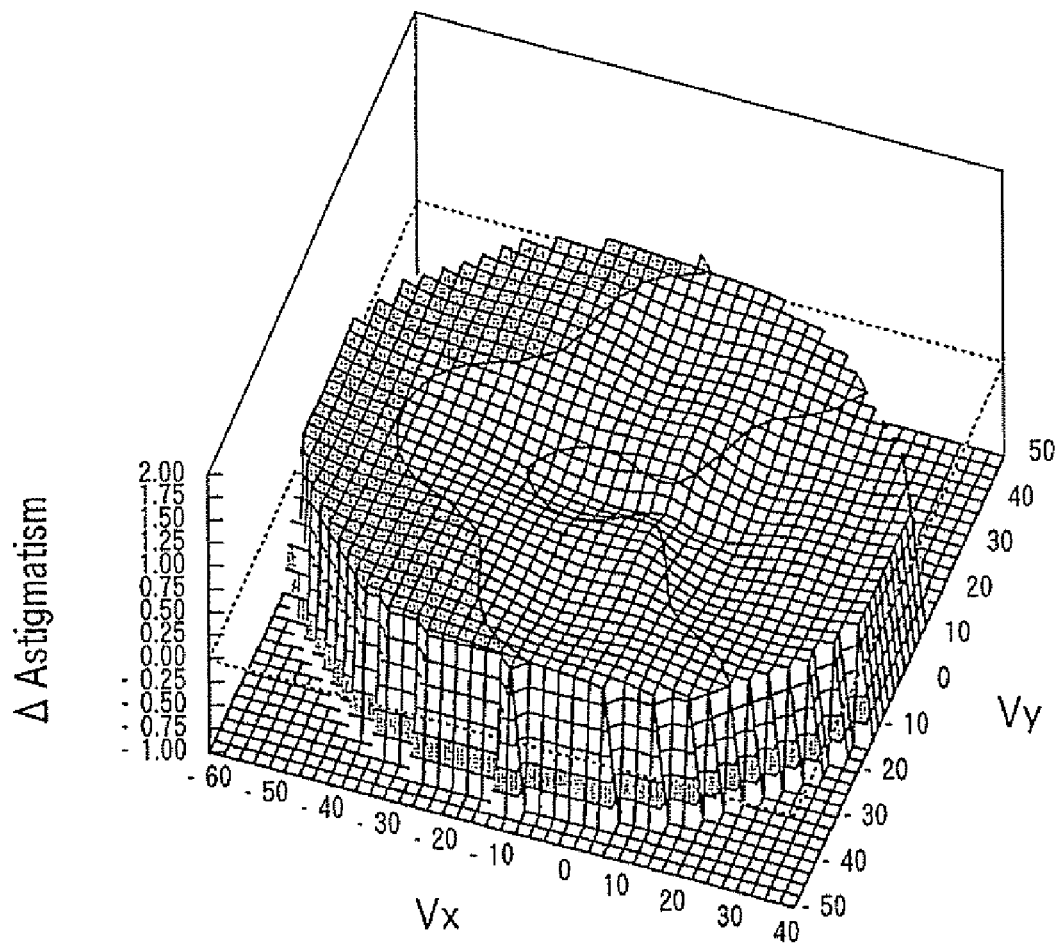
FIG. 49 shows a contour map of astigmatism of the spectacle lens according to the sixth example.
Figure 50:
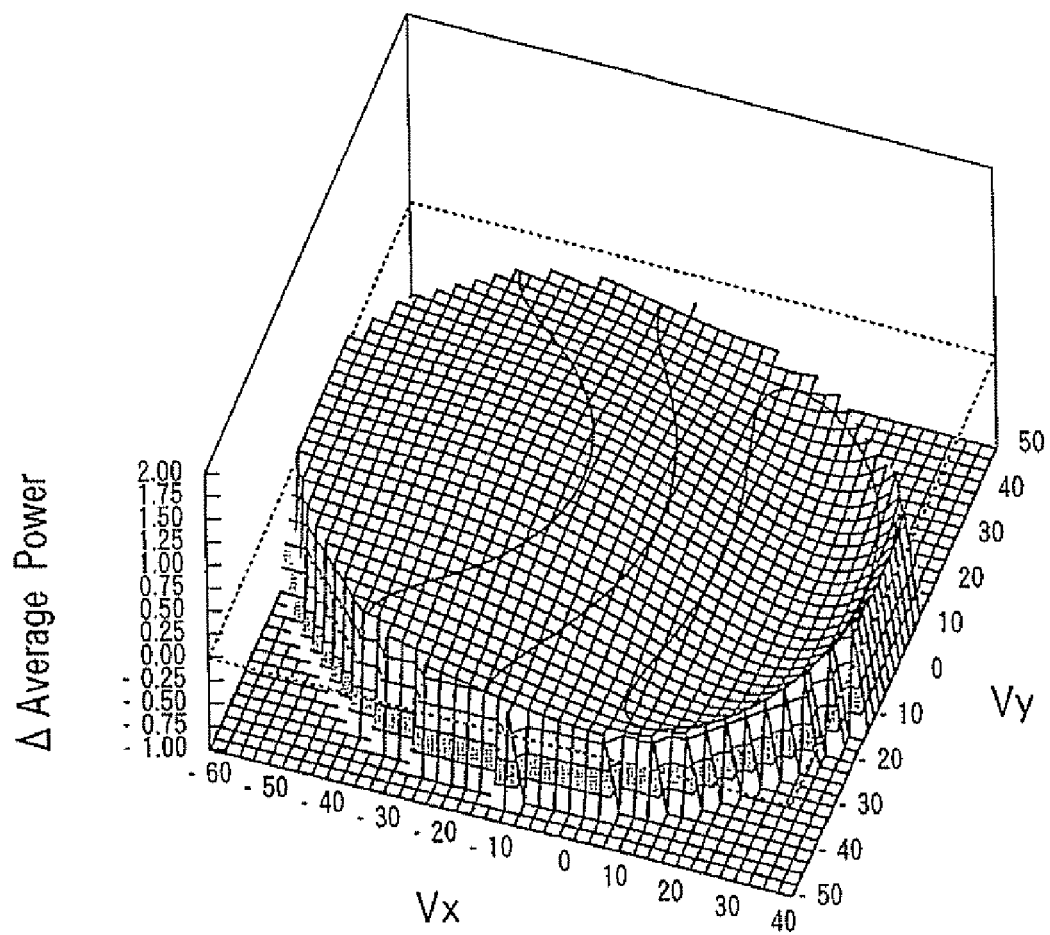
FIG. 50 shows a contour map of an average power error of a sixth comparative example.
Figure 51:
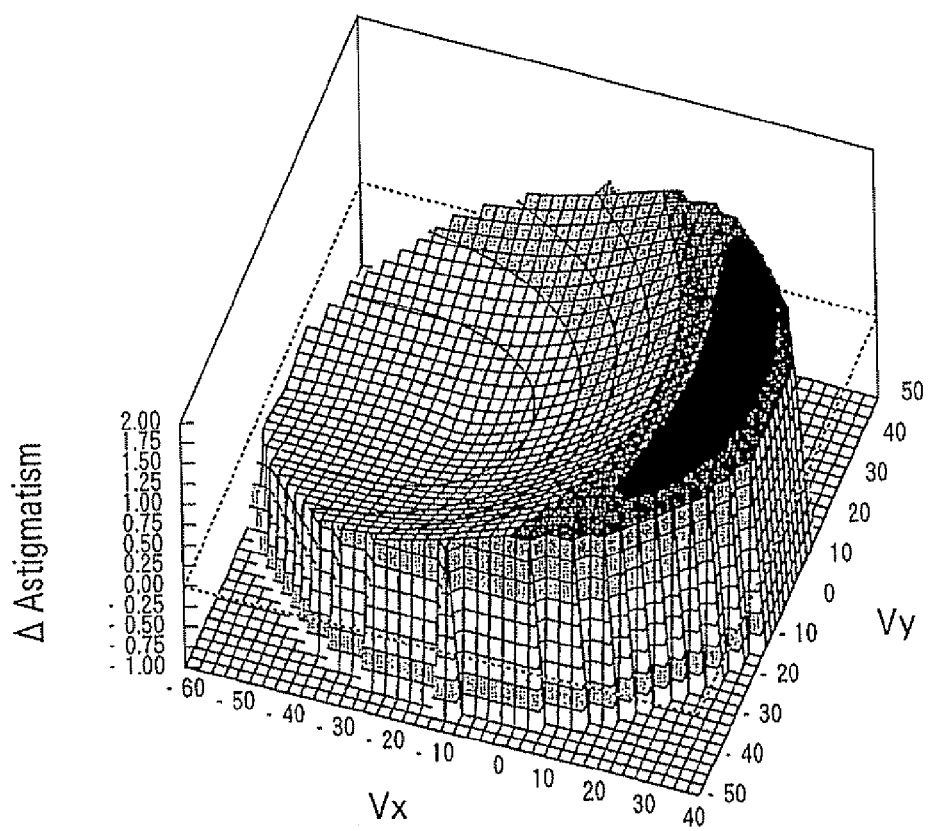
FIG. 51 shows a contour map of astigmatism of the spectacle lens according to the sixth comparative example.

FIG. 48 shows a contour map of an average power error of the spectacle lens 11 according to the sixth example. FIG. 49 shows a contour map of astigmatism of the spectacle lens 11 according to the sixth example. FIG. 50 shows a contour map of an average power error of a spectacle lens having a back surface configured to be a spherical surface (i.e., a sixth comparative example). FIG. 51 shows a contour map of astigmatism of the spectacle lens (the sixth comparative example) having a back surface configured to be a spherical surfaces As can be seen from the comparison between FIG. 48 and FIG. 50 and the comparison between FIG. 49 and FIG. 51, the spectacle lens 11 according to the sixth example achieves a balance between the average power error and the astigmatism while reducing the average power error and the astigmatism to minimums, respectively. It is understood that the spectacle lens according to the sixth example has more suitable optical performance than a conventional spectacle lens.

In addition to the above mentioned advantages, the spectacle lens 11 according to the sixth example is configured to have larger front warpage angle of 20°. Therefore, the spectacle lens according to the sixth example has a high wrapping property.

Since the spectacle lens 11 according to the sixth example satisfies the condition (18), a base curve, which is shallower than a base curve of a spherical surface configured to suitably attain a prescribed spherical power in regard to aberrations in the case where there is no inclination angle, is employed in the sixth example. However, by satisfying the condition (19)

when the angle θ is in a predetermined range, it is possible to attain suitable off-axis optical performance.

SEVENTH EXAMPLE

Figure 52:
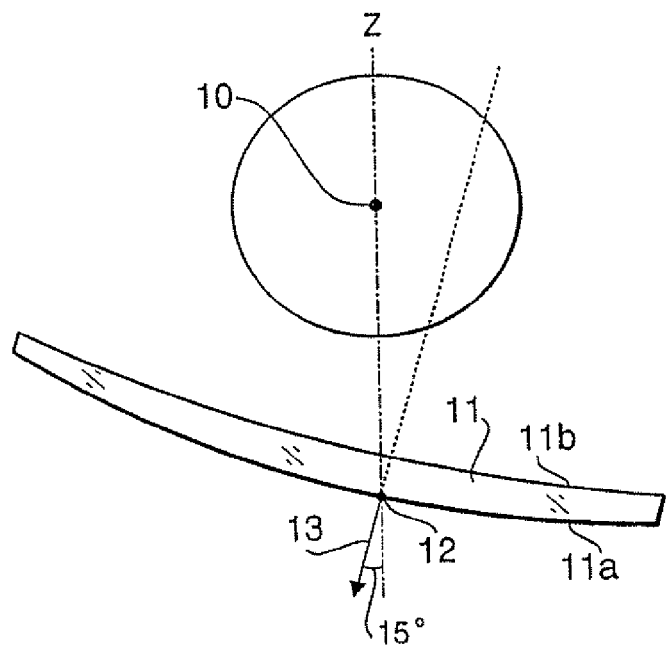
FIG. 52 is a cross-section of the spectacle lens according to a seventh example defined in the X-Z plane.

FIG. 52 is a cross-section of the spectacle lens 11 according to a seventh example defined in the X-Z plane. The spectacle lens 11 according to the seventh example is configured such that the angle formed between the outward normal line 13 and the Z-axis (i.e., a front warpage angle) at the centration point 12 is 15°.

Figure 53:
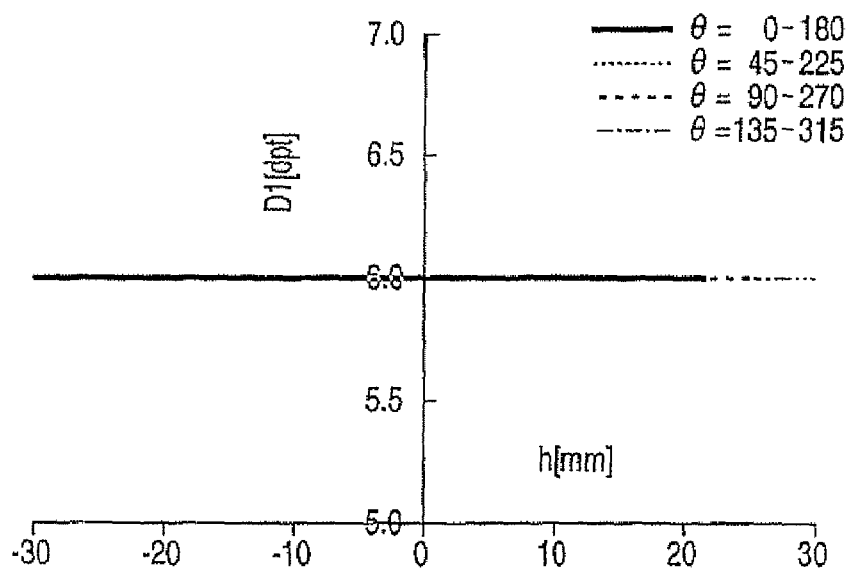
FIG. 53 is a graph of the cross-section surface power of a front surface of the spectacle lens according to the seventh example.
Figure 54:
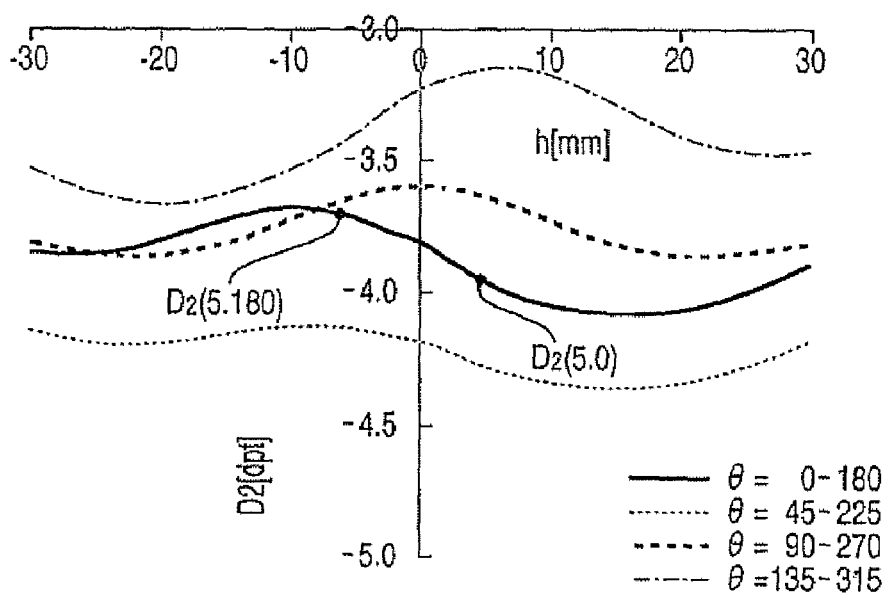
FIG. 54 is a graph of the cross-section surface power of a back surface of the spectacle lens according to the seventh example.

FIG. 53 is a graph of the cross-section surface power $D_1$ of the front surface 11a with respect to the distance h and the angle θ. As shown in FIG. 53, the front surface 11a of the spectacle lens 11 is formed as a spherical surface. FIG. 54 is a graph of the cross-section surface power $D_2$ of the back surface 11b with respect to the distance h and the angle θ.

Figure 55:
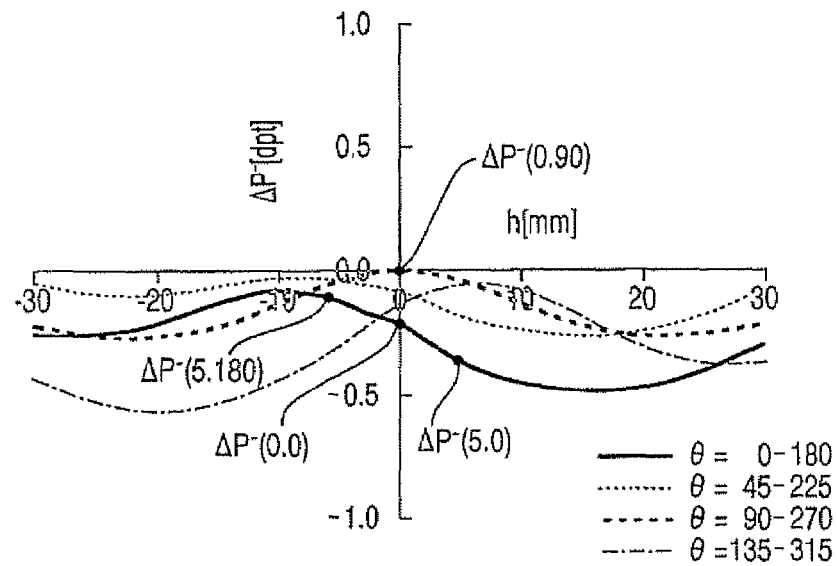
FIG. 55 is a graph illustrating the aspheric amount $\Delta P^\sim$ of the spectacle lens according to the seventh example.

FIG. 55 is a graph illustrating the aspheric amount $\Delta P^\sim$ with respect to the distance h and the angle θ. The aspheric amount is obtained by using the cross-section surface power $D_1$ and $D_2$ of the front and back surfaces 11a and 11b.

Table 7 shows the numerical configuration of the spectacle lens 11 according to the seventh example. As shown in Table 7, the spectacle lens according to the seventh example has a function of correcting astigmatism.

TABLE 7

| | | | | | θ | | | | |
|---|---|---|---|---|---|---|---|---|---|
| | h | 0 | 45 | 90 | 135 | 180 | 225 | 270 | 315 |
| $D_1$ | 0 | 6.00 | 6.00 | 6.00 | 6.00 | 6.00 | 6.00 | 6.00 | 6.00 |
| | 5 | 6.00 | 6.00 | 6.00 | 6.00 | 6.00 | 6.00 | 6.00 | 6.00 |
| | 10 | 6.00 | 6.00 | 6.00 | 6.00 | 6.00 | 6.00 | 6.00 | 6.00 |
| | 15 | 6.00 | 6.00 | 6.00 | 6.00 | 6.00 | 6.00 | 6.00 | 6.00 |
| | 20 | 6.00 | 6.00 | 6.00 | 6.00 | 6.00 | 6.00 | 6.00 | 6.00 |
| $D_2$ | 0 | −3.81 | −4.18 | −3.59 | −3.22 | −3.81 | −4.18 | −3.59 | −3.22 |
| | 5 | −3.96 | −4.27 | −3.63 | −3.15 | −3.71 | −4.13 | −3.63 | −3.40 |
| | 10 | −4.04 | −4.33 | −3.72 | −3.18 | −3.67 | −4.12 | −3.72 | −3.53 |
| | 15 | −4.07 | −4.35 | −3.81 | −3.28 | −3.72 | −4.15 | −3.81 | −3.62 |
| | 20 | −4.06 | −4.34 | −3.85 | −3.40 | −3.80 | −4.19 | −3.85 | −3.66 |
| P~ | 0 | 2.29 | 1.92 | 2.50 | 2.87 | 2.29 | 1.92 | 2.50 | 2.87 |
| | 5 | 2.14 | 1.82 | 2.46 | 2.94 | 2.38 | 1.97 | 2.46 | 2.70 |
| | 10 | 2.05 | 1.76 | 2.37 | 2.92 | 2.42 | 1.97 | 2.37 | 2.56 |
| | 15 | 2.02 | 1.74 | 2.28 | 2.82 | 2.38 | 1.94 | 2.28 | 2.47 |
| | 20 | 2.03 | 1.76 | 2.24 | 2.70 | 2.29 | 1.91 | 2.24 | 2.44 |
| $P_0$ | | 2.50 | 2.00 | 2.50 | 3.00 | 2.50 | 2.00 | 2.50 | 3.00 |
| ΔP~ | 0 | −0.21 | −0.08 | 0.00 | −0.13 | −0.21 | −0.08 | 0.00 | −0.13 |
| | 5 | −0.36 | −0.18 | −0.04 | −0.06 | −0.12 | −0.03 | −0.04 | −0.30 |
| | 10 | −0.45 | −0.24 | −0.13 | −0.08 | −0.08 | −0.03 | −0.13 | −0.44 |
| | 15 | −0.48 | −0.26 | −0.22 | −0.18 | −0.12 | −0.06 | −0.22 | −0.53 |
| | 20 | −0.47 | −0.24 | −0.26 | −0.30 | −0.21 | −0.09 | −0.26 | −0.56 |

As shown in FIG. 55 and Table 7, the spectacle lens 11 according to the seventh example satisfies the condition (6) in a range of 5<h<20. That is, the cross-section of the back surface 11b is rotationally asymmetrical. As shown in Table 7) $P_0(0)$ is 2.00. Therefore, the spectacle lens 11 according to the seventh example is a plus lens which satisfies the condition (7). As shown in FIG. 55 and Table 7, the spectacle lens 11 according to the seventh example satisfies the conditions (8), (11) and (12). As can be seen from Table 7, the spectacle lens according to the seventh example satisfies the condition (15). As shown in FIG. 55 and Table 7, the condition (16) is satisfied when the angle θ is between −90° and 90° (270° to 360° and 0° to 90°).

As described above, the front surface 11a is formed as a spherical surface. Therefore, as shown in FIG. 54 and Table 7, the spectacle lens 11 according to the seventh example satisfies the condition (21). Since the spectacle lens 11 satisfies the conditions (11) and (12), the spectacle lens 11 according to the seventh example satisfies the condition (23). As can be seen from FIG. 54 and Table 7, the condition (25) is also satisfied since the condition (16) is satisfied.

Figure 56:
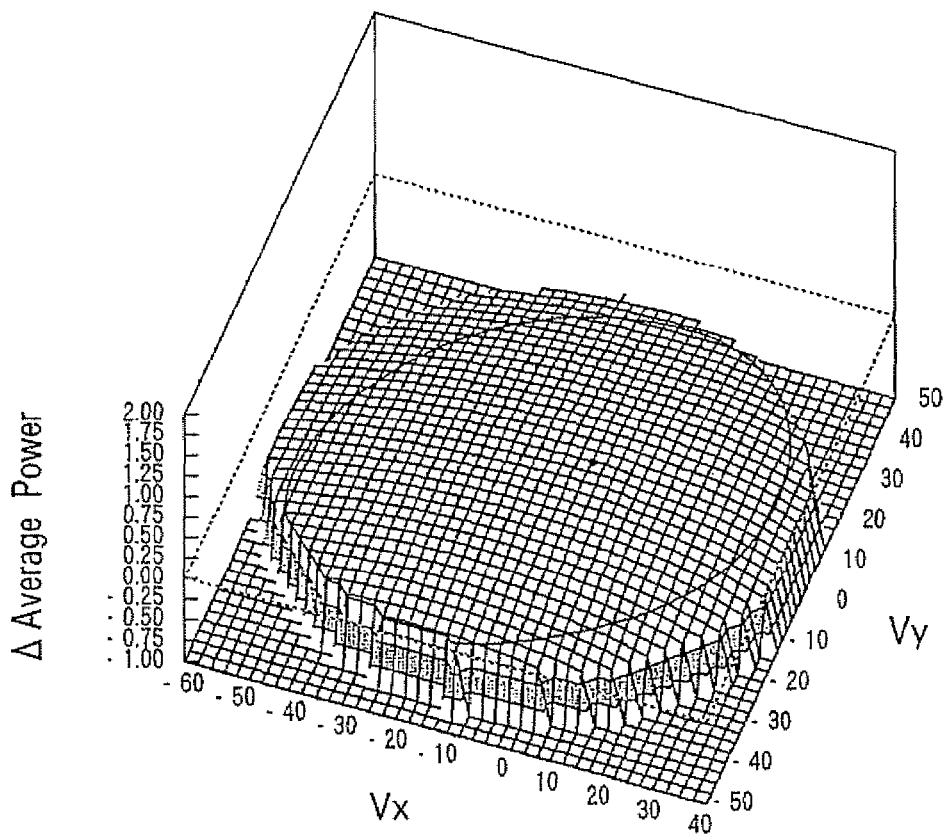
FIG. 56 shows a contour map of an average power error of the spectacle lens according to the seventh example.
Figure 57:
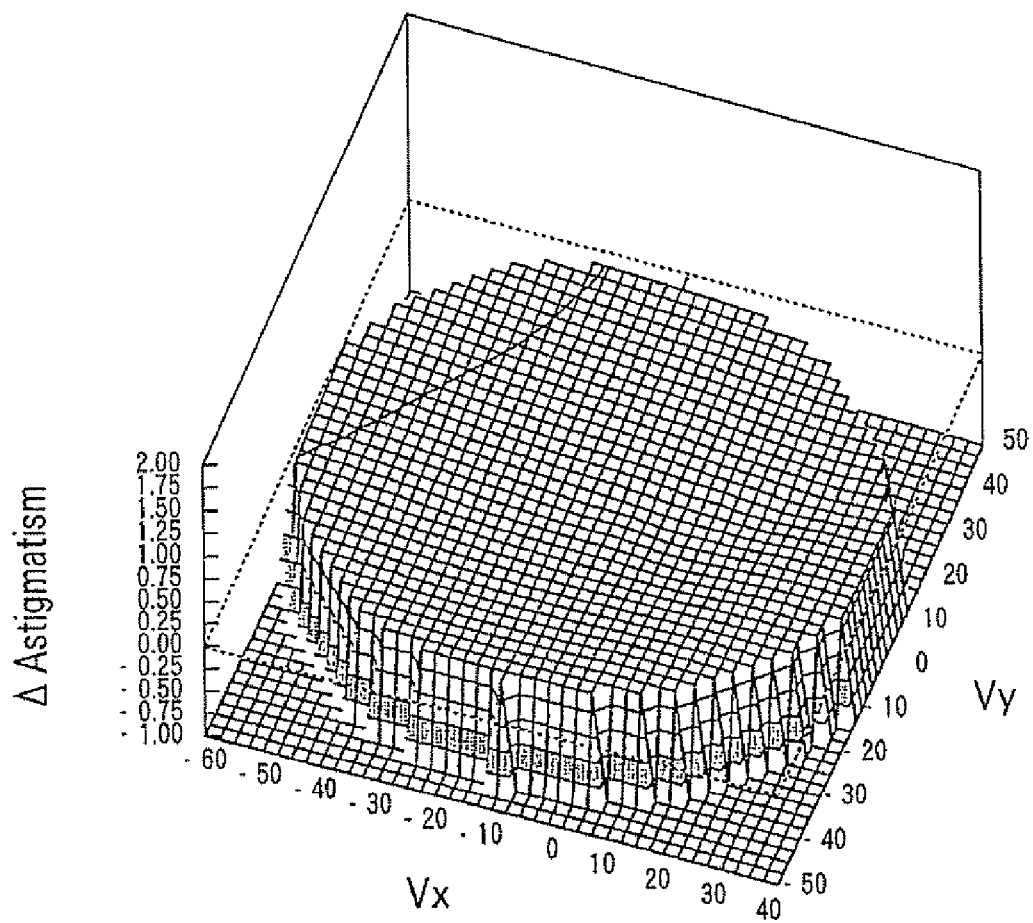
FIG. 57 shows a contour map of astigmatism of the spectacle lens according to the seventh example.
Figure 58:
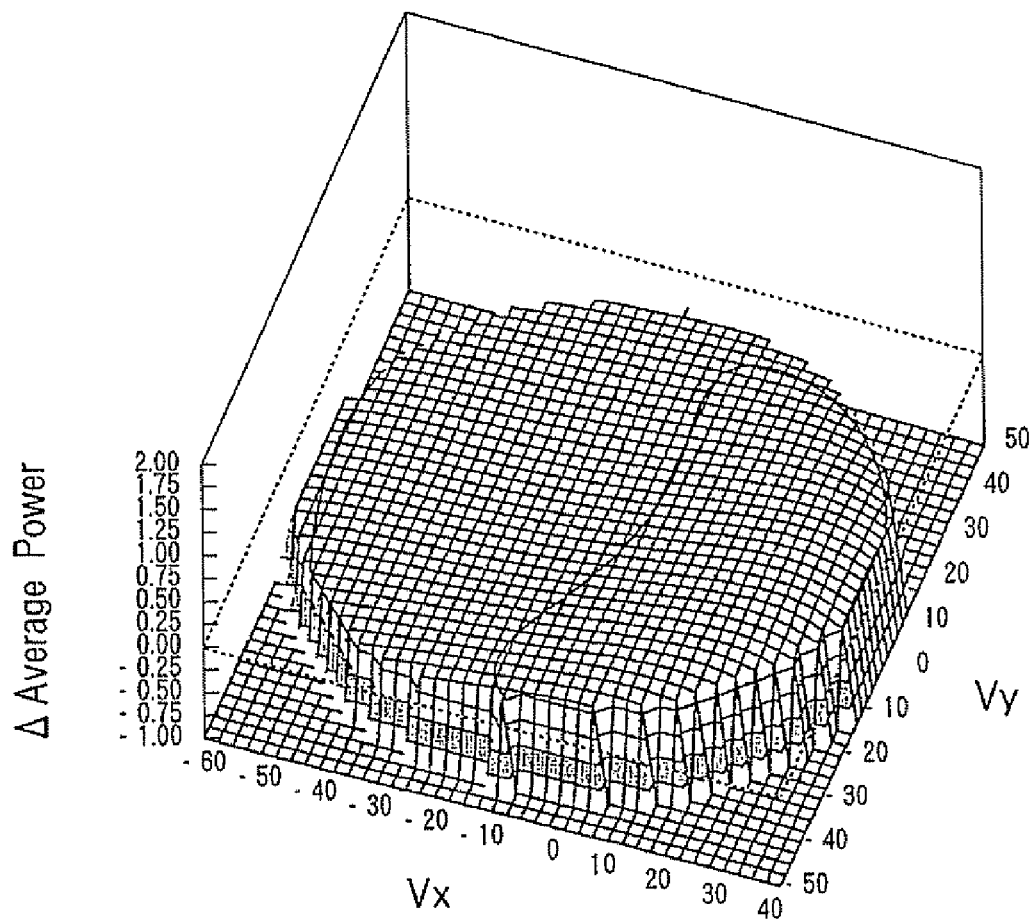
FIG. 58 shows a contour map of an average power error of a seventh comparative example.
Figure 59:
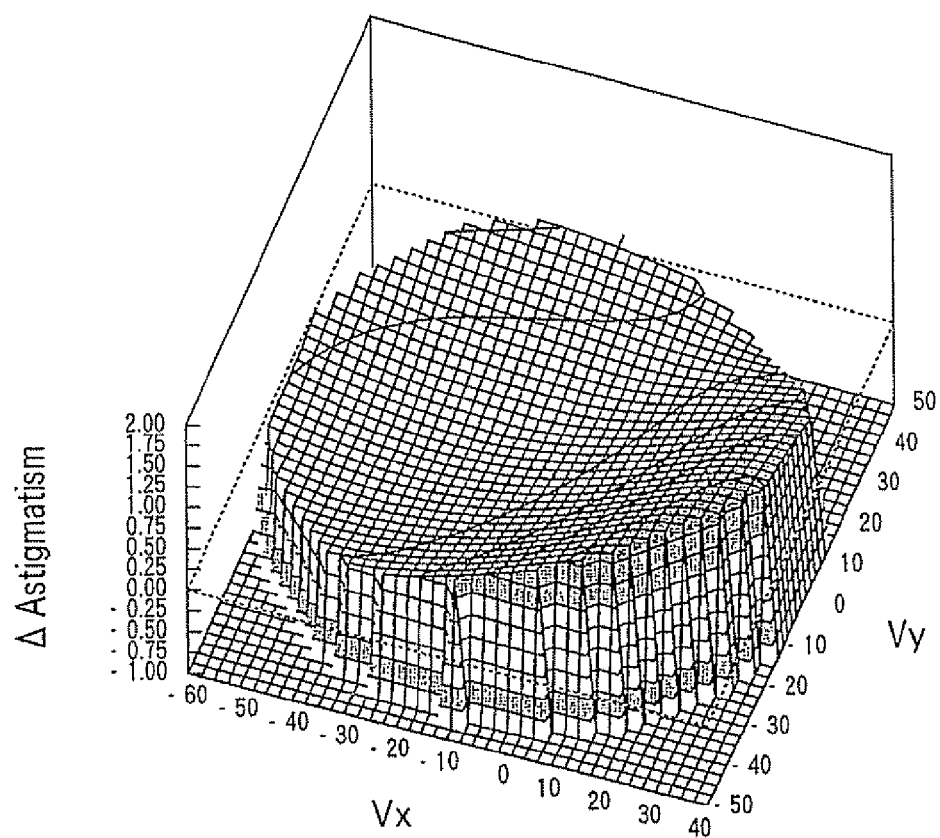
FIG. 59 shows a contour map of astigmatism of the spectacle lens according to the seventh comparative example.

FIG. 56 shows a contour map of an average power error of the spectacle lens 11 according to the seventh example. FIG. 57 shows a contour map of astigmatism of the spectacle lens 11 according to the seventh example. FIG. 58 shows a contour map of an average power error of a spectacle lens having a back surface configured to be a toric surface (i.e., a seventh comparative example). FIG. 59 shows a contour map of astigmatism of the spectacle lens (the seventh comparative example) having a back surface configured to be a toric surface. As can be seen from the comparison between FIG. 56 and FIG. 58 and the comparison between FIG. 57 and FIG. 59, the spectacle lens 11 according to the seventh example achieves a balance between the average power error and the astigmatism while reducing the average power error and the astigmatism to minimums, respectively. It is understood that the spectacle lens according to the seventh example has more suitable optical performance than a conventional spectacle lens.

In addition to the above mentioned advantages, the spectacle lens 11 according to the seventh example is configured to have larger front warpage angle of 15°. Therefore, the spectacle lens according to the seventh example has a high wrapping property.

Since the spectacle lens 11 according to the seventh example satisfies the condition (15), a base curve, which is shallower than a base curve of a spherical surface configured to suitably attain a prescribed spherical power in regard to aberrations in the case where there is no inclination angle, is employed in the seventh example. However, by satisfying the condition (16) when the angle θ is in a predetermined range, it is possible to attain suitable off-axis optical performance.

EIGHTH EXAMPLE

Figure 60:
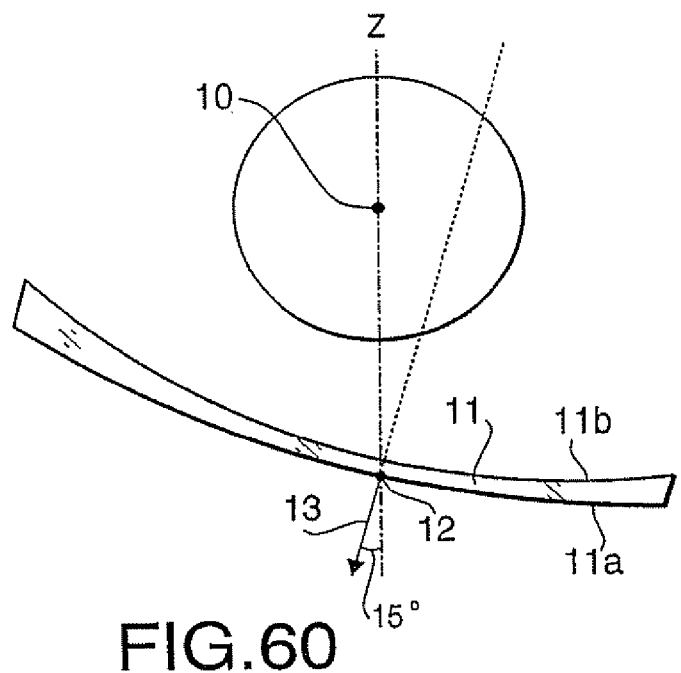
FIG. 60 is a cross-section of the spectacle lens according to an eighth example defined in the X-Z plane.

FIG. 60 is a cross-section of the spectacle lens 11 according to an eighth example defined in the X-Z plane. The spectacle lens 11 according to the eighth example is configured such that the angle formed between the outward normal line 13 and the Z-axis (i.e., a front warpage angle) at the centration point 12 is 15°.

Figure 61:
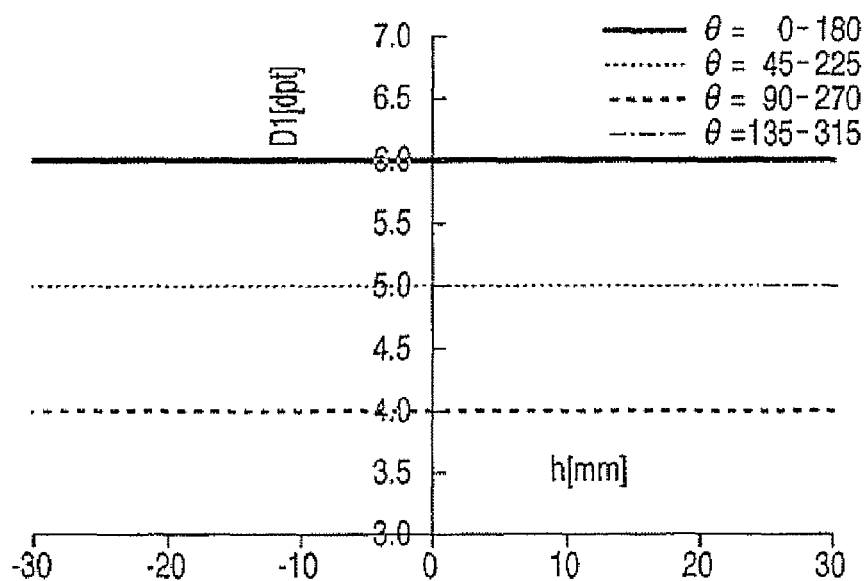
FIG. 61 is a graph of the cross-section surface power of a front surface of the spectacle lens according to the eighth example.
Figure 62:
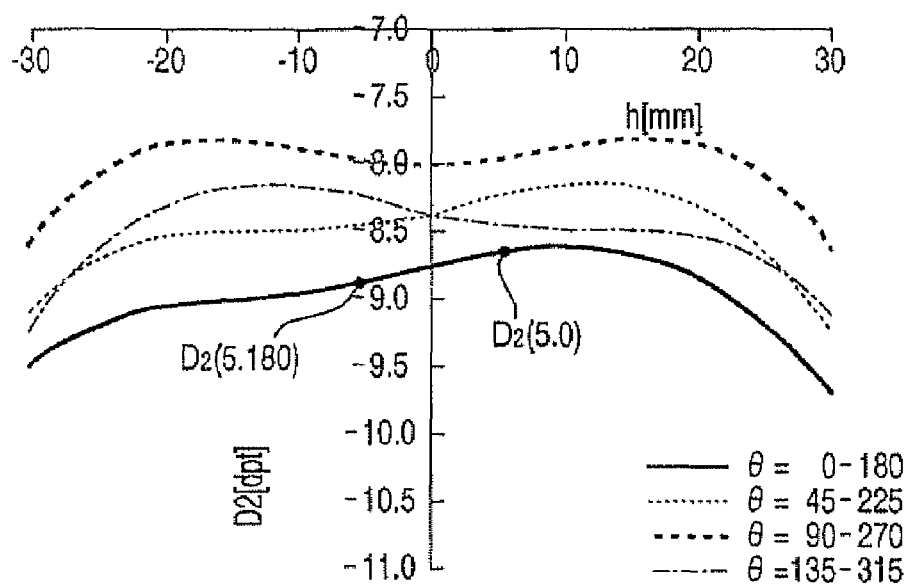
FIG. 62 is a graph of the cross-section surface power of a back surface of the spectacle lens according to the eighth example.
Figure 63:
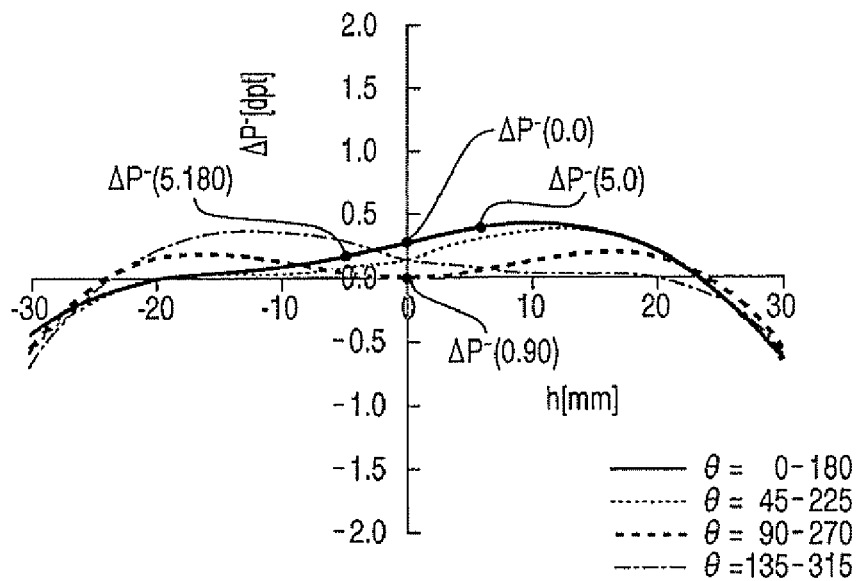
FIG. 63 is a graph illustrating the aspheric amount $\Delta P^\sim$ of the spectacle lens according to the eighth example.

FIG. 61 is a graph of the cross-section surface power $D_1$ of the front surface 11a with respect to the distance h and the angle θ. As shown in FIG. 61, the front surface 11a of the spectacle lens 11 is formed as a toric surface. FIG. 62 is a graph of the cross-section surface power $D_2$ of the back surface 11b with respect to the distance h and the angle θ. FIG. 63 is a graph illustrating the aspheric amount $\Delta P^\sim$ with respect to the distance h and the angle θ. The aspheric amount is obtained by using the cross-section surface power $D_1$ and $D_2$ of the front and back surfaces 11a and 11b.

Table 8 shows the numerical configuration of the spectacle lens 11 according to the sixth example. As shown in Table 8, the spectacle lens according to the eighth example has a function of correcting astigmatism.

TABLE 8

| | | | | | θ | | | | |
|---|---|---|---|---|---|---|---|---|---|
| | h | 0 | 45 | 90 | 135 | 180 | 225 | 270 | 315 |
| $D_1$ | 0 | 6.00 | 5.00 | 4.00 | 5.00 | 6.00 | 5.00 | 4.00 | 5.00 |
| | 5 | 6.00 | 5.00 | 4.00 | 5.00 | 6.00 | 5.00 | 4.00 | 5.00 |

TABLE 8-continued

| | h | θ=0 | 45 | 90 | 135 | 180 | 225 | 270 | 315 |
|---|---|---|---|---|---|---|---|---|---|
| | 10 | 6.00 | 5.00 | 4.00 | 5.00 | 6.00 | 5.00 | 4.00 | 5.00 |
| | 15 | 6.00 | 5.00 | 4.00 | 5.00 | 6.00 | 5.00 | 4.00 | 5.00 |
| | 20 | 6.00 | 5.00 | 4.00 | 5.00 | 6.00 | 5.00 | 4.00 | 5.00 |
| $D_2$ | 0 | −8.76 | −8.39 | −8.02 | −8.39 | −8.76 | −8.39 | −8.02 | −8.39 |
| | 5 | −8.65 | −8.24 | −7.98 | −8.45 | −8.87 | −8.45 | −7.98 | −8.24 |
| | 10 | −8.61 | −8.16 | −7.89 | −8.49 | −8.95 | −8.49 | −7.89 | −8.16 |
| | 15 | −8.67 | −8.17 | −7.83 | −8.50 | −9.00 | −8.50 | −7.83 | −8.17 |
| | 20 | −8.83 | −8.31 | −7.86 | −8.54 | −9.04 | −8.54 | −7.86 | −8.31 |
| P~ | 0 | −2.72 | −3.36 | −4.00 | −3.36 | −2.72 | −3.36 | −4.00 | −3.36 |
| | 5 | −2.62 | −3.21 | −3.96 | −3.42 | −2.83 | −3.42 | −3.96 | −3.21 |
| | 10 | −2.58 | −3.14 | −3.87 | −3.47 | −2.92 | −3.47 | −3.87 | −3.14 |
| | 15 | −2.63 | −3.15 | −3.81 | −3.48 | −2.96 | −3.48 | −3.81 | −3.15 |
| | 20 | −2.80 | −3.29 | −3.84 | −3.51 | −3.01 | −3.51 | −3.84 | −3.29 |
| $P_0$ | | −3.00 | −3.50 | −4.00 | −3.50 | −3.00 | −3.50 | −4.00 | −3.50 |
| ΔP~ | 0 | 0.28 | 0.14 | 0.00 | 0.14 | 0.28 | 0.14 | 0.00 | 0.14 |
| | 5 | 0.38 | 0.29 | 0.04 | 0.08 | 0.17 | 0.08 | 0.04 | 0.29 |
| | 10 | 0.42 | 0.36 | 0.13 | 0.03 | 0.08 | 0.03 | 0.13 | 0.36 |
| | 15 | 0.37 | 0.35 | 0.19 | 0.02 | 0.04 | 0.02 | 0.19 | 0.35 |
| | 20 | 0.20 | 0.21 | 0.16 | −0.01 | −0.01 | −0.01 | 0.16 | 0.21 |

As shown in FIG. 63 and Table 8, the spectacle lens 11 according to the eighth example satisfies the condition (6) in a range of 5<h<20. That is, the back surface 11b is formed to be a rotationally asymmetrical aspherical surface. As shown in Table 8, $P_0(0)$ is −3.00. Therefore, the spectacle lens 11 according to the eighth example is a minus lens which satisfies the condition (9). As shown in FIG. 63 and Table 8, the spectacle lens 11 according to the eighth example satisfies the conditions (10), (12) and (13).

Figure 64:
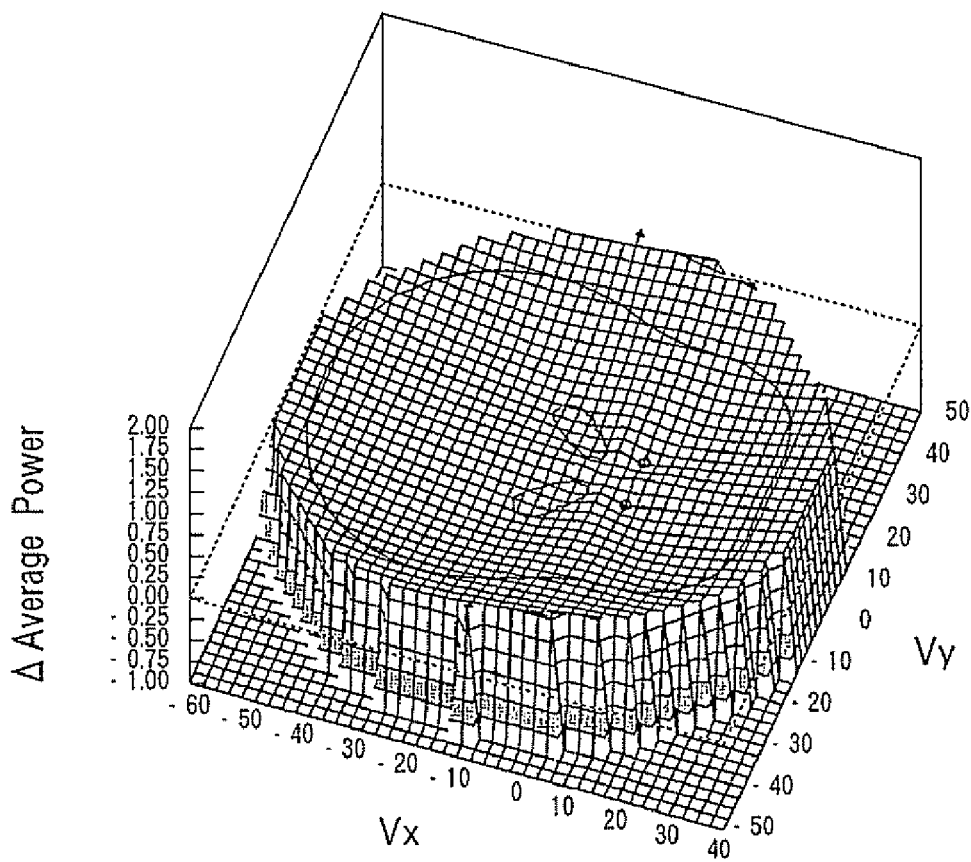
FIG. 64 shows a contour map of an average power error of the spectacle lens according to the eighth example.
Figure 65:
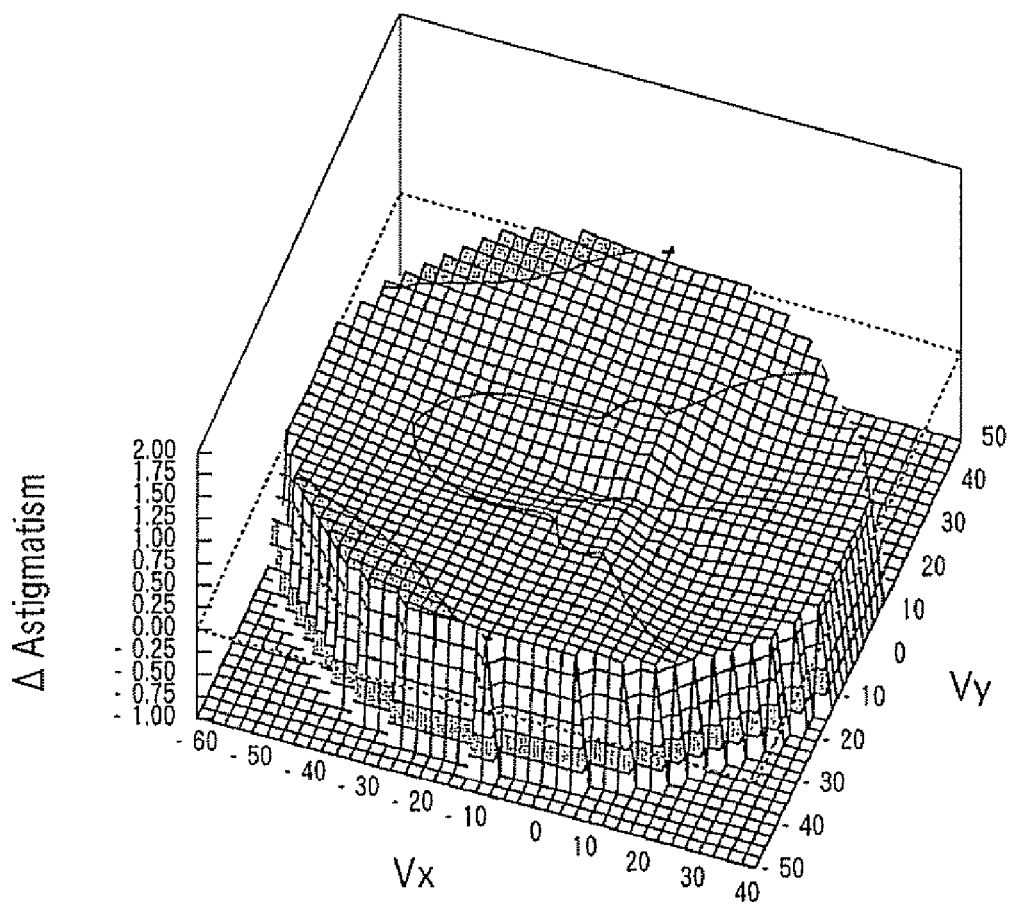
FIG. 65 shows a contour map of astigmatism of the spectacle lens according to the eighth example.
Figure 66:
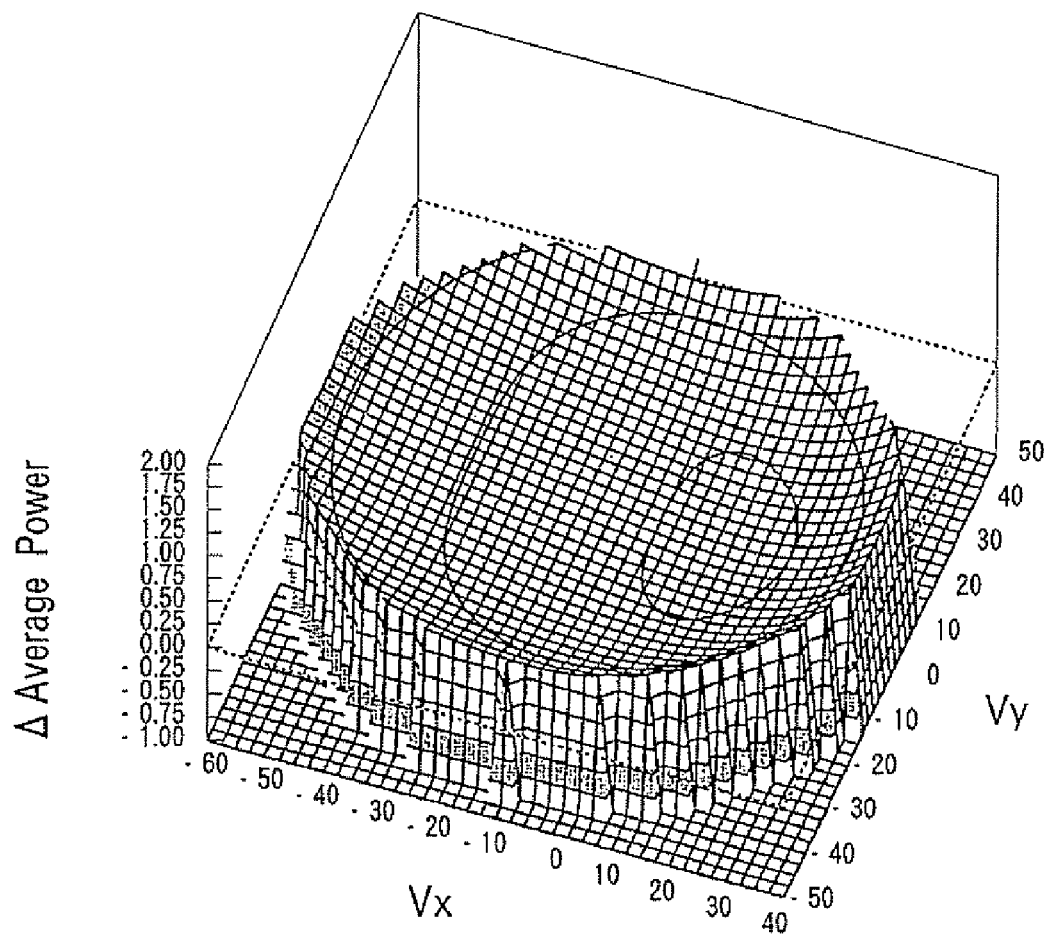
FIG. 66 shows a contour map of an average power error of an eighth comparative example.
Figure 67:
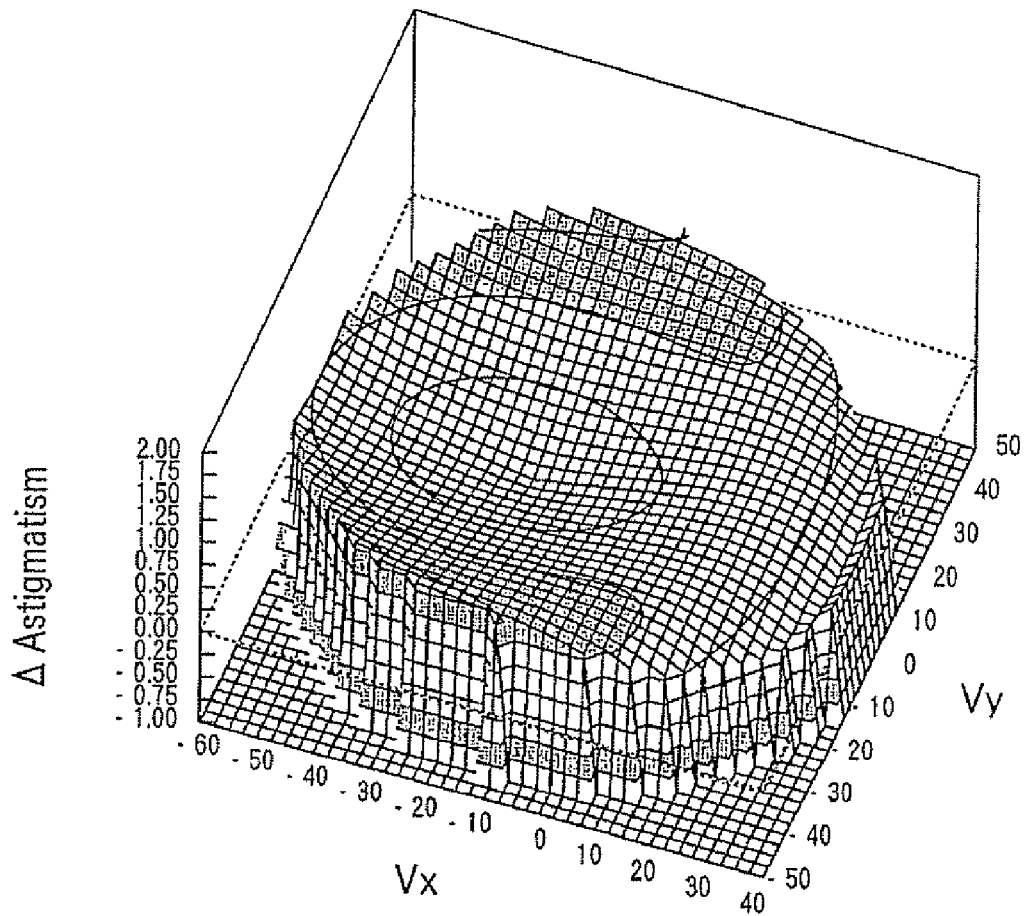
FIG. 67 shows a contour map of astigmatism of the spectacle lens according to the eighth comparative example.

FIG. 64 shows a contour map of an average power error of the spectacle lens 11 according to the eighth example. FIG. 65 shows a contour map of astigmatism of the spectacle lens 11 according to the eighth example. FIG. 66 shows a contour map of an average power error of a spectacle lens having a back surface configured to be a toric surface (i.e., an eighth comparative example). FIG. 67 shows a contour map of astigmatism of the spectacle lens (the eight comparative example) having a back surface configured to be a toric surface. As can be seen from the comparison between FIG. 64 and FIG. 66 and the comparison between FIG. 65 and FIG. 67 the spectacle lens 11 according to the eighth example achieves a balance between the average power error and the astigmatism while reducing the average power error and the astigmatism to minimums, respectively. It is understood that the spectacle lens according to the eight example has more suitable optical performance than a conventional spectacle lens.

In addition to the above mentioned advantages, the spectacle lens 11 according to the eighth example is configured to have larger front warpage angle of 15°. Therefore, the spectacle lens according to the eighth example has a high wrapping property.

In FIG. 68, specifications of the above mentioned first through eighth examples and first through eighth comparative examples are summarized. By referring to the abovementioned explanations on the average power errors and astigmatism of the first through eighth examples and the first through eighth comparative examples, and specifications shown in FIG. 68, it is understood that the spectacle lenses according to the first through eighth examples are capable of reducing aberrations and have more suitable optical performance than conventional spectacle lenses.

Although the present invention has been described in considerable detail with reference to certain preferred embodiments thereof; other embodiments are possible.

This application claims priority of Japanese Patent Application No. P2005-159538, filed on May 31, 2005. The entire subject matter of the application is incorporated herein by reference.

What is claimed is:

1. A spectacle lens having an aspherical surface on its one of front and back surfaces,
   wherein an outward normal line normal to the front surface at a centration point inclines with respect to an axis passing through the centration point and a center of rotation of an eye, and
   wherein a cross section of the aspherical surface defined by a plane including the outward normal line and the axis is asymmetrical.

2. The spectacle lens according to claim 1,
   wherein when a direction passing through the centration point and the center of rotation of an eye from the centration point to the center of rotation of an eye is defined as a Z-axis, two axes perpendicularly intersecting with the Z-axis are respectively defined as a X-axis and a Y-axis so that a left hand coordinate system is defined at the centration point in such a manner that an orthographic projection of the outward normal line to an X-Y plane facing a minus direction of the X-axis, curvatures of cross-sections of the front and back surfaces defined by a plane which includes the Z-axis and forms an angle θ with respect to the X-axis are respectively defined as $C_1(h,\theta)$ (dpt) and $C_2(h,\theta)$ (dpt), where h represents a distance mm from the Z-axis, a thickness of the spectacle lens at the centration point is represented as t (mm), a refractive index of medium of the spectacle lens is represented as n, a prescribed spherical power is represented as SPH (dpt), a prescribed cylindrical power is represented as CYL (dpt), and a cylinder axis measured in a counterclockwise direction with respect to the X-axis is represented as AX (°), cross-section surface power $D_1(h,\theta)$ of the front surface is defined as:

$$D_1(h,\theta)=(n-1)\cdot C_1(h,\theta) \qquad (1),$$

cross-section surface power $D_2(h,\theta)$ of the back surface is defined as:

$$D_2(h,\theta)=(1-n)\cdot C_2(h,\theta) \qquad (2),$$

an amount P~(h,θ) regarding a vertex power is defined as:

$$P\~(h,\theta)=D_1(h,\theta)/\{1-D_1(h,\theta)\cdot t/1000/n\}+D_2(h,\theta) \qquad (3),$$

a prescribed dioptric power $P_0(\theta)$ for a lens center and paraxial rays is defined:

$$P_0(\theta)=SPH+CYL\cdot \sin^2(\theta-AX) \qquad (4), \text{ and}$$

an amount ΔP~(h, θ) regarding all aspheric amount is defined as:

$$\Delta P\~(h,\theta)=P\~(h,\theta)-P_0(\theta) \qquad (5),$$

wherein the spectacle lens satisfies a following condition (6) at least in a range of 5<h<20:

$$\Delta P\~(h,0) \neq \Delta P\~(h,180) \qquad (6).$$

3. The spectacle lens according to claim 2, wherein following conditions (7) and (8) are satisfied:

$$P_0(0)>0 \qquad (7),$$

$$\Delta P\~(5,180)>\Delta P\~(5,0) \qquad (8).$$

4. The spectacle lens according to claim 2, wherein following conditions (9) and (10) are satisfied:

$$P_0(0)<0 \qquad (9),$$

$$\Delta P\~(5,180)<\Delta P\~(5,0) \qquad (10).$$

5. The spectacle lens according to claim 2, wherein following conditions (7), (11) and (12) are satisfied:

$$P_0(0) > 0 \quad (7),$$

$$\Delta P^-(0,0) < 0 \quad (11),$$

$$\Delta P^-(0,90) \cong 0 \quad (12).$$

6. The spectacle lens according to claim 2, wherein following conditions (9), (13) and (12) are satisfied:

$$P_0(0) < 0 \quad (9),$$

$$\Delta P^-(0,0) > 0 \quad (13),$$

$$\Delta P^-(0,90) \cong 0 \quad (12).$$

7. The spectacle lens according to claim 2, wherein following conditions (14) and (15) are satisfied:

$$P_0(\theta) > 0 \quad (14),$$

$$D_1(0,\theta) < A_p \cdot P_0(\theta) + B_p \quad (15)$$

where $A_p = 1.02n - 0.51$, $B_p = 13.24n - 14.79$,
wherein a following condition (16) is satisfied when the angle $\theta$ is in a range of $-90 \leq \theta \leq 90$:

$$\Delta P^-(5,\theta) > \Delta P^-(10,\theta) > \Delta P^-(15,\theta) \quad (16).$$

8. The spectacle lens according to claim 2, wherein following conditions (17) and (18) are satisfied:

$$P_0(\theta) < 0 \quad (17),$$

$$D_1(0,\theta) < A_m \cdot P_0(\theta) + B_m \quad (18)$$

where $A_m = 0.62n - 0.40$, $B_m = 20.09n - 23.46$,
wherein a following condition (19) is satisfied when the angle $\theta$ is in a range of $-90 \leq \theta \leq 90$:

$$\Delta P^-(5,\theta) < \Delta P^-(10,\theta) < \Delta P^-(15,\theta) \quad (19).$$

9. The spectacle lens according to claim 2, wherein following conditions (17) and (20) are satisfied:

$$P_0(\theta) < 0 \quad (17),$$

$$D_1(0,\theta) > A_m \cdot P_0(\theta) + B_m \quad (20)$$

where $A_m = 0.62n - 0.40$, $B_m = 20.09n - 23.46$,
wherein a following condition (16) is satisfied when the angle $\theta$ is in a range of $90 \leq \theta \leq 270$:

$$\Delta P^-(5,\theta) > \Delta P^-(10,\theta) > \Delta P^-(15,\theta) \quad (16).$$

10. The spectacle lens according to claim 1, wherein an angle formed between the outward normal line and the axis passing through the centration point and the center of rotation of an eye is larger than or equal to 10°.

11. The spectacle lens according to claim 1, wherein the front surface is formed to be a spherical surface.

12. The spectacle lens according to claim 11, wherein following conditions (7) and (21) are satisfied:

$$P_0(0) > 0 \quad (7),$$

$$D_2(5,180) > D_2(5,0) \quad (21).$$

13. The spectacle lens according to claim 11, wherein following conditions (9) and (22) are satisfied:

$$P_0(0) < 0 \quad (9),$$

$$D_2(5,180) < D_2(5,0) \quad (22).$$

14. The spectacle lens according to claim 11, wherein following conditions (7) and (23) are satisfied:

$$P_0(0) > 0 \quad (7),$$

$$D_2(0,0) - CYL \cdot \sin^2(AX) < D_2(0,90) - CYL \cdot \cos^2(AX) \quad (23).$$

15. The spectacle lens according to claim 11, wherein following conditions (9) and (24) are satisfied:

$$P_0(0) < 0 \quad (9),$$

$$D_2(0,0) - CYL \cdot \sin^2(AX) > D_2(0,90) - CYL \cdot \cos^2(AX) \quad (24).$$

16. The spectacle lens according to claim 11, wherein following conditions (14) and (15) are satisfied:

$$P_0(\theta) > 0 \quad (14),$$

$$D_1(0,\theta) < A_p \cdot P_0(\theta) + B_p \quad (15)$$

where $A_p = 1.02n - 0.51$, $B_p = 13.24n - 14.79$,
wherein a following condition (25) is satisfied when the angle $\theta$ is in a range of $-90 \leq \theta \leq 90$:

$$D_2(5,\theta) > D_2(10,\theta) > D_2(15,\theta) \quad (25).$$

17. The spectacle lens according to claim 11, wherein following conditions (17) and (18) are satisfied:

$$P_0(\theta) < 0 \quad (17),$$

$$D_1(0,\theta) < A_m \cdot P_0(\theta) + B_m \quad (18)$$

where $A_m = 0.62n - 0.40$, $B_m = 20.09n - 23.46$,
wherein a following condition (26) is satisfied when the angle $\theta$ is in a range of $-90 \leq \theta \leq 90$:

$$D_2(5,\theta) < D_2(10,\theta) < D_2(15,\theta) \quad (26).$$

18. The spectacle lens according to claim 11, wherein following conditions (17) and (20) are satisfied:

$$P_0(\theta) < 0 \quad (17),$$

$$D_1(0,\theta) > A_m \cdot P_0(\theta) + B_m \quad (20)$$

where $A_m = 0.62n - 0.40$, $B_m = 20.09n - 23.46$,
wherein a following condition (25) is satisfied when the angle $\theta$ is in a range of $90 \leq \theta \leq 270$:

$$D_2(5,\theta) > D_2(10,\theta) > D_2(15,\theta) \quad (25).$$

19. Spectacles, comprising:
a frame having a front warpage angle more than or equal to 10°; and
the spectacle lens according to claim 1.

* * * * *